(12) United States Patent
Miyazawa et al.

(10) Patent No.: US 11,548,288 B2
(45) Date of Patent: *Jan. 10, 2023

(54) CONTROL DEVICE SETTING ORDER CONDITION FOR ORDERING CARTRIDGE TO BE MOUNTED IN RECORDING DEVICE PROVIDED WITH TANK

(71) Applicant: BROTHER KOGYO KABUSHIKI KAISHA, Nagoya (JP)

(72) Inventors: Masafumi Miyazawa, Nagoya (JP); Kenta Horade, Tokai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 52 days.

This patent is subject to a terminal disclaimer.

(21) Appl. No.: 17/098,583

(22) Filed: Nov. 16, 2020

(65) Prior Publication Data

US 2021/0170759 A1 Jun. 10, 2021

Related U.S. Application Data

(63) Continuation of application No. 16/229,570, filed on Dec. 21, 2018, now Pat. No. 10,836,177.

(30) Foreign Application Priority Data

Dec. 27, 2017 (JP) .............................. JP2017-252676

(51) Int. Cl.
  *B41J 2/175* (2006.01)
  *B41J 29/38* (2006.01)
  *G06K 15/00* (2006.01)

(52) U.S. Cl.
  CPC ....... *B41J 2/17566* (2013.01); *B41J 2/17506* (2013.01); *B41J 2/17546* (2013.01); *B41J 29/38* (2013.01); *G06K 15/402* (2013.01)

(58) Field of Classification Search
  CPC ................ B41J 2/17566; B41J 2/17506; B41J 2/17546; B41J 2002/17569; B41J 29/38; G06K 15/402
  See application file for complete search history.

(56) References Cited

U.S. PATENT DOCUMENTS 9,969,176 B2  5/2018 Sawada et al.
10,836,177 B2 * 11/2020 Miyazawa ............... B41J 29/38
(Continued)

FOREIGN PATENT DOCUMENTS

EP  2 100 738 A1  9/2009
JP  2001-325351 A  11/2001
(Continued)

OTHER PUBLICATIONS

Office Action (Notice of Reasons for Refusal) issued in corresponding Japanese Patent Application No. 2017-252676, dated Apr. 20, 2021.

(Continued)

*Primary Examiner* — Thinh H Nguyen
(74) *Attorney, Agent, or Firm* — Merchant & Gould P.C.

(57) ABSTRACT

In a control device, a controller sets an order condition using a plurality of sets of timing information and a plurality of index values stored in a memory. The plurality of index values is acquired from a recording device under a condition where a first cartridge is mounted in the recording device. The order condition requires that one of a latest index value and a current timing have reached corresponding one of a reference index value and a reference timing, and is set so that a second cartridge is delivered to a predetermined destination at a first timing at which the first cartridge is expected to be out of a printing agent while a tank of the recording device is expected to still accommodate the printing agent. The controller transmits an order command (Continued)

instructing to order the second cartridge to a relevant device after the order condition is satisfied.

20 Claims, 27 Drawing Sheets

(56) References Cited

U.S. PATENT DOCUMENTS

| | | |
|---|---|---|
| 2002/0047871 A1 | 4/2002 | Aruga et al. |
| 2002/0099630 A1 | 7/2002 | Aruga et al. |
| 2016/0292772 A1 | 10/2016 | Nagasaki |
| 2016/0292774 A1* | 10/2016 | Ohara .................. G06F 3/1229 |
| 2017/0061268 A1 | 3/2017 | Miyazawa |

FOREIGN PATENT DOCUMENTS

| | | | |
|---|---|---|---|
| JP | 2002-063434 A | 2/2002 | |
| JP | 2003-15477 A | 1/2003 | |
| JP | 2008-093864 A | 4/2008 | |
| JP | 2016-194903 A | 11/2016 | |
| JP | 2017-47537 A | 3/2017 | |

OTHER PUBLICATIONS

International Search Report and Written Opinion issued in related International Patent Application No. PCT/JP2018/048180, dated Apr. 24, 2019.
Office Action issued in related Japanese Patent Application 2021-174293, dated Nov. 15, 2022.

\* cited by examiner

FIG. 13A  RESIDUAL QUANTITY MANAGEMENT LIST

| ACQUISITION DATE/TIME | TOTAL RESIDUAL PERCENTAGE | TOTAL RESIDUAL QUANTITY | CARTRIDGE RESIDUAL QUANTITY | TANK RESIDUAL QUANTITY | ORDER FLAG | REPLACEMENT COUNT |
|---|---|---|---|---|---|---|
| 2017.06.01 02:00 | 100% | 5000 | 4500 | 500 | OFF | 4 |
| 2017.06.02 02:00 | 100% | 5000 | 4500 | 500 | OFF | 4 |
| 2017.06.03 02:00 | 95% | 4750 | 4275 | 475 | OFF | 4 |
| ... | ... | ... | ... | ... | ... | ... |
| 2017.10.20 02:00 | 10% | 500 | 150 | 350 | ON | 4 |
| 2017.10.21 02:00 | 8% | 400 | 100 | 300 | ON | 4 |
| ... | ... | ... | ... | ... | ... | ... |
| 2017.11.06 02:00 | 3% | 150 | 0 | 150 | ON | 4 |
| 2017.11.07 02:00 | 100% | 5000 | 4500 | 500 | OFF | 5 |

FIG. 13B  CARTRIDGE MANAGEMENT LIST

| PRINTER ID | MODEL NAME | COLOR ID | ORDER DATE/TIME | ORDER FLAG | REPLACEMENT COUNT | CTG-EMPTY RESIDUAL QUANTITY | ADDRESS |
|---|---|---|---|---|---|---|---|
| 001 | MFP-A | C | 2017.10.30 | ON | 5 | 4% | A COMPANY: X-X-X, B,... |
| 002 | MFP-B | M | 2018.01.10 | OFF | 3 | 5% | C OFFICE: Y-Y-Y, D, E-shi... |
| 003 | MFP-B | Y | 2017.12.15 | OFF | 0 | 5% | F FACTORY: Z-Z-Z, G,... |
| ... | ... | ... | ... | ... | ... | ... | ... |

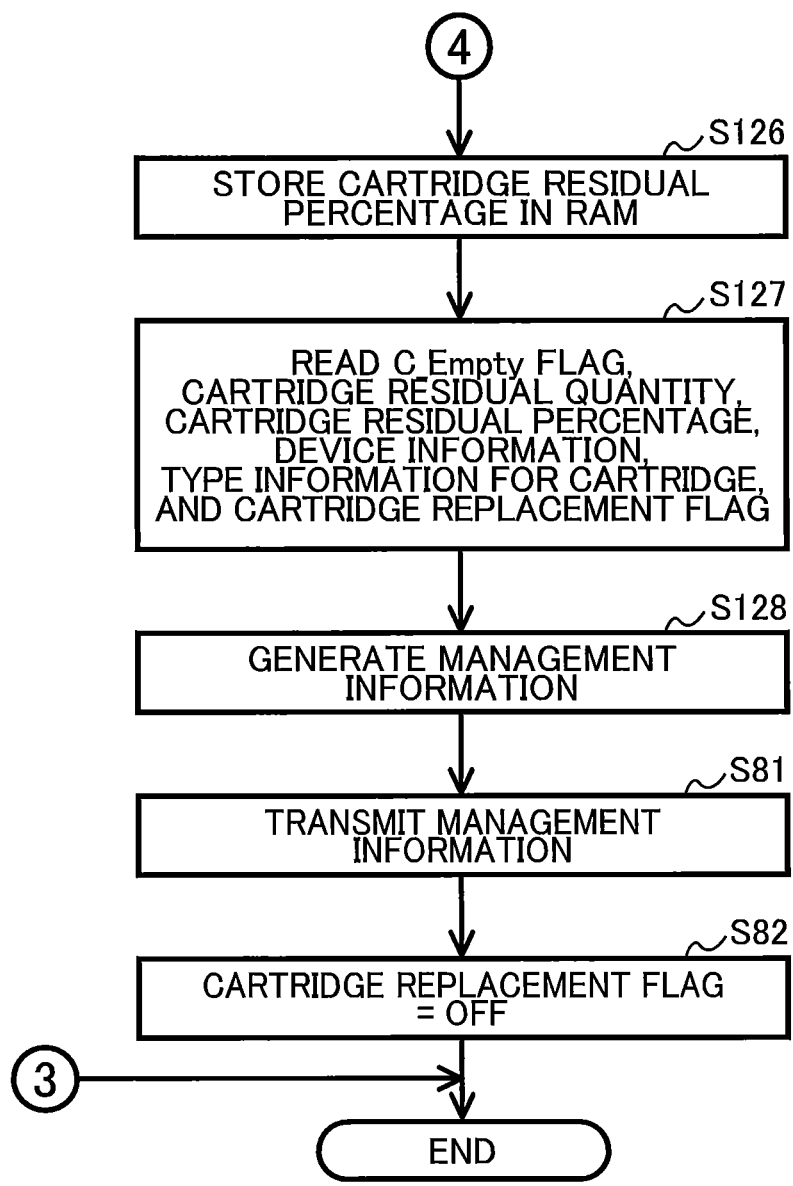

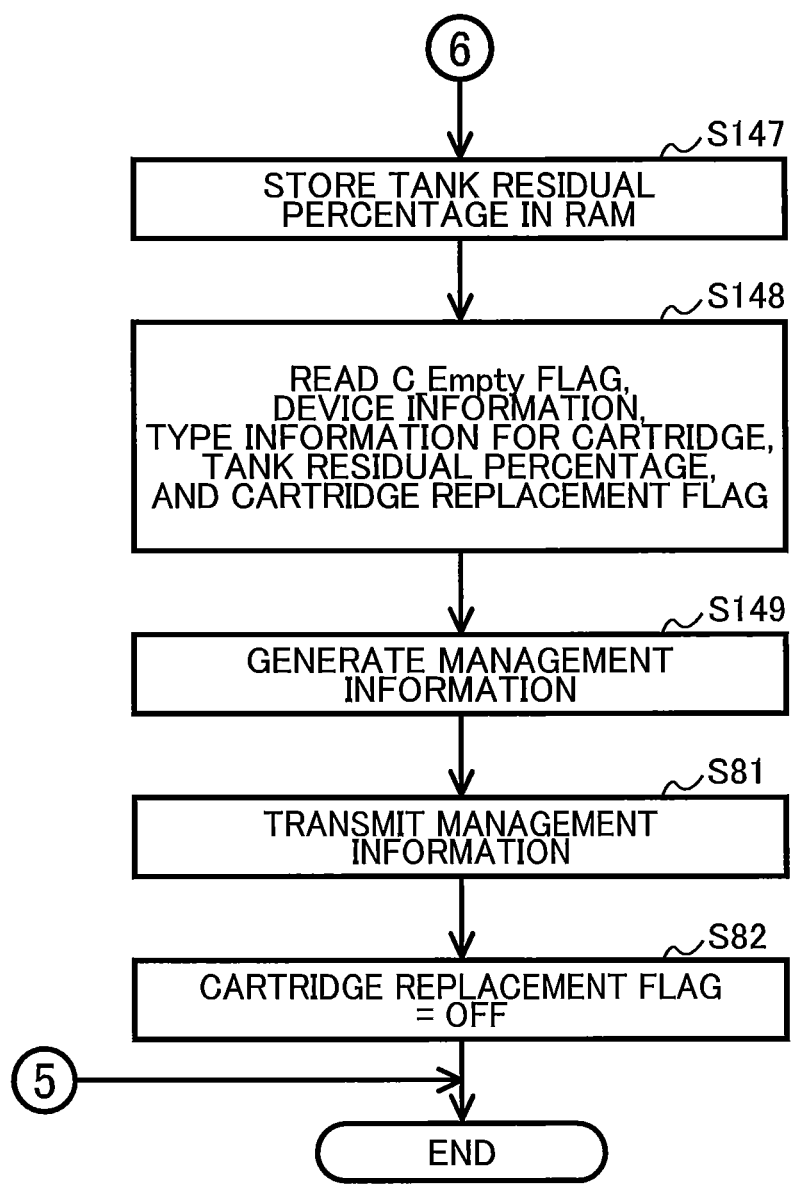

CONTROL DEVICE SETTING ORDER CONDITION FOR ORDERING CARTRIDGE TO BE MOUNTED IN RECORDING DEVICE PROVIDED WITH TANK

CROSS REFERENCE TO RELATED APPLICATION

This application is a continuation of U.S. patent application Ser. No. 16/229,570, filed, Dec. 21, 2018, which claims priority from Japanese Patent Application No. 2017-252676 filed Dec. 27, 2017. The contents of both applications are incorporated herein by reference in their entirety.

TECHNICAL FIELD

The present disclosure relates to a control device and a program for ordering cartridges accommodating a printing agent.

BACKGROUND

Some conventional printers known in the art are capable of placing orders for cartridges that accommodate a developing agent. The printer uses the residual quantity of the developing agent in the cartridge to estimate the day on which printing using the current cartridge will become impossible and sets a signal transmission date for transmitting an order request signal on the basis of the estimated day on which printing will become impossible. The printer sends an order request signal when the current date matches the signal transmission date.

SUMMARY

In order to avoid cases in which the printer becomes unable to print while waiting for a cartridge to be delivered, the printer according to the conventional technology described above ensures that the ordered cartridge will arrive while the cartridge currently mounted in the printer still contains the developing agent. Since it is likely the cartridge will be delivered before the current cartridge mounted in the printer becomes empty, the developing agent in the current cartridge may be wasted when the cartridge is replaced.

In view of the foregoing, it is an object of the present disclosure to provide means for preventing cases in which a printer becomes unable to print while waiting for a new cartridge to arrive and for preventing printing agent from being wasted when a cartridge that still contains printing agent is replaced by a new cartridge.

In order to attain the above and other objects, the present disclosure provides a control device including a controller. The controller is configured to perform (a) acquiring an index value from a recording device at an acquisition timing. The recording device includes: a mounting case; a tank; and a recording portion. A cartridge accommodating a printing agent is mountable in the mounting case. The tank is configured to accommodate the printing agent supplied from the cartridge. The recording portion is configured to record an image on a sheet with the printing agent supplied from the tank. The index value is acquired under a condition where a first cartridge is mounted in the mounting case of the recording device. The index value is representative of a residual quantity of the printing agent remaining in the first cartridge and the tank at the acquisition timing. The controller is configured to further perform: (b) storing the index value in association with timing information about the acquisition timing in a memory; and (c) setting, after performing the (a) acquiring and the (b) storing a plurality of number of times and storing a plurality of index values in the memory in association with a plurality of sets of timing information, an order condition using the plurality of sets of timing information and the plurality of index values stored in the memory. The plurality of index values includes a latest index value acquired at a latest acquisition timing. The order condition requires that one of the latest index value and a current timing have reached corresponding one of a reference index value and a reference timing. The order condition is set so that a second cartridge ordered for replacement with the first cartridge is delivered to a predetermined destination at a first timing by assuming that a time interval between the reference timing and the first timing is a first period of time. The first timing is a timing at which the first cartridge is expected to be out of the printing agent while the tank is expected to still accommodate the printing agent. The first period of time is an expected period of time after the second cartridge has been ordered and delivered to the predetermined destination. The controller is configured to further perform (d) transmitting an order command to a relevant device after the order condition is satisfied. The order command instructs to order the second cartridge.

According to another aspect, the present disclosure provides a non-transitory computer readable storage medium storing a set of program instructions. The set of program instructions is installed on and executed by a computer. The set of program instructions includes (a) acquiring an index value from a recording device at an acquisition timing. The recording device includes: a mounting case; a tank; and a recording portion. A cartridge accommodating a printing agent is mountable in the mounting case. The tank is configured to accommodate the printing agent supplied from the cartridge. The recording portion is configured to record an image on a sheet with the printing agent supplied from the tank. The index value is acquired under a condition where a first cartridge is mounted in the mounting case of the recording device. The index value is representative of a residual quantity of the printing agent remaining in the first cartridge and the tank at the acquisition timing. The set of program instructions further includes: (b) storing the index value in association with timing information about the acquisition timing in a memory; and (c) setting, after performing the (a) acquiring and the (b) storing a plurality of number of times and storing a plurality of index values in the memory in association with a plurality of sets of timing information, an order condition using the plurality of sets of timing information and the plurality of index values stored in the memory. The plurality of index values includes a latest index value acquired at a latest acquisition timing. The order condition requires that one of the latest index value and a current timing have reached corresponding one of a reference index value and a reference timing. The order condition is set so that a second cartridge ordered for replacement with the first cartridge is delivered to a predetermined destination at a first timing by assuming that a time interval between the reference timing and the first timing is a first period of time (delivery lead time), the first timing being a timing at which the first cartridge is expected to be out of the printing agent while the tank is expected to still accommodate the printing agent. The first period of time is an expected period of time after the second cartridge has been ordered and delivered to the predetermined destination. The set of program instructions further includes (d) transmitting an order command to a relevant device after the order condition is satisfied. The order command instructs to order the second cartridge.

According to still another aspect, the present disclosure provides a method executed by a computer for placing an order for a cartridge to be mounted in a recording device. The recording device includes: a mounting case; a tank; and a recording portion. The cartridge accommodating a printing agent is mountable in the mounting case. The tank is configured to accommodate the printing agent supplied from the cartridge. The recording portion is configured to record an image on a sheet with the printing agent supplied from the tank. The method includes (a) acquiring an index value from the recording device at an acquisition timing. The index value is acquired under a condition where a first cartridge is mounted in the mounting case of the recording device. The index value is representative of a residual quantity of the printing agent remaining in the first cartridge and the tank at the acquisition timing. The method further includes: (b) storing the index value in association with timing information about the acquisition timing in a memory; and (c) setting, after performing the (a) acquiring and the (b) storing a plurality of number of times and storing a plurality of index values in the memory in association with a plurality of sets of timing information, an order condition using the plurality of sets of timing information and the plurality of index values stored in the memory. The plurality of index values includes a latest index value acquired at a latest acquisition timing. The order condition requires that one of the latest index value and a current timing have reached corresponding one of a reference index value and a reference timing. The order condition is set so that a second cartridge ordered for replacement with the first cartridge is delivered to a predetermined destination at a first timing by assuming that a time interval between the reference timing and the first timing is a first period of time (delivery lead time), the first timing being a timing at which the first cartridge is expected to be out of the printing agent while the tank is expected to still accommodate the printing agent. The first period of time is an expected period of time after the second cartridge has been ordered and delivered to the predetermined destination. The method further includes (d) transmitting an order command to a relevant device after the order condition is satisfied. The order command instructs to order the second cartridge.

BRIEF DESCRIPTION OF THE DRAWINGS

The particular features and advantages of the disclosure as well as other objects will become apparent from the following description taken in connection with the accompanying drawings, in which:

FIG. 13A is an explanatory diagram illustrating an example of a residual quantity management list stored in a storage unit of the information collection server according to the embodiments;

FIG. 13B is an explanatory diagram illustrating an example of a cartridge management list stored in the storage unit of the information collection server according to the embodiments;

FIG. 16B is a flowchart illustrating a remaining part of steps in the management information transmission process executed by the controller of the printer according to the fourth modification;

FIG. 17B is a flowchart illustrating a remaining part of steps in the management information transmission process executed by the controller of the printer according to the fifth modification;

DETAILED DESCRIPTION

Next, embodiments of the present disclosure will be described while referring to the accompanying drawings. Note that the embodiments described below are merely examples of the disclosure and may be modified in many ways without departing from the spirit of the disclosure, the scope of which is defined by the attached claims. Further, the order in which each of the processes described below are executed may be modified as desired without departing from the spirit of the disclosure.

Figure 1:
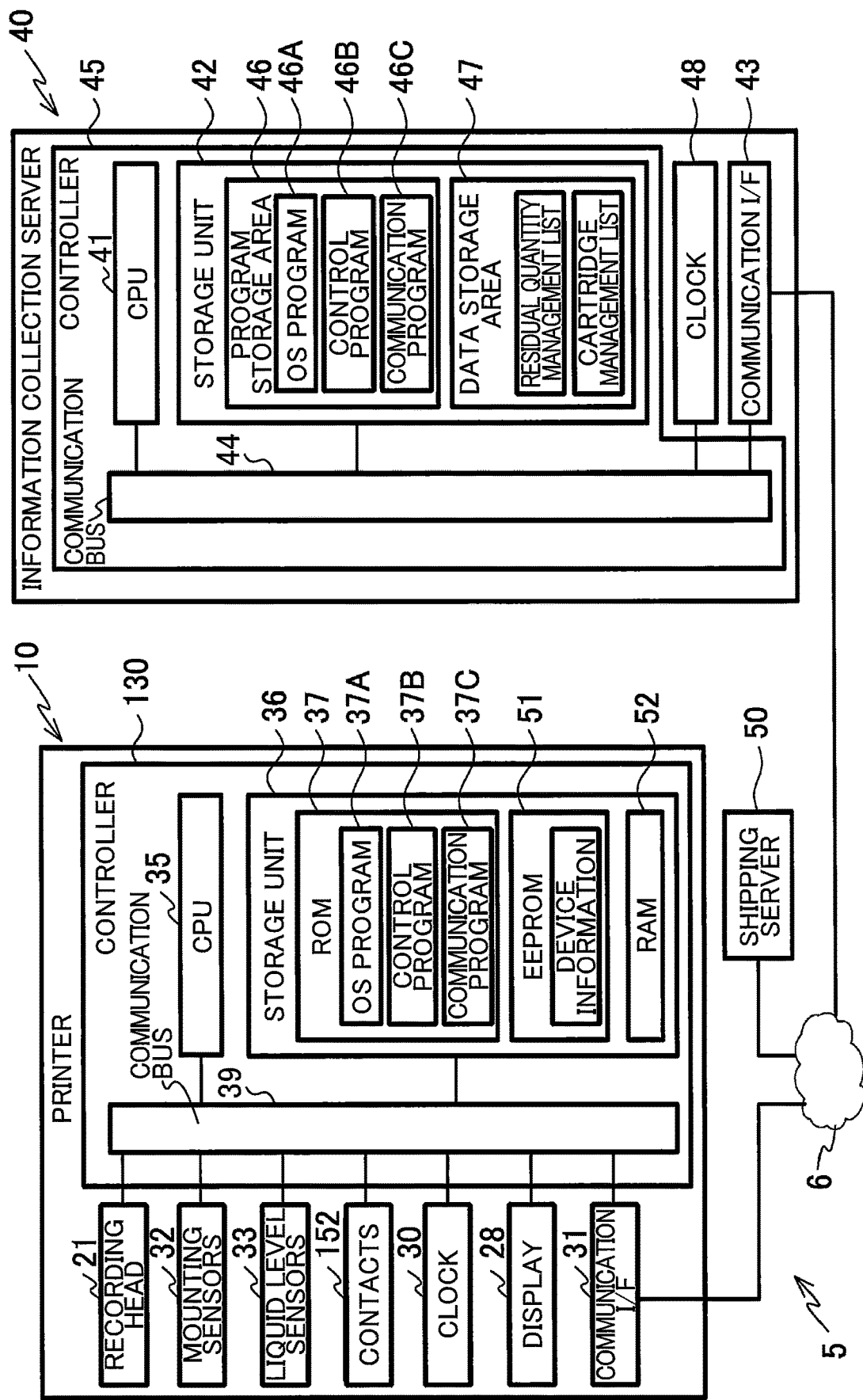
FIG. 1 is a block diagram illustrating an ordering system provided with a printer and an information collection server according to embodiments of the present disclosure.

FIG. 1 illustrates an ordering system 5. The ordering system 5 is provided with one or a plurality of printers 10, and an information collection server 40 that collects information from the one or plurality of printers 10. The printer 10 and information collection server 40 are connected to each other through a communication circuit 6, such as the Internet. The printer 10 and information collection server 40 can communicate with each other using a communication protocol, such as Transmission Control Protocol/Internet Protocol (TCP/IP). The information collection server 40 can also transmit information via the communication circuit 6 to a shipping server 50 that receives orders. The information collection server 40 is an example of the control device and the computer of the present disclosure. The printer 10 is an example of the image recording apparatus of the present disclosure.

<Overview of the Printer 10>

Figure 2A:
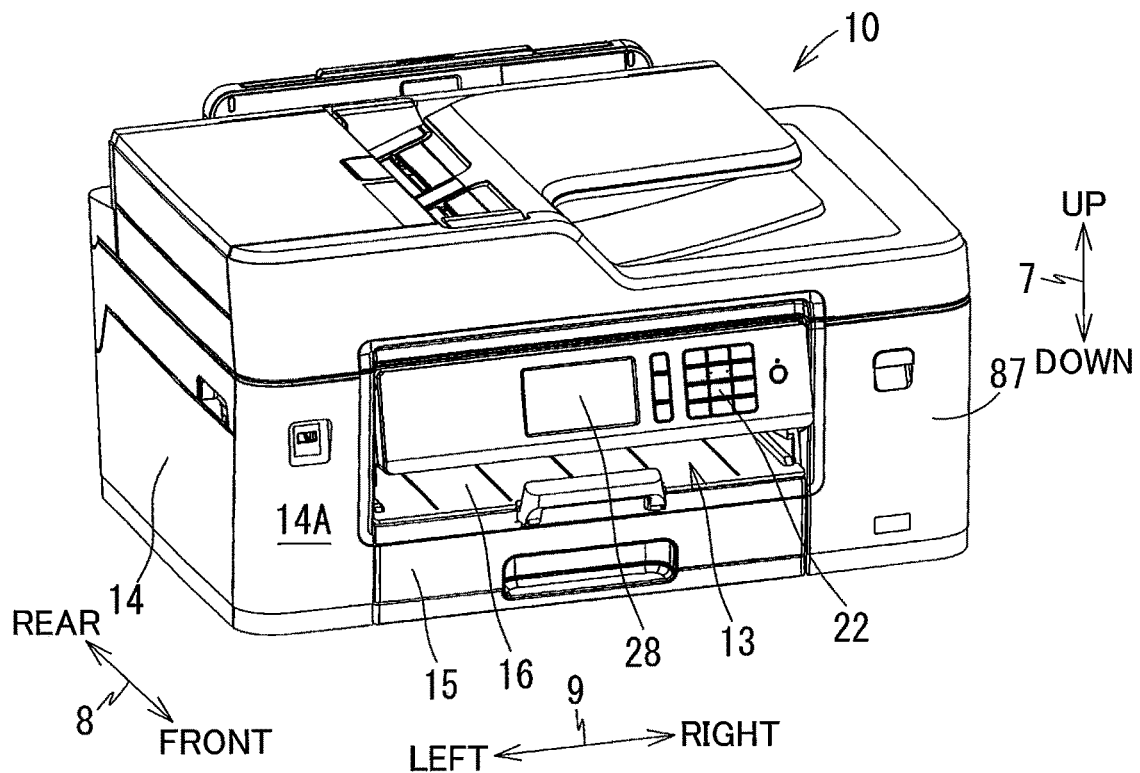
FIG. 2A is a perspective view of the printer according to the embodiments, and illustrating a closed position of a cover.
Figure 2B:
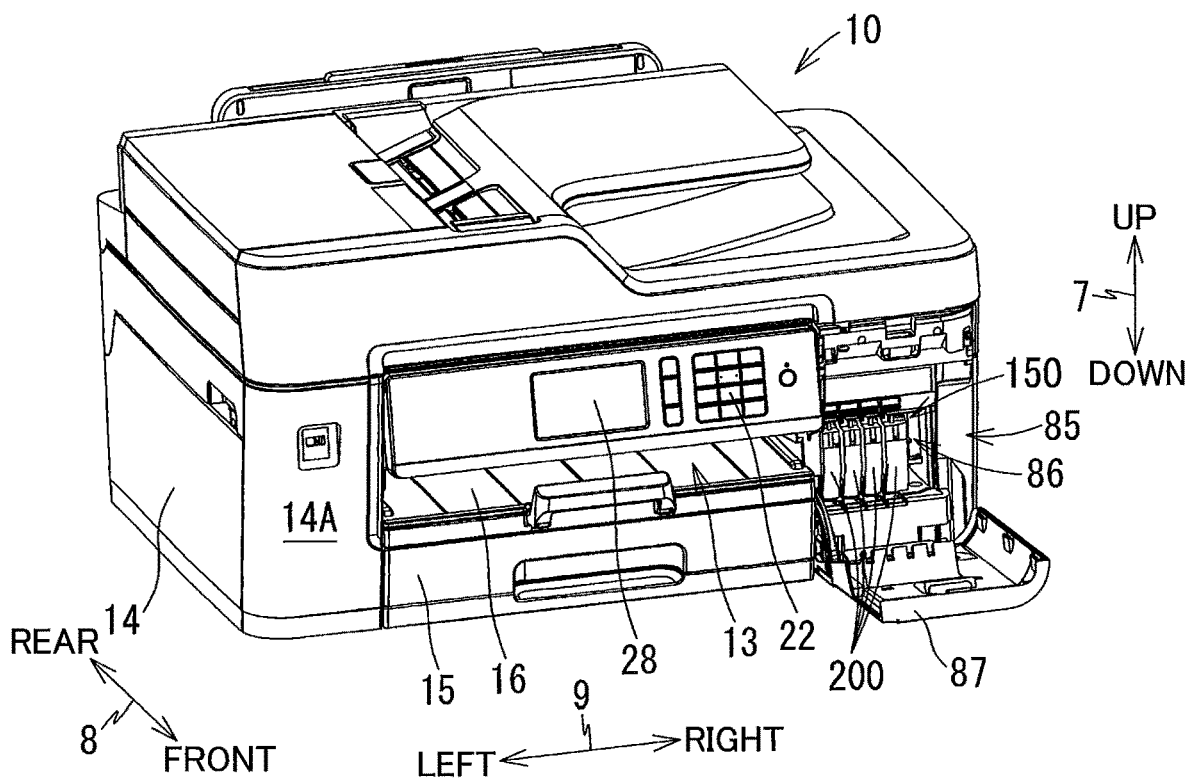
FIG. 2B is a perspective view of the printer according to the embodiments, and illustrating an open position of the cover.

The printer 10 illustrated in FIGS. 2A and 2B is an inkjet printer that records images on sheets by ejecting ink droplets. The printer 10 may be a multifunction peripheral possessing various functions, such as a facsimile function, a scan function, and a copy function, and the like.

In the following description, front, rear, left, and right directions related to the printer 10 will be referred to as assuming that the printer 10 is disposed on a horizontal plane so as to be operable, as illustrated in FIG. 2A. Note that this posture of the printer 10 illustrated in FIG. 2A will be referred to as an "operable posture". Specifically, an up-down direction 7 of the printer 10 is defined on the basis of the operable posture of the printer 10. A front-rear direction 8 is defined such that a surface of the printer 10 in which an opening 13 is formed constitutes a front surface. A left-right direction 9 is defined on the basis of an assumption that the printer 10 in the operable posture is viewed from its front surface. In other words, in the operable posture of the printer 10, the up-down direction 7 corresponds to a vertical direction, and the front-rear direction 8 and left-right direction 9 correspond to horizontal directions. The front-rear direction 8 and left-right direction 9 are orthogonal to each other.

As illustrated in FIGS. 2A and 2B, the printer 10 is configured with a box-like housing 14. The opening 13 is formed in a front surface 14A of the housing 14 and is recessed inward into the housing 14. A feed tray 15 is disposed inside the housing 14 in the bottom of the opening 13. The feed tray 15 supports a plurality of sheets in a stacked state. A discharge tray 16 is provided above the feed tray 15. The discharge tray 16 supports sheets that have undergone image recording.

Figure 3:
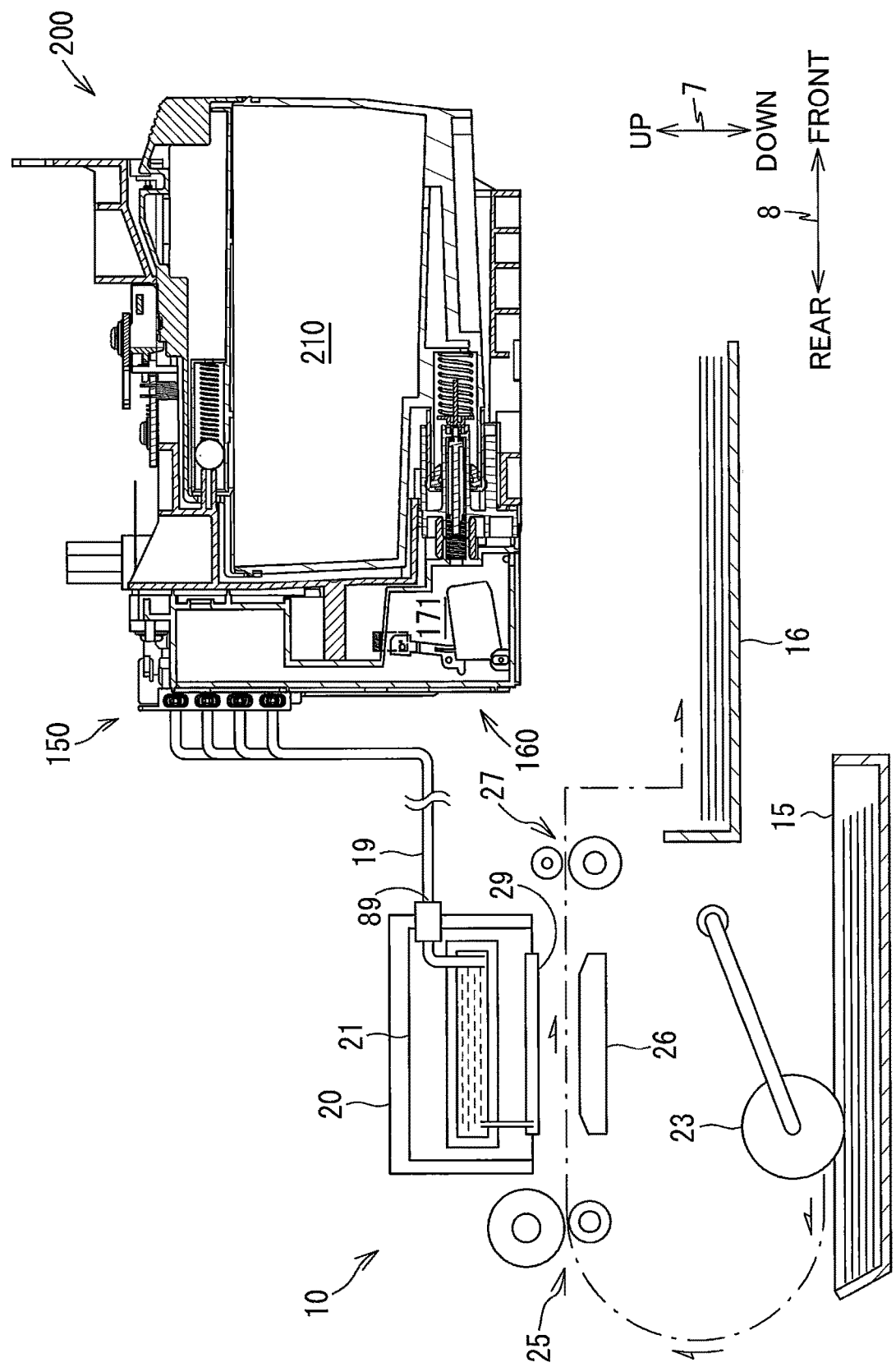
FIG. 3 is a vertical cross-sectional view schematically illustrating an internal configuration of the printer according to the embodiments.

As illustrated in FIG. 3, a feed roller 23, a pair of conveying rollers 25, a recording head 21, and a pair of discharge rollers 27 are disposed inside the housing 14. The printer 10 also includes ink tanks 160 that supply ink to the recording head 21 through tubes 19. The printer 10 drives the feed roller 23 and conveying rollers 25 to convey sheets from the feed tray 15 to a position over a platen 26 that opposes the recording head 21. Next, the printer 10 controls the recording head 21 to eject ink through nozzles 29. The ink impacts the sheet supported on the platen 26 to record images on the sheet. Subsequently, the printer 10 drives the discharge rollers 27 to discharge the recorded sheet onto the discharge tray 16. The ink is an example of the printing agent of the present disclosure. The head 21 is an example of the recording portion of the present disclosure.

More specifically, the recording head 21 is supported in a carriage 20. The carriage 20 reciprocates along a main scanning direction (parallel to the left-right direction 9) that intersects the direction that the conveying rollers 25 convey the sheets. A motor (not illustrated) transmits a drive force to the carriage 20 for moving the carriage 20 in the main scanning direction (a direction perpendicular to the surface of the drawing in FIG. 3). While the conveying rollers 25 has halted conveyance of the sheet, the printer 10 moves the carriage 20 in the main scanning direction and controls the recording head 21 to eject ink through the nozzles 29, thereby recording an image in a region constituting the portion of the sheet opposing the recording head 21 (hereinafter also referred to as "one pass"). Next, the printer 10 controls the conveying rollers 25 to convey the sheet so that the next region to be recorded opposes the recording head 21. By repeatedly and alternatingly performing these processes of recording and conveying, the printer 10 records an image on one sheet.

<Display 28>

As illustrated in FIGS. 2A and 2B, the housing 14 also has a display 28 and an operating panel 22 disposed on the front surface 14A of the housing 14. However, a touchscreen configured of touch sensors arranged over a display panel, or a display panel and push buttons along with or in place of the display 28 may be provided on the front surface 14A of the housing 14 in place of the display 28 and operating panel 22. The operating panel 22 receives input from the user.

<Cover 87>

As illustrated in FIG. 2B, an opening 85 is formed in the front surface 14A of the housing 14 at the right end thereof. The housing 14 is also provided with a cover 87. The cover 87 is supported on the housing 14 near the bottom edge of the same and can pivot about a pivot axis extending in the left-right direction 9. The cover 87 is pivotable between a closed position (the position illustrated in FIG. 2A) for covering the opening 95, and an open position (the position illustrated in FIG. 2B) for exposing the opening 85. An accommodating space 86 is formed in the housing 14, expanding into the housing 14 from the opening 85. A mounting case 150 is positioned in the accommodating space 86. Cartridges 200 are detachably mounted in the mounting case 150.

<Mounting Case 150>

Figure 4:
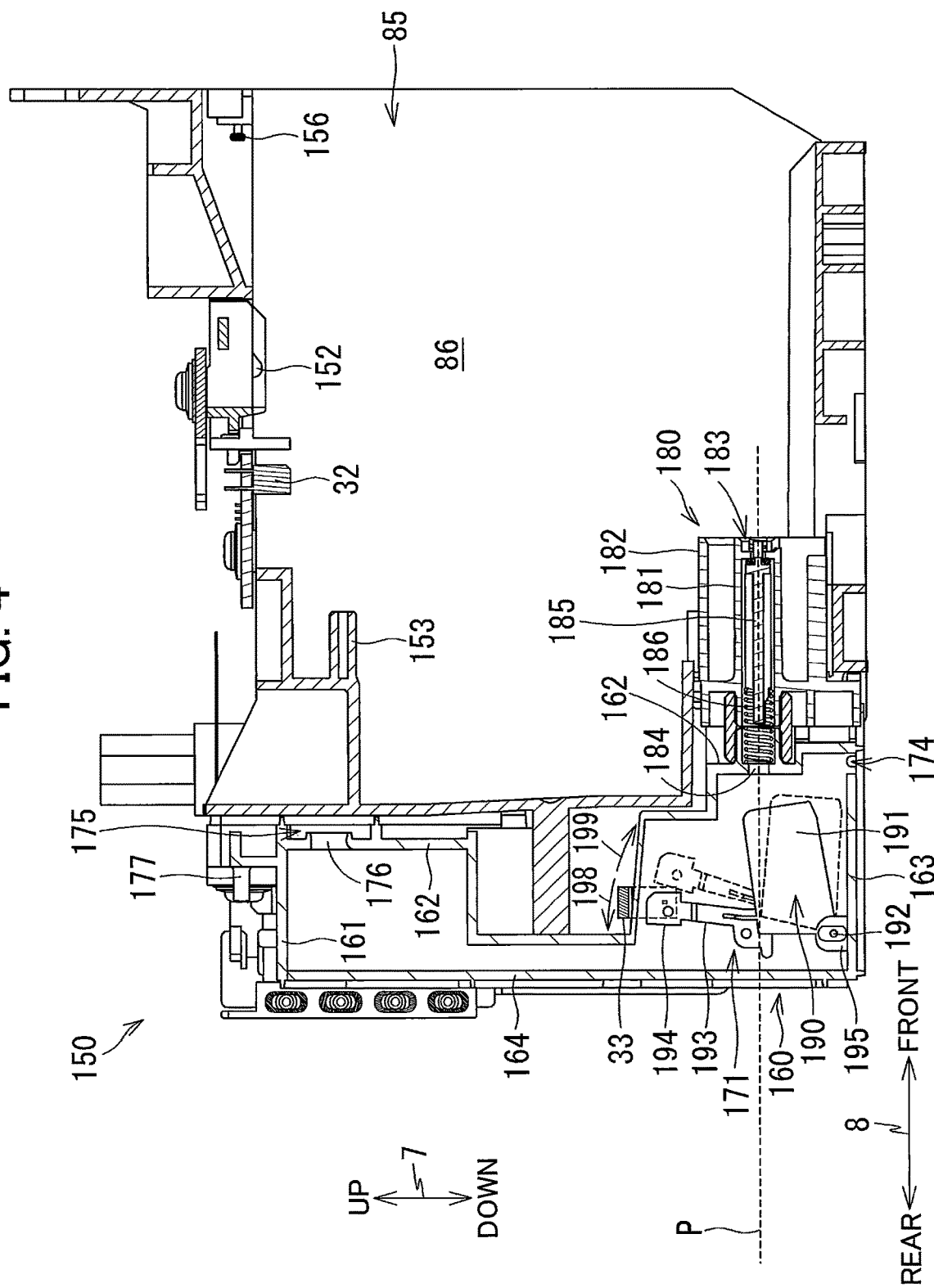
FIG. 4 is a vertical cross-sectional view illustrating a mounting case of the printer according to the embodiments.

As illustrated in FIG. 4, the mounting case 150 is provided with contacts 152, rods 153, mounting sensors 32, liquid level sensors 33, and a locking pin 156. The mounting case 150 can accommodate four of the cartridges 200 for the corresponding colors black, cyan, magenta, and yellow. In other words, the mounting case 150 is provided with four each of the contacts 152, rods 153, mounting sensors 32, and liquid level sensors 33 to correspond to the four cartridges 200. Note that the number of cartridges 200 that can be accommodated in the mounting case 150 is not limited to four, but may be one, or five or more.

The mounting case 150 has a box shape with an interior space for accommodating the cartridges 200. The interior space of the mounting case 150 is defined by a top wall enclosing the top side of the interior space, a bottom wall enclosing the bottom side of the interior space, a rear wall enclosing the rear side of the interior space, and a pair of side walls enclosing the left and right sides of the interior space. The opening 85 is formed in the front side of the mounting case 150 opposing the rear wall. In other words, when the cover 87 is placed in the open position, the opening 85 exposes the interior space of the mounting case 150 to the outside of the printer 10.

The cartridges 200 are mounted in the mounting case 150 and removed from the mounting case 150 through the opening 85 formed in the housing 14. More specifically, the cartridges 200 pass through the opening 85 rearward when mounted in the mounting case 150 and pass through the opening 85 forward when removed from the mounting case 150. The cartridge 200 mounted in the mounting case 150 is an example of the first cartridge of the present disclosure.

<Contacts 152>

The contacts 152 are disposed on the top wall of the mounting case 150. The contacts 152 protrude downward from the top wall into the interior space of the mounting case 150. The contacts 152 are disposed in positions for contacting electrodes 248 (described later) of the corresponding cartridges 200 when the cartridges 200 are in their mounted states in the mounting case 150. The contacts 152 are electrically conductive and capable of elastically deforming in the up-down direction 7. The contacts 152 are electrically connected to a controller 130 described later.

<Rods 153>

The rods 153 protrude forward from the rear wall of the mounting case 150. The rods 153 are disposed in positions along the rear wall of the mounting case 150 above corresponding joints 180 (described later). As a cartridge 200 is mounted in the mounting case 150, the corresponding rod 153 is inserted into a corresponding air valve chamber 214 (described later) through a corresponding air communication port 221 (described later) of the cartridge 200. When the rod 153 advances into the air valve chamber 214, the air valve chamber 214 becomes able to communicate with the atmosphere.

<Mounting Sensors 32>

The mounting sensors 32 are disposed on the top wall of the mounting case 150 for detecting whether corresponding cartridges 200 are mounted in the mounting case 150. Each mounting sensor 32 is provided with a light-emitting part and a light-receiving part that are separated from each other in the left-right direction 9. When a cartridge 200 is mounted in the mounting case 150, a light-blocking rib 245 (described later) on the cartridge 200 is positioned between the light-emitting part and light-receiving part of the corresponding mounting sensor 32. In other words, the light-emitting part and light-receiving part of the mounting sensor 32 are positioned in a state opposing each other on opposite sides of the light-blocking rib 245 provided on the cartridge 200 mounted in the mounting case 150.

The mounting sensor 32 outputs a different signal (hereinafter called a "mounting signal") depending on whether the light emitted from the light-emitting part in the left-right direction 9 is received by the light-receiving part. The mounting sensor 32 outputs a low level signal to the controller 130 when the intensity of light received by the light-receiving part is less than a threshold intensity, for example. The mounting sensor 32 outputs a high level signal having a greater signal intensity than the low level signal to the controller 130 when the intensity of light received by the light-receiving part is greater than or equal to the threshold intensity.

<Liquid Level Sensors 33>

Each of the liquid level sensors 33 is provided for detecting whether a detectable part 194 of a corresponding actuator 190 described later is at a detection position. The liquid level sensor 33 is provided with a light-emitting part and a light-receiving part that are separated from each other in the left-right direction 9. In other words, when the detectable part 194 is in the detection position, the detectable part 194 is disposed between the light-emitting part and light-receiving part of the corresponding liquid level sensor 33. On the other hand, when the detectable part 194 is not in the detection position, the detectable part 194 is not interposed between the light-emitting part and light-receiving part of the liquid level sensor 33. The liquid level sensor 33 outputs a different signal (hereinafter called a "liquid level signal") depending on whether the light-receiving part has received light outputted from the light-emitting part. For example, the liquid level sensor 33 outputs a low level signal to the controller 130 when the intensity of light received by the light-receiving part is less than a threshold intensity and outputs a high level signal having a greater signal intensity than the low level signal to the controller 130 when the intensity of light received by the light-receiving part is greater than or equal to the threshold intensity.

<Locking Pin 156>

Figure 6:
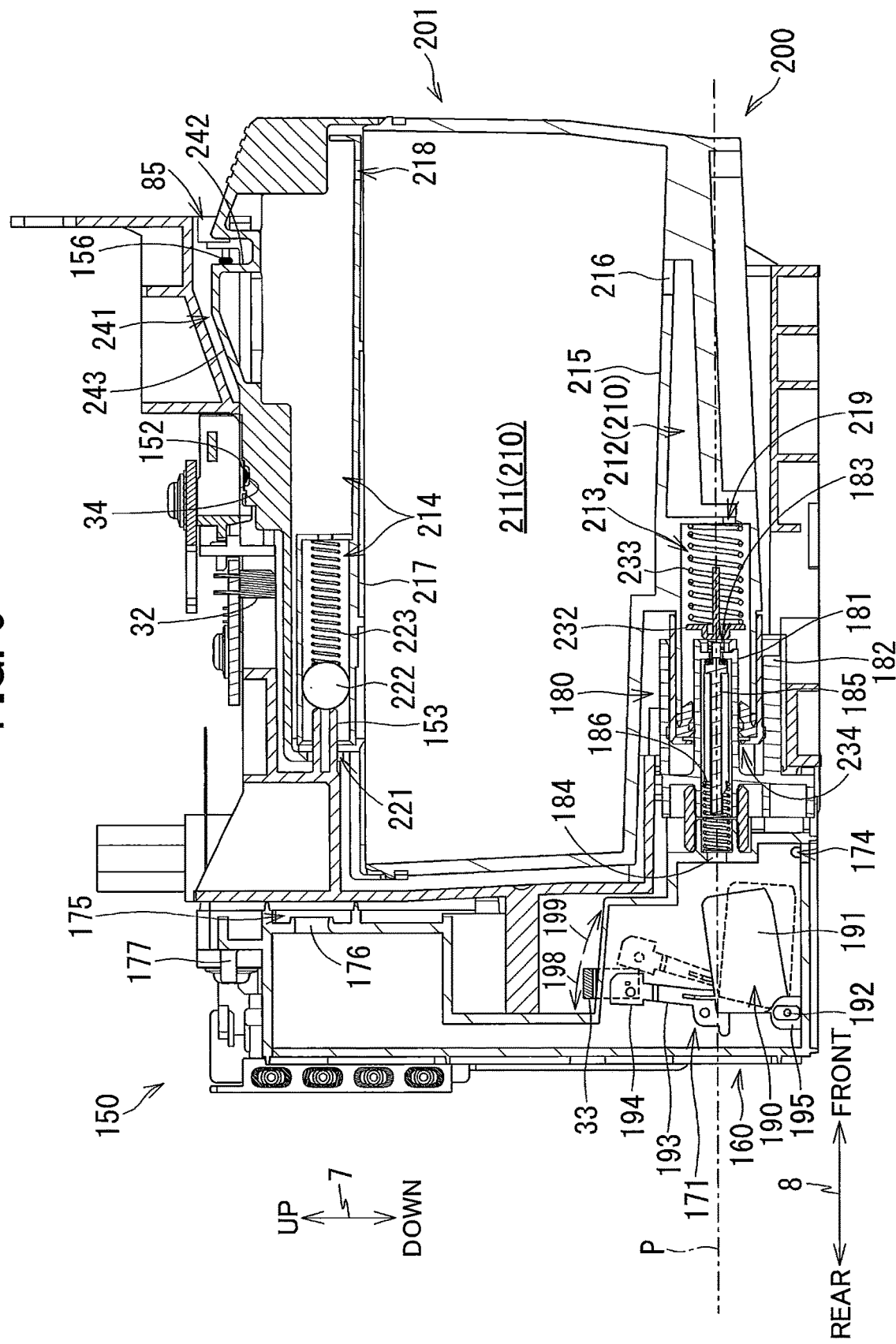
FIG. 6 is a vertical cross-sectional view of the mounting case in which the cartridge is mounted in the printer according to the embodiments.

The locking pin 156 is a rod-shaped member that extends in the left-right direction 9 through the upper portion of the interior space in the mounting case 150 and near the opening 85. The ends of the locking pin 156 in the left-right direction 9 are fixed in the corresponding side walls of the mounting case 150. The locking pin 156 extends in the left-right direction 9 through the four spaces for accommodating the four cartridges 200. When the cartridges 200 are mounted in the mounting case 150, the locking pin 156 functions to retain the cartridges 200 in their mounted positions illustrated in FIG. 6. The cartridges 200 are fixed to the locking pin 156 when in their mounted states in the mounting case 150.

<Ink Tanks 160>

The printer 10 is provided with four ink tanks 160 corresponding to the four cartridges 200. Specifically, the printer 10 is provided with an ink tank 160 that accommodates magenta ink to correspond with the cartridge 200 that accommodates magenta ink, an ink tank 160 that accommodates cyan ink to correspond to the cartridge 200 that accommodates cyan ink, an ink tank 160 that accommodates yellow ink to correspond to the cartridge 200 that accommodates yellow ink, and an ink tank 160 that accommodates black ink to correspond to the cartridge 200 that accommodates black ink. Since the four ink tanks 160 share the same general structures, only one of the ink tanks 160 is described below. The ink tank 160 is an example of the tank of the present disclosure.

The ink tanks 160 are positioned rearward of the rear wall constituting the mounting case 150. As illustrated in FIG. 4, each ink tank 160 is configured of a top wall 161, a front wall 162, a bottom wall 163, a rear wall 164, and a pair of side walls (not illustrated). Note that the front wall 162 is configured of a plurality of walls offset from each other in the front-rear direction 8. A liquid chamber 171 is formed inside each ink tank 160. The liquid chamber 171 is an example of the second chamber of the present disclosure.

Of the walls constituting the ink tank 160, at least the wall confronting the liquid level sensor 33 is translucent. Accordingly, light outputted by the liquid level sensor 33 can pass through the wall confronting the liquid level sensor 33. At least part of the rear wall 164 may be a film that is affixed to the rear edges of the top wall 161, bottom wall 163, and side walls. The side walls of the ink tank 160 may be shared with the side walls of the mounting case 150 or may be provided independently of the mounting case 150. Further, the ink tanks 160 are separated from each other by partitions (not illustrated) disposed between ink tanks 160 neighboring each other in the left-right direction 9.

The liquid chamber 171 is in communication with an ink channel (not illustrated) through an outlet 174. The bottom end of the outlet 174 is defined in the bottom wall 163 that defines the bottom of the liquid chamber 171. The outlet 174 is positioned lower than a corresponding joint 180 (and specifically, the bottom end of a through-hole 184; described later). The ink channel that communicates with the outlet 174 is also in communication with the corresponding tube 19. With this configuration, the liquid chamber 171 communicates with the recording head 21 via the ink channel leading from the outlet 174, and the tube 19. Hence, ink accommodated in the liquid chamber 171 is supplied to the recording head 21 through the ink channel leading from the outlet 174, and the tube 19. One end of the ink channel and tube 19 that communicates with the outlet 174 (the end at the outlet 174) is in communication with the liquid chamber 171, while another end 89 (see FIG. 3) is in communication with the recording head 21.

The liquid chamber 171 is in communication with the atmosphere via an air communication chamber 175. More specifically, the air communication chamber 175 is in communication with the liquid chamber 171 via a through-hole 176 that penetrates the front wall 162. The air communication chamber 175 is also in communication with the exterior of the printer 10 through an air communication port 177 and a tube (not illustrated) connected to the air communication port 177. That is, one end of the air communication chamber 175 (the end at the through-hole 176) is in communication with the liquid chamber 171, while the other end (the end at the air communication port 177) is in communication with the exterior of the printer 10. Thus, the air communication chamber 175 communicates with the atmosphere through the air communication port 177 and the tube.

<Joints 180>

As illustrated in FIG. 4, the mounting case 150 is provided with joints 180 to correspond to the four cartridges 200. Each joint 180 is provided with a needle 181, and a guide 182. The needle 181 is a tube with a channel formed in the interior thereof. The needle 181 protrudes forward from the front wall 162 defining the liquid chamber 171. An opening 183 is formed in the front end of the needle 181. The interior space of the needle 181 is in communication with the liquid chamber 171 via a through-hole 184 that penetrates the front wall 162. One end of the needle 181 (the end with the opening 183) communicates with the outside of the ink tank 160, and the other end (the end adjacent to the through-hole 184) communicates with the liquid chamber 171. The guide 182 is a cylindrically shaped member arranged around the needle 181. The guide 182 protrudes forward from the front wall 162 and is open on the front end.

A valve 185 and a coil spring 186 are positioned in the interior space of the needle 181. The valve 185 can move in the front-rear direction 8 within the interior space of the needle 181 between a closed position and an open position. The valve 185 closes the opening 183 when in the closed position and opens the opening 183 when in the open position. The coil spring 186 urges the valve 185 forward, i.e., in a direction for moving the valve 185 from its open position to its closed position.

<Actuator 190>

As illustrated in FIG. 4, an actuator 190 is disposed in each liquid chamber 171.

Support member 195 disposed in the liquid chamber 171 supports the actuator 190 so that the actuator 190 can pivot in directions indicated by the arrows 198 and 199. The actuator 190 can pivot between the position indicated by solid lines in FIG. 4 and the position indicated by dashed lines. A stopper (not illustrated), such as the inner wall of the liquid chamber 171, restricts the actuator 190 from pivoting farther in the direction indicated by the arrow 198 from the position indicated by solid lines. The actuator 190 is provided with a float 191, shafts 192, an arm 193, and a detectable part 194.

The float 191 is formed of a material having a smaller specific gravity than that of the ink accommodated in the liquid chamber 171. The shafts 192 protrude outward in the left-right direction 9 from the right surface and left surface of the float 191. The shafts 192 are inserted into holes (not illustrated) formed in the support member 195. Through this configuration, the actuator 190 is supported by the support member 195 so as to be pivotable about the shafts 192. The arm 193 extends substantially upward from the float 191.

The detectable part 194 is positioned on the distal end of the arm 193. Hence, the arm 193 is positioned between the detectable part 194 and float 191. The detectable part 194 is a plate-like member expanding in the up-down direction 7 and front-rear direction 8. The detectable part 194 is formed of a material or in a color that blocks light outputted from the light-emitting part of the liquid level sensor 33.

When the level of ink in the liquid chamber 171 is at a reference position P or higher, the buoyancy exerted on the float 191 causes the actuator 190 to pivot in the direction of the arrow 198 while the stopper maintains the actuator 190 in a detection position indicated by the solid lines illustrated in FIG. 4. However, when the level of ink is lower than the reference position P, the actuator 190 pivots in the direction indicated by the arrow 199 as the ink level drops. Consequently, the detectable part 194 of the actuator 190 gradually moves out of the detection position. Since the detectable part 194 is part of the actuator 190, the position of the detectable part 194 is dependent on the quantity of ink accommodated in the liquid chamber 171.

The reference position P is the same position in the up-down direction 7 as that of the axial center of the needle 181. The reference position P is also the same position in the up-down direction 7 as that of the center of an ink supply opening 234 described later. However, the reference position P is not limited to the position described above, provided that the reference position P is set higher than the outlet 174 in the up-down direction 7. As an example, the reference position P may be set to the height of the top or bottom of the interior space in the needle 181 or may be set to the height of the top or bottom of the ink supply opening 234.

When the level of ink accommodated in the liquid chamber 171 is at the reference position P or higher, light outputted from the light-emitting part of the liquid level sensor 33 is blocked by the detectable part 194 since the detectable part 194 is in the detection position. Consequently, the light from the light-emitting part does not reach the light-receiving part, and the liquid level sensor 33 outputs a low level signal to the controller 130. However, when the level of ink accommodated in the liquid chamber 171 is lower than the reference position P, the light outputted from the light-emitting part reaches the light-receiving part, and the liquid level sensor 33 outputs a high level signal to the controller 130. In this way, the controller 130 can detect whether the ink level in the liquid chamber 171 is greater than or equal to the reference position P according to the liquid level signal outputted from the liquid level sensor 33. The ink tank 160, mounting case 150, and recording head 21 are an example of the recording device of the present disclosure.

<Cartridges 200>

The cartridge 200 is a receptacle having a liquid chamber 210 (see FIG. 3) that can accommodate ink as an example of the printing agent. The liquid chamber 210 is an example of the first chamber of the present disclosure.

Figure 5A:
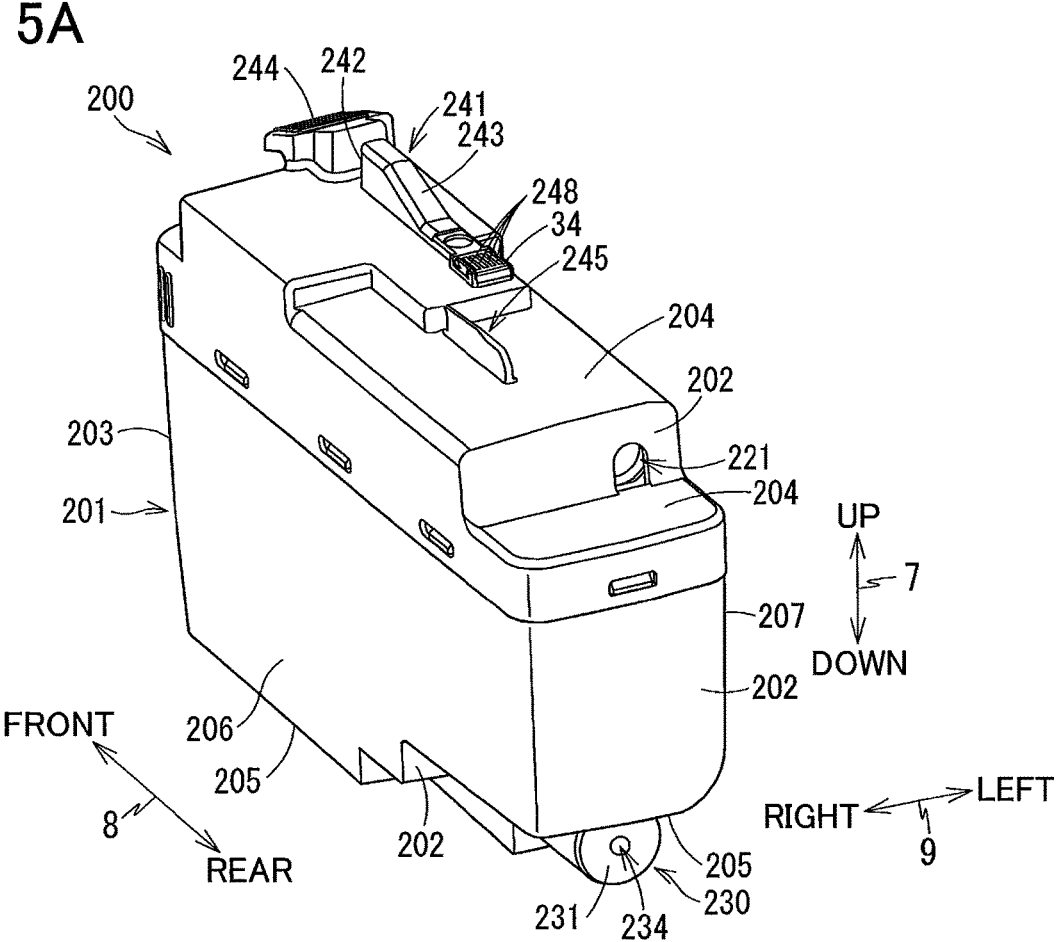
FIG. 5A is a perspective view of a cartridge as viewed from a rear side of the cartridge in the printer according to the embodiments.

The liquid chamber 210 is defined by walls formed of a resin material, for example. As illustrated in FIG. 5A, the cartridge 200 is formed in a flattened shape, whereby its dimensions in the up-down direction 7 and front-rear direction 8 are greater than the dimension in the left-right direction 9. Cartridges 200 that store different colors of ink may be formed in the same external shape or different external shapes. At least a portion of the walls configuring the cartridge 200 is translucent, enabling a user to view the level of ink accommodated in the liquid chamber 210 of the cartridge 200 from the outside.

The cartridge 200 is provided with a housing 201, and an ink supply tube 230. The housing 201 is configured of a rear wall 202, a front wall 203, a top wall 204, a bottom wall 205, and a pair of side walls 206 and 207. Note that the rear wall 202 is configured of a plurality of walls offset from each other in the front-rear direction 8. The top wall 204 is also configured of a plurality of walls that are offset from each other in the up-down direction 7. Similarly, the bottom wall 205 is configured of a plurality of walls that are offset from each other in the up-down direction 7.

Figure 5B:
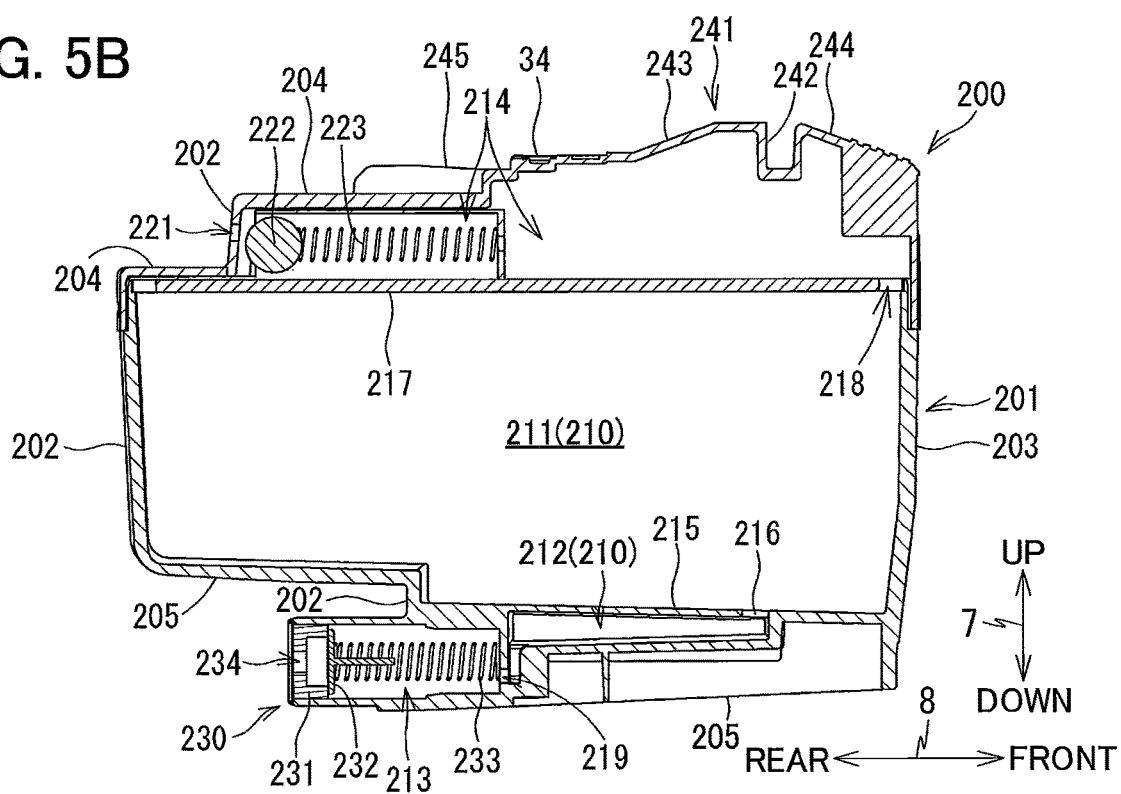
FIG. 5B is a vertical cross-sectional view of the cartridge in the printer according to the embodiments.

As illustrated in FIG. 5B, the liquid chamber 210, an ink valve chamber 213, and an air valve chamber 214 are formed in the interior space of the cartridge 200. The liquid chamber 210 has an upper liquid chamber 211, and a lower liquid chamber 212. The upper liquid chamber 211, lower liquid chamber 212, and air valve chamber 214 constitute the interior space of the housing 201. The ink valve chamber 213 constitutes the interior space of the ink supply tube 230. The liquid chamber 210 accommodates ink. The air valve chamber 214 provides communication between the liquid chamber 210 and the exterior of the cartridge 200.

The upper liquid chamber 211 and lower liquid chamber 212 of the liquid chamber 210 are separated from each other in the up-down direction 7 by a partitioning wall 215 that divides the interior space of the housing 201. The upper liquid chamber 211 and lower liquid chamber 212 are in communication via a through-hole 216 formed in the partitioning wall 215. The upper liquid chamber 211 and air valve chamber 214 are separated from each other by a partitioning wall 217 that divides the interior space of the housing 201. The upper liquid chamber 211 and air valve chamber 214 are in communication with each other via a through-hole 218 formed in the partitioning wall 217. In addition, the ink valve chamber 213 is in communication with the bottom of the lower liquid chamber 212 via a through-hole 219.

In the top of the cartridge 200, the air valve chamber 214 communicates with the outside of the cartridge 200 via an air communication port 221 formed in the rear wall 202. Hence, one end of the air valve chamber 214 (the end near the through-hole 218) communicates with the liquid chamber 210 (and more specifically the upper liquid chamber 211), while the other end (the end at the air communication port 221) communicates with the exterior of the cartridge 200. The air valve chamber 214 is in communication with the atmosphere via the air communication port 221. A valve 222 and a coil spring 223 are also disposed in the air valve chamber 214. The valve 222 can move in the front-rear direction 8 between a closed position and an open position. The valve 222 closes the air communication port 221 when in the closed position and opens the air communication port 221 when in the open position. The coil spring 223 urges the valve 222 rearward, i.e., in a direction for moving the valve 222 from the open position to the closed position.

As the cartridge 200 is mounted in the mounting case 150, the corresponding rod 153 is inserted through the air communication port 221 into the air valve chamber 214. The rod 153 inserted into the air valve chamber 214 moves the valve 222 forward from its closed position against the urging force of the coil spring 223. By moving the valve 222 into the open position, the rod 153 allows the upper liquid chamber 211 to communicate with the atmosphere. Note that the structure for opening the air communication port 221 is not limited to the example described above. As another example, the air communication port 221 may be sealed by a film, and the rod 153 may be configured to puncture the film.

The ink supply tube 230 protrudes rearward from the rear wall 202 beneath the housing 201. The rear end of the ink supply tube 230 is open. In other words, the ink valve chamber 213 provides communication between the liquid chamber 210 via the through-hole 219 and the outside of the cartridge 200. One end of the ink valve chamber 213 (the end with the through-hole 219) communicates with the liquid chamber 210 (and more specifically the lower liquid chamber 212), and the other end (the end with an ink supply opening 234 described later) communicates with the outside of the cartridge 200. A packing 231, a valve 232, and a coil spring 233 are disposed in the ink valve chamber 213.

An ink supply opening 234 is formed in the center of the packing 231 and penetrates the packing 231 in the front-rear direction 8. The inner diameter of the ink supply opening 234 is slightly smaller than the outer diameter of the needle 181. The valve 232 is capable of moving in the front-rear direction 8 between a closed position and an open position. When in the closed position, the valve 232 contacts the packing 231 and closes the ink supply opening 234. When in the open position, the valve 232 is separated from the packing 231, opening the ink supply opening 234. The coil spring 233 urges the valve 232 rearward, i.e., in the direction for moving the valve 232 from the open position to the closed position. The urging force of the coil spring 233 is greater than that of the coil spring 186.

As the cartridge 200 is mounted in the mounting case 150, the ink supply tube 230 advances into the guide 182, and the needle 181 gradually passes through the ink supply opening 234 and advances into the ink valve chamber 213. At this time, the needle 181 elastically deforms the packing 231 while closely contacting the inner circumferential surface of the packing 231 defining the ink supply opening 234. When the cartridge 200 is inserted farther into the mounting case 150, the needle 181 moves the valve 232 forward against the urging force of the coil spring 233. At the same time, the valve 232 moves the valve 185 that protrudes out from the opening 183 of the needle 181 in a rearward direction against the urging force of the coil spring 186.

Through this operation, the ink supply opening 234 and opening 183 are opened so that the ink valve chamber 213 in the ink supply tube 230 is in communication with the interior space of the needle 181. In other words, through the process of mounting the cartridge 200 in the mounting case 150, the ink valve chamber 213 and the interior space of the needle 181 configure a channel that provides communication between the liquid chamber 210 of the cartridge 200 and the liquid chamber 171 of the ink tank 160.

Also, by mounting the cartridge 200 in the mounting case 150, a portion of the liquid chamber 210 and a portion of the liquid chamber 171 overlap each other vertically when viewed along a horizontal direction. Further, the bottom of the liquid chamber 171 is positioned lower than the bottom of the liquid chamber 210. Thus, ink accommodated in the liquid chamber 210 flows through the connected ink supply tube 230 and joint 180 into the liquid chamber 171 of the ink tank 160 owing to the difference in hydraulic head between the liquid chamber 210 and liquid chamber 171.

As illustrated in FIGS. 5A and 5B, a protrusion 241 is formed on the top wall 204. The protrusion 241 protrudes upward from the outer surface of the top wall 204 and extends in the front-rear direction 8. The protrusion 241 has a locking surface 242, and a sloped surface 243. The locking surface 242 and sloped surface 243 are positioned above the top wall 204. The locking surface 242 faces forward and expands along the up-down direction 7 and left-right direction 9. In other words, the locking surface 242 is substantially orthogonal to the top wall 204. The sloped surface 243 slopes relative to the top wall 204 so as to face diagonally upward and rearward.

The locking surface 242 is contacted by the locking pin 156 when the cartridge 200 is mounted in the mounting case 150. The sloped surface 243 functions to guide the locking pin 156 into a position for contacting the locking surface 242 as the cartridge 200 is being mounted in the mounting case 150. Through this contact between the locking surface 242 and locking pin 156, the cartridge 200 is maintained in the mounted position illustrated in FIG. 6 against the urging forces of the coil springs 186, 223, and 233.

A plate-shaped member is formed on the front side of the locking surface 242 and extends upward from the top wall 204. The top surface of this plate-shaped member constitutes an operating part 244 that the user operates in order to extract the cartridge 200 from the mounting case 150. When the cartridge 200 is mounted in the mounting case 150 and the cover 87 is in its open position, the user can operate the operating part 244. When the user presses downward on the operating part 244, the cartridge 200 pivots so that the locking surface 242 moves below the locking pin 156. In this state, the user can extract the cartridge 200 from the mounting case 150.

As illustrated in FIGS. 5A and 5B, a light-blocking rib 245 is formed on the outer surface of the top wall 204 to the rear of the protrusion 241. The light-blocking rib 245 protrudes upward from the outer surface of the top wall 204 and extends in the front-rear direction 8. The light-blocking rib 245 is formed of a material or in a color capable of blocking light outputted from the light-emitting part of the mounting sensor 32. When the cartridge 200 is in its mounted state in the mounting case 150, the light-blocking rib 245 is positioned in the optical path of the light traveling from the light-emitting part to the light-receiving part of the mounting sensor 32. Hence, the mounting sensor 32 outputs a low level signal to the controller 130 when the cartridge 200 is mounted in the mounting case 150. Conversely, the mounting sensor 32 outputs a high level signal to the controller 130 when the cartridge 200 is not mounted in the mounting case 150. Therefore, the controller 130 can detect whether a cartridge 200 is mounted in the mounting case 150 according to the mounting signal outputted from the corresponding mounting sensor 32.

As illustrated in FIGS. 5A and 5B, an IC chip 34 is positioned on the outer surface of the top wall 204 between the light-blocking rib 245 and protrusion 241 in the front-rear direction 8. Electrodes 248 are formed on the IC chip 34. The IC chip 34 is also provided with a memory (not illustrated). The electrodes 248 are electrically connected to the memory on the IC chip 34. The electrodes 248 are exposed on the top surface of the IC chip 34 so as to be capable of conducting electricity with the corresponding contact 152 provided in the mounting case 150. In other words, the electrodes 248 are electrically connected to the contact 152 when the cartridge 200 is mounted in the mounting case 150. The controller 130 can read information from the memory on the IC chip 34 through the contact 152 and electrodes 248 and can write information to the memory of the IC chip 34 through the contact 152 and electrodes 248.

The memory on the IC chip 34 stores type information, a serial number, and a cartridge residual quantity for the cartridge 200. The type information indicates whether the cartridge 200 is a small-capacity cartridge or a large-capacity cartridge and indicates the color of ink accommodated therein. The serial number is information that uniquely identifies the cartridge 200. The cartridge residual quantity is a value specifying the quantity of ink accommodated in the cartridge 200. Note that for unused cartridges 200, an initial fill quantity specifying the initial quantity of ink in the cartridge 200 is stored in a memory as the cartridge residual quantity.

<Controller 130>

The printer 10 is provided with a controller 130. As illustrated in FIG. 1, the controller 130 is provided with a central processing unit (CPU) 35, a storage unit 36, and a communication bus 39. The storage unit 36 has a read only memory (ROM) 37 that stores programs and data, and an electrically erasable programmable read only memory (EEPROM) 51 and a random access memory (RAM) 52 that also store data.

The ROM 37 stores an operating system (OS) program 37A, a control program 37B, a communication program 37C, and the like. The OS program 37A functions to control the operations of other programs. The communication program 37C functions to control communications with external devices such as the information collection server 40 and the like. The control program 37B performs a printing process and the like described later. The CPU 35 executes the OS program 37A, control program 37B, and communication program 37C by processing commands described at an address. In the following description, operations processed by executing the OS program 37A, control program 37B, and communication program 37C may be described as the operations of the controller 130. Note that the controller 130 may possess a hardware circuit that employs chips to implement all or some of the operations executed by the OS program 37A, control program 37B, and communication program 37C.

The ROM 37 also stores a first prescribed value, a second prescribed value, and various threshold values described later.

The EEPROM 51 stores device information on the printer 10. Device information includes the model name of the printer 10, and printer ID for the printer 10. This printer ID may be the MAC address, serial number, or the like of the printer 10.

The EEPROM 51 also stores a first discharge value, a second discharge value, an initial cartridge residual quantity, an initial tank residual quantity, a S_Empty flag, and a C_Empty flag. The EEPROM 51 further stores initial fill quantities of cartridges 200 in association with the type information of the cartridges 200, respectively. These values will be described in greater detail in a printing process described later.

The RAM 52 stores a tank residual quantity and a cartridge residual quantity described later.

In addition to the components described above, the printer 10 is also provided with a clock 30, a communication interface (I/F) 31, and a motor (not illustrated). The clock 30 outputs date and time information (hereinafter "date and time" will be called "date/time information", and we will abbreviate "date and time" to "date/time"). The communication I/F 31 is connected to the communication circuit 6. The recording head 21, communication interface 31, mounting sensors 32, liquid level sensors 33, contacts 152, clock 30, display 28, motor, and the like are all connected to the communication bus 39.

The controller 130 drives the motor (not illustrated) through the communication bus 39 to rotate the feed roller 23, conveying rollers 25, and discharge rollers 27. The controller 130 also outputs drive signals via the communication bus 39 to driving elements of the recording head 21 in order to control the recording head 21 to eject ink droplets.

The controller 130 detects whether cartridges 200 are mounted in the mounting case 150 according to mounting signals outputted from the mounting sensors 32. The controller 130 also detects whether the level of ink accommodated in the liquid chambers 171 of the corresponding ink tanks 160 is at or above the reference position P according to liquid level signals outputted from the liquid level sensors 33.

<Information Collection Server 40>

The information collection server 40 may be established on the communication circuit 6 by the vendor of the printer 10 or a company other than the vendor. The information collection server 40 includes a CPU 41, a storage unit 42, a communication I/F 43, a communication bus 44, and a clock 48. The CPU 41, storage unit 42, and communication bus 44 constitute a controller 45. The clock 48 outputs date/time information. The communication I/F 43 is connected to the communication circuit 6 and communicates with the printer 10 and the shipping server 50.

The storage unit 42 has a program storage area 46, and a data storage area 47. The program storage area 46 is a hard disk or the like, and the data storage area 47 is a RAM, a hard disk, or the like. The storage unit 42 is an example of the memory of the present disclosure.

The data storage area 47 stores a residual quantity management list described later (see FIG. 13(A)) and a cartridge management list described later (see FIG. 13(B)).

The program storage area 46 stores various programs, including an OS program 46A, a control program 46B, and a communication program 46C. The OS program 46A controls the operations of other programs. The control program 46B executes an ordering process described later and the like. The communication program 46C controls communications with the printer 10 and shipping server 50. The OS program 46A, control program 46B, and communication program 46C are copied from the program storage area 46 to data storage area 47 as a series of commands to be executed sequentially by the CPU 41. In the following description, the operations processed by executing the OS program 46A, control program 46B, and communication program 46C will be described as the operations of the controller 45 or the information collection server 40. The control program 46B is an example of the set of program instructions of the present disclosure.

<Shipping Server 50>

The shipping server 50 may be established on the communication circuit 6 by the vendor of the printer 10 or by a company other than the vendor. The shipping server 50 provides a service of shipping cartridges 200 to users of printers 10 in response to requests (order commands) from the information collection server 40.

<Ink Management with the Ordering System 5>

In the ordering system 5, the information collection server 40 collects management information from printers 10 that includes information for residual quantity of ink. When the residual quantity of ink becomes low, the information collection server 40 issues an order to the shipping server 50 for a cartridge 200. Since the information collection server 40 can manage residual quantities of ink and order cartridges 200 when needed, this ordering system 5 provides convenience to the user by eliminating the time and effort the users of printers 10 expend to manage residual ink quantities and to purchase cartridges 200.

Specifically, the user of each printer 10 enters a contract with the manufacturer that provides a service to manage residual ink quantities and to place orders for cartridges 200. A contract for this ink management and cartridge ordering service is entered for each printer. When a contract is entered, the user's information and printer ID for the printer 10 under contract is stored on the information collection server 40. The user information is information relevant to the shipping destination of the cartridges 200, such as the user's name and address.

Once the user and manufacturer enter this contract, the printer ID for the printer 10 and the user information are stored on the information collection server 40 in association with each other. The processes performed on the printer 10, information collection server 40, and shipping server 50 in relation to the ordering of cartridges 200 will be described below in greater detail.

<Processes Executed by the Controller 130 of the Printer 10>

Next, processes executed by the controller 130 of the printer 10 will be described with reference to FIGS. 7 through 9B. Note that the order in which the steps described below are executed may be modified as desired without departing from the spirit of the present disclosure.

<Printing Process>

Figure 7:
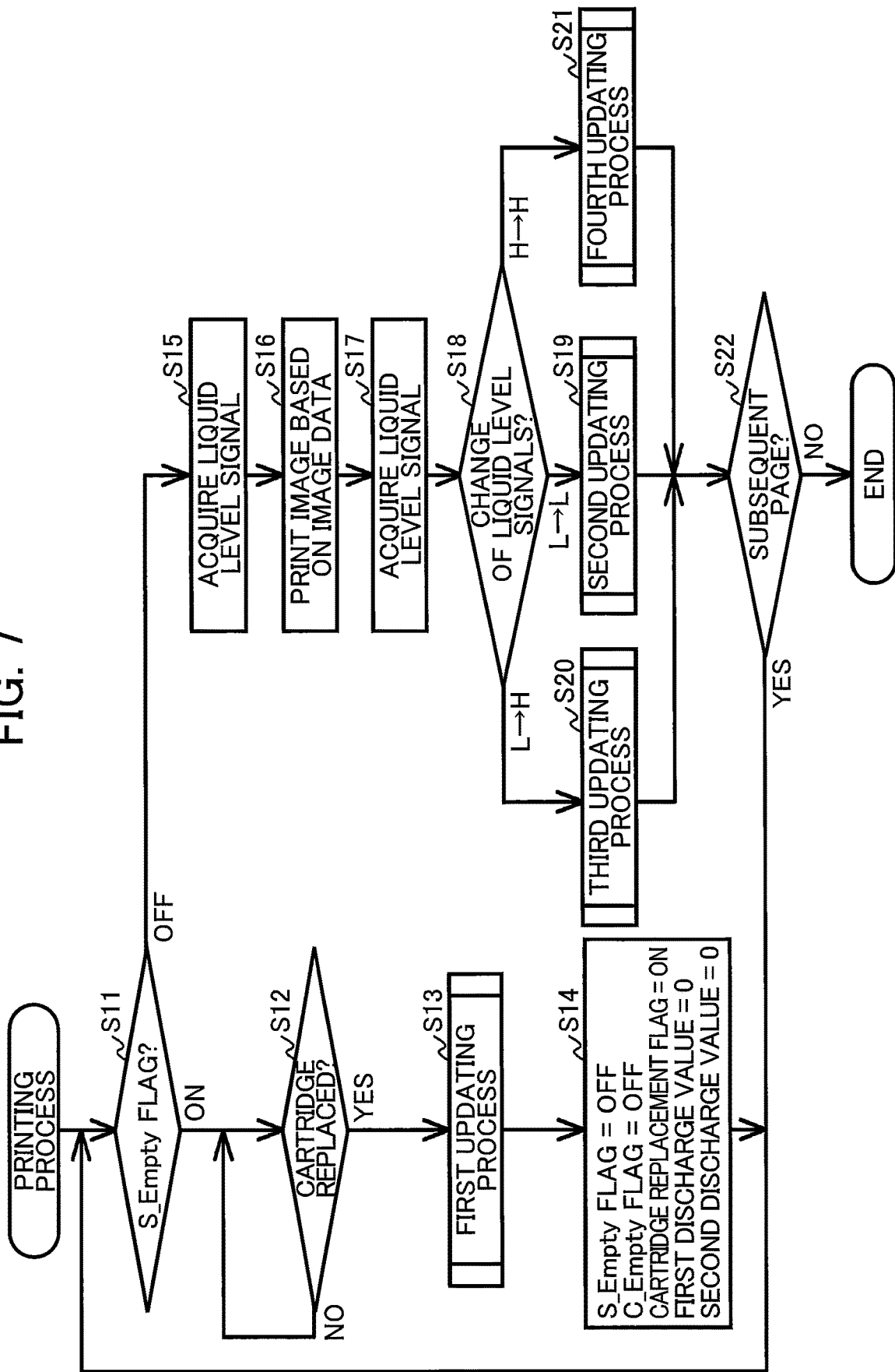
FIG. 7 is a flowchart illustrating steps in a printing process executed by a controller of the printer according to the embodiments.

The controller 130 executes the printing process illustrated in FIG. 7 when a print command is inputted into the printer 10. While there is no particular restriction on the source of the print command, the controller 130 may receive user operations for a print command through the operating panel 22 or the display 28, or may receive user operations for a print command from an external device via the communication I/F 31. The print command includes image data representing an image to be printed. The controller 130 stores the image data in the RAM 52 of the printer 10.

In S11 at the beginning of the printing process, the controller 130 determines whether the value of the S_Empty flag is "ON" or "OFF." The controller 130 sets the S_Empty flag in the EEPROM 51 to "ON" prior to the level of ink in the liquid chamber 171 of the corresponding ink tank 160 dropping to the top of the outlet 174 through which ink flows out of the ink tank 160. Before the controller 130 sets the S_Empty flag to "ON," the S_Empty flag stored in the EEPROM 51 is set to an initial value of "OFF." Note that there is a possibility air could enter the nozzles of the recording head 21 after the level of ink reaches the top of the outlet 174. If air were to enter the nozzles in the recording head 21 and become retained therein, the retained air could obstruct the flow of ink into the nozzles or obstruct the ejection of ink droplets from the nozzles.

Hence, the S_Empty flag serves to prevent air from being introduced into the nozzles of the recording head 21. As will be described later, the controller 130 sets the S_Empty flag in the EEPROM 51 to "OFF" in step S14 and sets the S_Empty flag to "ON" in step S55 of FIG. 8D. Although not illustrated in the flowchart, the controller 130 prohibits the ejection of ink from the recording head 21 when the S_Empty flag is set to "ON" and allows the ejection of ink when the S_Empty flag is set to "OFF."

If the controller 130 determines in S11 that the S_Empty flag is set to the value "ON" (S11: ON), the controller 130 begins acquiring the mounting signal from the corresponding mounting sensor 32 at prescribed intervals. In S12 the controller 130 determines whether the acquired mounting signal changed from a low level signal (hereinafter simply called "L") to a high level signal (hereinafter simply called "H") and whether the mounting signal subsequently changed from "H" to "L". That is, the controller 130 determines whether a cartridge 200 was mounted on the basis of changes in the mounting signal. In the following description, the controller 130 determining whether the acquired mounting signal changed from "L" to "H" and subsequently from "H" to "L" will be described as the controller 130 determining whether the cartridge 200 has been replaced. Further the controller 130 will determine that a cartridge 200 has been mounted (that is, a new cartridge 200 has been replaced with the previous cartridge 200) when determining in S12 that the acquired mounting signal changed from "L" to "H" and subsequently changed from "H" to "L" (S12: YES).

While a cartridge 200 has not been mounted (that is, while a new cartridge 200 has not been replaced with the previous cartridge 200) (S12: NO), the controller 130 continues periodically acquiring the mounting signal from the mounting sensor 32. When the controller 130 determines that a cartridge 200 has been mounted (S12: YES), the controller 130 executes a first updating process in S13.

Note that while the process in S12 is given as an example by which the controller 130 determines whether a cartridge 200 has been mounted, the determination is not limited to this process. For example, the controller 130 may determine whether a cartridge 200 has been mounted on the basis of a serial number. In this case, the controller 130 reads the serial number of a cartridge 200 from the memory on the IC chip 34 of the cartridge 200. Subsequently, the controller 130 determines whether the serial number read from the memory matches a serial number stored in the EEPROM 51. The serial numbers stored in the EEPROM 51 are those serial numbers stored in the memory of IC chips 34 disposed on cartridges 200 (previous cartridges 200) that were mounted in the mounting case 150 prior to a new cartridge 200 being mounted in the mounting case 150. Thus, in this case the controller 130 determines that a cartridge 200 has been mounted when the serial number read from the memory of the IC chip 34 does not match a serial number stored on the EEPROM 51.

<First Updating Process>

Figure 8A:
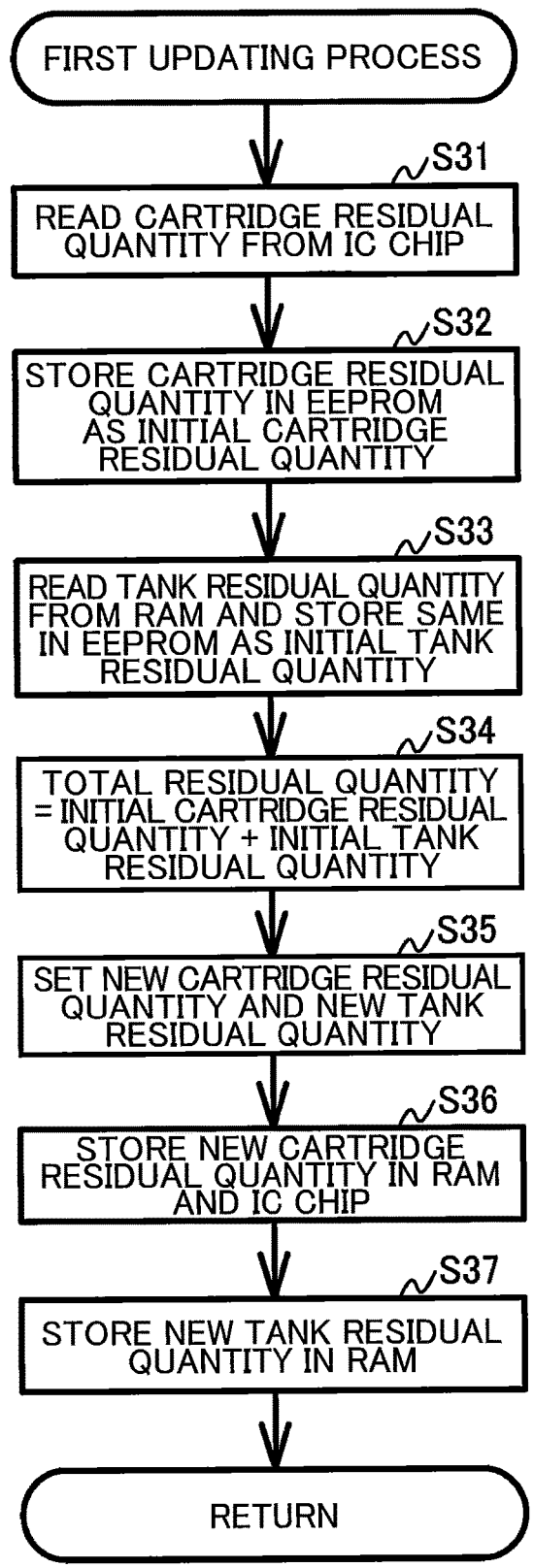
FIG. 8A is a flowchart illustrating steps in a first updating process executed by the controller of the printer according to the embodiments, the first updating process being executed under a condition where a cartridge is mounted in the mounting case of the printer while a value of a S_Empty Flag is set to "ON"

The controller 130 executes the first updating process illustrated in FIG. 8A so as to update the initial cartridge residual quantity and initial tank residual quantity stored in the EEPROM 51 and the cartridge residual quantity sored in the IC chip 34 on a cartridge 200, when the cartridge 200 has just been mounted in the mounting case 150 of the printer 10.

In S31 at the beginning of the first updating process, the controller 130 reads the cartridge residual quantity from the memory on the IC chip 34 of the cartridge 200 mounted in the mounting case 150 through the contact 152. In S32 the controller 130 stores the cartridge residual quantity read in S31 in the EEPROM 51 as the initial cartridge residual quantity.

In S33 the controller 130 reads a tank residual quantity from the RAM 52. Note that if a tank residual quantity is not stored in the RAM 52 due to an interruption in power supply or the like, the controller 130 calculates a tank residual quantity and stores this calculated value in the RAM 52, similar to a fourth updating process described later. The tank residual quantity read from the RAM 52 indicates the residual quantity of ink accumulated in the liquid chamber 171 of the ink tank 160 just prior to the cartridge 200 being mounted. In other words, the tank residual quantity indicates the quantity of ink that had accumulated in the liquid chamber 171 of the ink tank 160 when the previous cartridge 200 was removed. In S33 the controller 130 stores the tank residual quantity read from the RAM 52 in the EEPROM 51 as the initial tank residual quantity.

In S34 the controller 130 adds the initial tank residual quantity to the initial cartridge residual quantity to calculate a total residual quantity specifying the total quantity of residual ink. In S35 the controller 130 sets a new cartridge residual quantity and new tank residual quantity on the basis of the calculated total residual quantity.

To describe this in greater detail, when a new cartridge 200 is mounted in the mounting case 15, a portion of the ink accommodated in the liquid chamber 210 of the new cartridge 200 flows out of the liquid chamber 210 into the liquid chamber 171 of the ink tank 160. This flow of ink from the liquid chamber 210 of the cartridge 200 into the liquid chamber 171 of the ink tank 160 stops when the difference in the hydraulic head between ink accommodated in the liquid chamber 210 and ink accommodated in the liquid chamber 171 becomes negligible. The new cartridge residual quantity and new tank residual quantity indicate residual ink quantities when there is little difference in hydraulic head between ink accommodated in the liquid chamber 210 of the cartridge 200 and ink accommodated in the liquid chamber 171 of the ink tank 160.

The controller 130 may calculate the cartridge residual quantity and tank residual quantity according to formulae stored in the EEPROM 51 or ROM 37, for example.

Alternatively, the controller 130 may set the cartridge residual quantity and tank residual quantity according to tables stored in the EEPROM 51 or ROM 37, for example. More specifically, the shape of the liquid chamber 210 in the cartridge 200 and the shape of the liquid chamber 171 in the ink tank 160 are predetermined according to design. Therefore, by knowing the total residual quantity of ink, it is also possible to determine the cartridge residual quantity and tank residual quantity when the hydraulic head difference between ink accommodated in the cartridge 200 and ink accommodated in the ink tank 160 is almost nothing. Thus, formulae for calculating the cartridge residual quantity and tank residual quantity from a total residual quantity are prestored in the EEPROM 51 or ROM 37. Alternatively, tables showing correlations between cartridge residual quantities and tank residual quantities, and total residual quantities may be prestored in the EEPROM 51 or ROM 37. The controller 130 sets a new cartridge residual quantity and a new tank residual quantity according to the formulae or tables.

In S36 the controller 130 stores the new cartridge residual quantity in the RAM 52 and updates the cartridge residual quantity stored in the memory on the IC chip 34. In S37 the controller 130 stores the new tank residual quantity in the RAM 52. Subsequently, the controller 130 ends the first updating process.

After completing the first updating process of S13 illustrated in FIG. 7, in S14 the controller 130 sets the S_Empty flag to "OFF" in the EEPROM 51, sets the C_Empty flag in the EEPROM 51 to "OFF," sets a cartridge replacement flag to "ON" in the EEPROM 51, and resets the first discharge value and second discharge value to "zero." Subsequently, the controller 130 repeats the process described above from S11. Here, the C_Empty flag, first discharge value, second discharge value, and cartridge replacement flag will be described later.

If the controller 130 determines in S11 that the S_Empty flag is set to "OFF" (S11: OFF), in S15 the controller 130 acquires the liquid level signal from the liquid level sensor 33. In S16 the controller 130 performs a printing operation on a sheet according to image data stored in the RAM 52. By printing an image on a sheet, ink is discharged from the recording head 21, lowering the level of ink in the ink tank 160. After completing the printing operation in S16, in S17 the controller 130 acquires a liquid level signal from the liquid level sensor 33. In S18 the controller 130 determines the change of the pair of liquid level signals acquired in S15 and S17. In the following description, a low level signal acquired from the liquid level sensor 33 will simply be called "L" and a high level signal acquired from the liquid level sensor 33 will simply be called "H".

If the controller 130 determines that the liquid level signals acquired in S15 and S17 are both "L" (S18: LL), the controller 130 executes a second updating process in S19. When the controller 130 determines in S18 that the liquid level signals acquired in S15 and S17 are both "L", the level of ink stored in the liquid chamber 171 of the ink tank 160 prior to the printing operation in S16 being executed was at the reference position P or higher (since a liquid level signal of "L" was acquired in S15), and similarly the level of ink stored in the liquid chamber 171 of the ink tank 160 after the printing operation of S16 was executed is at the reference position P or higher (since a liquid level signal of "L" was acquired in S17). In other words, when the controller 130 acquires a liquid level signal of "L" in S17 after executing a printing operation in S16, ink still remains in the liquid chamber 210 of the cartridge 200.

<Second Updating Process>

Figure 8B:
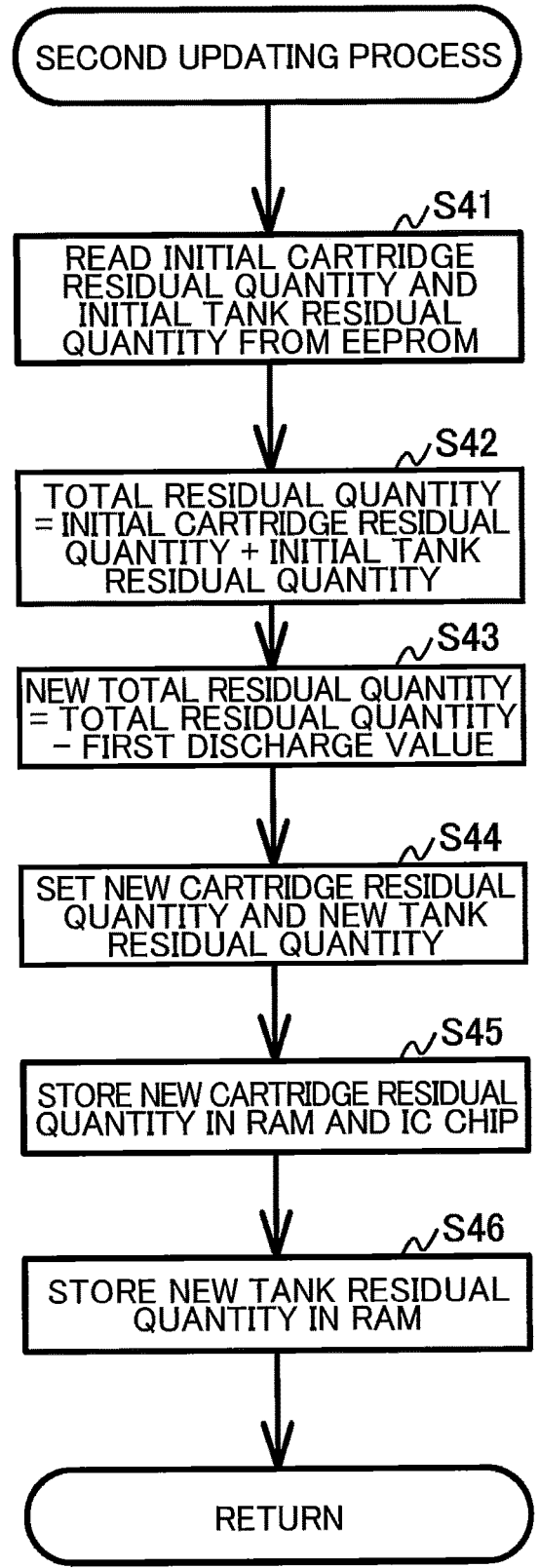
FIG. 8B is a flowchart illustrating steps in a second updating process executed by the controller of the printer according to the embodiments, the second updating process being executed under a condition where liquid level signals acquired in S15 and S17 of FIG. 7 are both "L"

The controller 130 executes the second updating process illustrated in FIG. 8B so as to set a new cartridge residual quantity and a new tank residual quantity based on a first discharge value specifying the quantity of ink discharge through the recording head 21 during printing and maintenance, when ink still remains in the liquid chamber 210 of the cartridge 200. The first discharge value is found by multiplying the quantity of one ink droplet ejected from the recording head 21 by the number of ink droplets ejected, for example. Each time the controller 130 gives a command to eject ink from the recording head 21, the controller 130 calculates the first discharge value based on this command. The controller 130 calculates a first discharge value that corresponds to the total quantity of ink ejected by the recording head 21 from the moment the cartridge 200 was mounted in the mounting case 150 to the present. Hence, the first discharge value is the cumulative quantity of ink ejected by the recording head 21 since the cartridge 200 was mounted. The first discharge value is stored in the EEPROM 51.

In S41 at the beginning of the second updating process, the controller 130 reads the initial cartridge residual quantity and the initial tank residual quantity from the EEPROM 51. In S42 the controller 130 calculates the total residual quantity by adding the initial cartridge residual quantity and initial tank residual quantity read in S41. In S43 the controller 130 calculates a new total residual quantity by subtracting the first discharge value from the total residual quantity calculated in S42. In S44 the controller 130 sets a new cartridge residual quantity and a new tank residual quantity using the new total residual quantity calculated in S43 and the formulae or tables described earlier.

In S45 the controller 130 stores the new cartridge residual quantity set in S44 in the RAM 52 and updates the cartridge residual quantity stored in memory on the IC chip 34. In S46 the controller 130 also stores the new tank residual quantity set in S44 in the RAM 52. Subsequently, the controller 130 ends the second updating process.

After completing the second updating process of S19 illustrated in FIG. 7, in S22 the controller 130 determines whether image data for a subsequent page is stored in the RAM 52. If image data for a subsequent page is stored in the RAM 52 (S22: YES), the controller 130 returns to S11 and repeats the process described above. However, if the controller 130 determines that image data for another page is not stored in the RAM 52 (S22: NO), the controller 130 ends the printing process.

Note that the method for setting the cartridge residual quantity and tank residual quantity described above is merely an example and these quantities may be set according to another method.

When the controller 130 determines in S11 that the S_Empty flag is set to "OFF" (S11: OFF), the controller 130 again executes the process from S15 to S18. If the controller 130 acquires the liquid level signal "L" in S15 and acquires the liquid level signal "H" in S17 (S18: L→H), the controller 130 executes a third updating process in S20. When the controller 130 determines in S18 that the liquid level signal acquired in S15 is "L" and the liquid level signal acquired in S17 is "H", the level of ink stored in the liquid chamber 171 of the ink tank 160 prior to execution of the printing operation in S16 was at or higher than the reference position P (as indicated by the liquid level signal "L" acquired in S15) and the level of ink stored in the liquid chamber 171 after the printing operation of S16 was executed is lower than the reference position P (as indicated by the liquid level signal "H" acquired in S17). That is, the liquid chamber 210 of the cartridge 200 became depleted of ink while the printing operation of S16 was executed. This signifies that ink in the liquid chamber 210 of the cartridge 200 was used up during the printing operation.

<Third Updating Process>

Figure 8C:
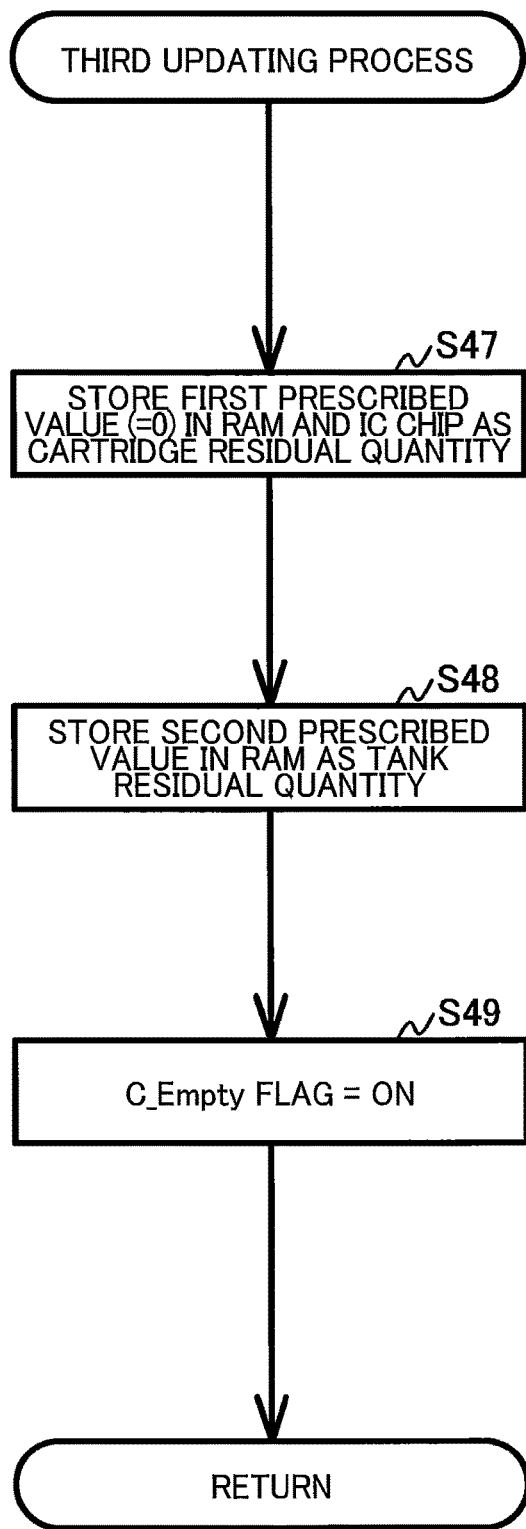
FIG. 8C is a flowchart illustrating steps in a third updating process executed by the controller of the printer according to the embodiments the third updating process being executed under a condition where the liquid level signal acquired in S15 of FIG. 7 is "L" but the liquid level signal acquired in S17 of FIG. 7 is "H"

The controller 130 executes the third updating process illustrated in FIG. 8C so as to update the cartridge residual quantity to a first prescribed value and so as to update the tank residual quantity to a second prescribed value, when ink in the liquid chamber 210 of the cartridge 200 was just used up during the printing operation. More specifically, the first discharge value indicating the quantity of ink discharged from the recording head 21 during printing and the like includes error. For example, even though the controller 130 commands the recording head 21 to eject ink in a specific quantity, the quantity of ink actually ejected from the recording head 21 may differ from the specific quantity directed by the controller 130. One factor of this difference may be the temperature when the ejection of ink is commanded, for example. That is, the viscosity of ink increases as temperature drops, and high-viscosity ink is more difficult to discharge through the nozzles 29. Further, when the controller 130 repeatedly issues the above command to the recording head 21, the difference between the quantity of ink actually discharged from the recording head 21 through these repetitions and the total amount of the specific quantity multiplied by the number of repetitions may increase. In other words, there is a possibility that the error between the quantity specified by the calculated first discharge value and the quantity actually discharged from the recording head 21 will accumulate each time a printing operation is performed.

Since the cartridge residual quantity is set according to this first discharge value, error is generated between the residual ink quantity specified by the cartridge residual quantity and the actual residual ink quantity in the liquid chamber 210. Further, since the tank residual quantity is set according to the first discharge value, error is generated between the residual ink quantity specified by the tank residual quantity and the actual residual ink quantity in the liquid chamber 171. Consequently, the cartridge residual quantity and the tank residual quantity set every printing operation include accumulated error. The third updating process is performed to reset this accumulated error.

Specifically, in S47 of FIG. 8C, the controller 130 updates the cartridge residual quantities stored both in the RAM 52 and the memory on the IC chip 34 to the first prescribed value. The first prescribed value may be zero, for example. In S48 the controller 130 updates the tank residual quantity in the RAM 52 to the second prescribed value. The second prescribed value indicates the quantity of ink stored in the liquid chamber 171 of the ink tank 160 when the level of ink is at the reference position P. The first prescribed value and second prescribed value are stored in the ROM 37 in advance, for example.

In S49 the controller 130 sets the C_Empty flag in the EEPROM 51 to "ON" and subsequently ends the third updating process. Thus, when ink accommodated in the cartridge 200 is used up, the C_Empty flag in the EEPROM 51 stores the value "ON".

After completing the third updating process of S20 illustrated in FIG. 7, in S22 the controller 130 determines whether image data for subsequent pages is stored in the RAM 52. The controller 130 repeats the above process from S11 when determining that image data for subsequent pages is stored in the RAM 52 (S22: YES) and ends the printing process when determining that image data for subsequent pages is not stored in the RAM 52 (S22: NO).

When the controller 130 determines in the process of S11 that the S_Empty flag is set to "OFF" (S11: OFF), the controller 130 repeats the process in steps S15 through S18. If the controller 130 determines in S18 that the liquid level signals acquired in S15 and S17 are both "H" (S18: H→H), the controller 130 executes a fourth updating process in S21. When the controller 130 determines in S18 that both liquid level signals acquired in S15 and S17 are "H", the level of ink stored in the liquid chamber 171 of the ink tank 160 prior to the printing operation in S16 being executed was lower than the reference position P (as indicated by the liquid level signal "H" acquired in S15) and the level of ink stored in the liquid chamber 171 remains lower than the reference position P following the printing operation in S16 (as indicated by the liquid level signal "H" acquired in S17). In other words, the liquid chamber 210 of the cartridge 200 contains no ink before or after the controller 130 executes the printing operation in S16.

<Fourth Updating Process>

Figure 8D:
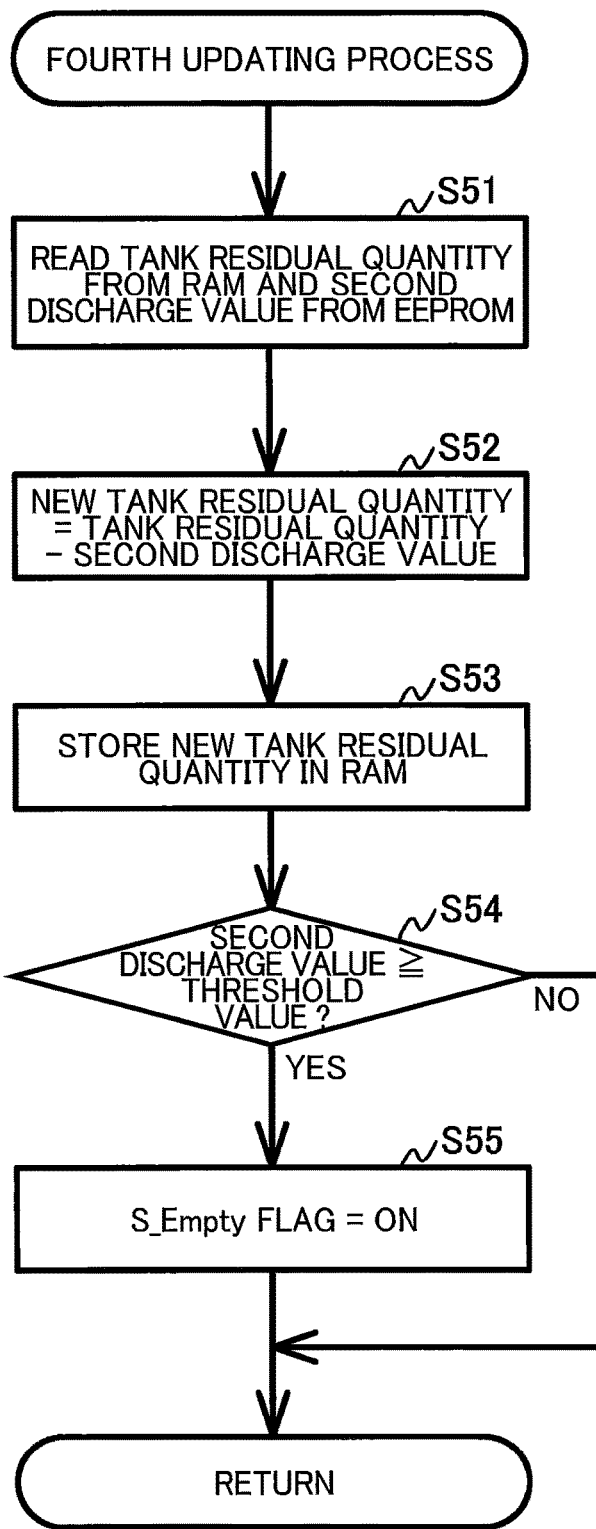
FIG. 8D is a flowchart illustrating steps in a fourth updating process executed by the controller of the printer according to the embodiments, the fourth updating process being executed under a condition where the liquid level signals acquired in S15 and S17 of FIG. 7 are both "H"

The controller 130 executes the fourth updating process illustrated in FIG. 8D so that the controller 130 calculates a tank residual quantity and determines whether the quantity of ink in the ink tank 160 specified by the tank residual quantity is a sufficient quantity for continuing printing, when the printing was performed after the liquid chamber 210 of the cartridge 200 had ran out of ink.

In S51 at the beginning of the fourth updating process, the controller 130 reads the tank residual quantity updated to the second prescribed value from the RAM 52 and the second discharge value from the EEPROM 51. In S52 the controller 130 subtracts the second discharge value from the tank residual quantity read in S51 to find a new tank residual quantity. As with the first discharge value, the second discharge value is obtained by multiplying the quantity of one ink droplet discharged from the recording head 21 by the number of times an ink droplet was discharged, for example. Each time the controller 130 issues a command to the recording head 21 to discharge ink, the controller 130 calculates the second discharge value based on the command. The controller 130 calculates the second discharge value to indicate the quantity of ink discharged by the recording head 21 from the timing after the liquid level signal acquired from the liquid level sensor 33 changed from "L" to "H" until the present time. Thus, the second discharge value is the cumulative quantity of ink discharged by the recording head 21 since the liquid level signal changed from "L" to "H". This second discharge value is stored in the EEPROM 51.

In S53 the controller 130 stores the new tank residual quantity calculated in S52 in the RAM 52. In S54 the controller 130 determines whether the calculated second discharge value has reached a threshold value. The threshold value is stored in the ROM 37 or the EEPROM 51 in advance. When the controller 130 determines that the second discharge value has not yet reached the threshold value (S54: NO), the controller 130 ends the fourth updating process. However, if the controller 130 determines that the second discharge value has reached the threshold value (S54: YES), in S55 the controller 130 sets the S_Empty flag in the EEPROM 51 to the value "ON". Subsequently, the controller 130 ends the fourth updating process. While not illustrated in the flowchart, if the controller 130 determines that the S_Empty flag is set to the value "ON", the controller 130 prevents the discharge of ink from the recording head 21 for purposes of printing or maintenance.

The threshold value is set such that the level of ink stored in the liquid chamber 171 of the ink tank 160 will be at a position slightly higher than the outlet 174 when the second discharge value reaches the threshold value. More specifically, error may occur between the design reference position P for performing detections with the liquid level sensor 33 and the reference position P at which the liquid level sensor 33 actually performs detections. This difference may arise from faulty operations of the actuator 190 or the like, for example. Thus, the threshold value is set such that the level of ink accommodated in the liquid chamber 171 of the ink tank 160 will not overlap the outlet 174 when the second discharge value reaches the threshold value, even if the error reaches the maximum possible value anticipated during design. By preventing ink from being discharged from the recording head 21, the controller 130 restricts air from being introduced into the recording head 21. Note that in addition to considerations for the error described above, the threshold value may be set such that the level of ink stored in the liquid chamber 171 of the ink tank 160 does not overlap the outlet 174 when the second discharge value reaches the threshold value, even if the printer 10 is resting on a sloped surface that slopes at a prescribed angle of inclination. In addition, the second discharge value may also include error, as with the first discharge value. Thus, the threshold value may be set such that the level of ink stored in the liquid chamber 171 of the ink tank 160 does not overlap the outlet 174 when the second discharge value reaches the threshold value, even if the second discharge value contains the maximum error.

After completing the fourth updating process of S21 illustrated in FIG. 7, in S22 the controller 130 determines whether image data for subsequent pages is stored in the RAM 52. The controller 130 repeats the above process from S11 when determining that image data for subsequent pages is stored in the RAM 52 (S22: YES) and ends the printing process when determining that image data for subsequent pages is not stored in the RAM 52 (S22: NO).

As described above, the controller 130 sets a cartridge residual quantity and a tank residual quantity according to the amount of ink used during printing each time the printing operation in S16 is executed. Note that the above description covers the case in which the controller 130 sets the cartridge residual quantity and tank residual quantity each time a printing operation is executed for one page. However, the controller 130 may set the cartridge residual quantity and tank residual quantity each time printing is executed for one pass. In addition, the controller 130 may execute the second updating process, third updating process, and fourth updating process not only after printing operations, but also after ink is discharged through the recording head 21 for maintenance and the like.

Next, a management information transmission process will be described with reference to FIGS. 9A and 9B. In this process, the printer 10 generates management information and transmits this management information to the information collection server 40. After completing all steps of the management information transmission process, the printer 10 returns to the initial step and repeats the process.

In S61 at the beginning of the management information transmission process, the controller 130 of the printer 10 determines whether date/time information outputted by the clock 30 has reached a prescribed transmission time stored in the EEPROM 51. If the controller 130 determines that the date/time information outputted by the clock 30 has not reached the prescribed transmission time (S61: NO), the controller 130 ends the management information transmission process.

However, when the date/time information outputted by the clock 30 matches the prescribed transmission time (S61: YES), in S62 the controller 130 reads the value of the C_Empty flag from the EEPROM 51 and determines whether the value is "ON". In other words, in S62 the controller 130 determines whether the cartridge 200 mounted in the mounting case 150 has run out of ink.

If the controller 130 determines that the C_Empty flag is set to "OFF" (S62: NO), in S63 the controller 130 reads the initial cartridge residual quantity, the initial tank residual quantity, and an initial fill quantity from the EEPROM 51. Note that the controller 130 reads type information for the cartridge 200 from the IC chip 34 of the cartridge 200, and subsequently reads the initial fill quantity corresponding to this type information from the EEPROM 51.

In S64 the controller 130 reads the first discharge value from the EEPROM 51. In S65 the controller 130 calculates a total residual quantity by subtracting the first discharge value read in S64 from the sum of the initial cartridge residual quantity and initial tank residual quantity read in S63.

In S66 the controller 130 sets a new cartridge residual quantity and a new tank residual quantity based on the calculated total residual quantity, as described above in the second updating process. In S67 the controller 130 stores the new cartridge residual quantity in the RAM 52 and on the IC chip 34. In S68 the controller 130 stores the new tank residual quantity in the RAM 52.

In S69 the controller 130 calculates a total residual percentage (%) by dividing the total residual quantity calculated in S65 by the initial fill quantity read in S63 and multiplying the result by 100. In S70 the controller 130 determines whether the total residual percentage calculated in S69 exceeds 100%. Cases in which the total residual percentage exceeds 100% will be described next in greater detail.

When a new cartridge 200 accommodating ink of an initial fill quantity is mounted in the mounting case 150 while ink still remains in the liquid chamber 171 of the ink tank 160, the total residual quantity becomes a value that exceeds the initial fill quantity. When the total residual quantity exceeds the initial fill quantity, the total residual percentage calculated by dividing the total residual quantity by the initial fill quantity and multiplying by 100 exceeds 100%. Hence, if a new cartridge 200 accommodating ink at the initial fill quantity is mounted in the mounting case 150 while ink remains in the liquid chamber 171 of the ink tank 160, the total residual percentage will remain over 100% until the residual ink in the liquid chamber 171 of the ink tank 160 is used.

If the controller 130 determines in S70 that the total residual percentage calculated in S69 exceeds 100% (S70: YES), in S71 the controller 130 changes the total residual percentage to 100%. However, if the controller 130 determines that the total residual percentage does not exceed 100% (S70: NO), the controller 130 skips S71.

In S71 the controller 130 changes the total residual percentage to 100% when the total residual percentage exceeds 100% to ensure consistency with printers that do not transmit total residual percentages exceeding 100%. A printer that does not transmit total residual percentages exceeding 100% signifies a printer provided with the mounting case 150, but not the ink tanks 160. Printers having a mounting case 150 but no ink tanks 160 transmit a value obtained by dividing the current residual quantity by the initial fill quantity and multiplying the result by 100 as the residual percentage. In other words, a printer that has a mounting case 150 but no ink tanks 160 transmits a residual percentage of 100% or less. Since the printer 10 modifies a total residual percentage exceeding 100% to 100%, the printer 10 can ensure consistency with printers having a mounting case 150 but no ink tanks 160. In other words, the printer 10 can transmit a total residual percentage to an information collection server 40 incapable of processing residual percentages over 100% and direct the information collection server 40 to process this data.

On the other hand, if the controller 130 determines in S62 that the C_Empty flag is set to "ON" (S62: YES), in S72 the controller 130 reads the cartridge residual quantity equivalent to the first prescribed value (zero) and the tank residual quantity equivalent to the second prescribed value from the RAM 52, and the initial fill quantity from the EEPROM 51. In S73 the controller 130 reads the second discharge value from the EEPROM 51. In S74 the controller 130 calculates a new tank residual quantity by subtracting the second discharge value read in S73 from the tank residual quantity read in S72. In S75 the controller 130 stores the new tank residual quantity calculated in S74 in the RAM 52.

In S76 the controller 130 calculates a total residual quantity by adding the new tank residual quantity calculated in S74 to the cartridge residual quantity read in S72. In S77 the controller 130 calculates a total residual percentage by dividing the total residual quantity calculated in S76 by the initial fill quantity read in S72 and multiplying the result by 100.

In S78 the controller 130 stores the total residual percentage calculated in S69, the total residual percentage modified to 100% in S71, or the total residual percentage calculated in S77 in the RAM 52.

In S79 the controller 130 reads the value of the C_Empty flag, the value of the cartridge replacement flag, and the device information from the EEPROM 51, the cartridge residual quantity, the tank residual quantity, and the total residual percentage from the RAM 52, and the type information for the cartridge 200 from the IC chip 34. In S80 the controller 130 generates management information that includes the value of the C_Empty flag, the cartridge residual quantity, the tank residual quantity, the total residual percentage, the model name and printer ID for the printer 10 indicated in the device information, the type information for the cartridge 200, and the value of the cartridge replacement flag.

In S81 the controller 130 transmits this management information to the information collection server 40. After transmitting the management information, in S82 the controller 130 sets the cartridge replacement flag to "OFF" and subsequently ends the management information transmission process. Hence, management information transmitted after the cartridge replacement flag was set to "ON" in S14 of FIG. 7 includes the cartridge replacement flag with the setting "ON", and the cartridge replacement flag is set to "OFF" after the management information including this cartridge replacement flag with the setting "ON" has been transmitted. The total residual percentage included in the management information is an example of the index value of the present disclosure.

The information collection server 40 receives the management information transmitted from the printer 10. Next, an ordering process executed on the information collection server 40 that receives the management information will be described with reference to FIG. 10. Note that after completing all steps in the ordering process, the information collection server 40 returns to the initial step and repeats the process.

In S89 at the beginning of the ordering process, the controller 45 of the information collection server 40 determines whether management information was received. If management information was not received (S89: NO), the controller 45 skips steps S90 through S95, and performs the process of S96 described later. However, when management information was received (S89: YES), in S90 the controller 45 determines whether the cartridge replacement flag included in the management information is set to "ON". In other words, in S90 the controller 45 determines whether the cartridge 200 in the printer 10 has been replaced with a new cartridge 200 which was ordered. The process that the information collection server 40 receives the management information is an example of the (a) acquiring of the present disclosure.

If the controller 45 determines that the cartridge replacement flag is set to "ON" (S90: YES), in S91 the controller 45 sets an order flag to "OFF". More specifically, the controller 45 sets an order flag stored in a cartridge management list (described later) in association with the type information for the cartridge 200 and the printer ID included in the management information to "OFF". The order flag is provided to prevent the cartridge 200 from placing duplicate orders. This concept will be described later. On the other hand, if the controller 45 determines that the cartridge replacement flag is set to "OFF" (S90: NO), the controller 45 skips step S91.

In S92 the controller 45 determines whether the printer 10 that transmitted the management information is a printer with tanks, i.e., whether the printer 10 has both a mounting case 150 for mounting cartridges 200 and ink tanks 160 corresponding to the cartridges 200. The controller 45 makes this determination based on the printer ID included in the management information. Here, a printer without tanks designates a printer provided with the mounting case 150 but not the ink tanks 160. The process of S93 is an example of the (j) determining of the present disclosure.

If the controller 45 determines that the printer 10 is a printer without tanks (S93: NO), in S93 the controller 45 conducts ordering of cartridges 200 according to the conventional method and ends the ordering process. An example of the conventional method is the method described in Japanese Patent Application Publication No. 2017-47537, but the method performed herein is not limited to this conventional method. However, if the controller 45 determines that the printer 10 is a printer with tanks (S92: YES), in S94 the controller 45 determines whether the C_Empty flag included in the management information is set to "ON". In other words, in S94 the controller 45 determines whether the cartridge 200 mounted in the printer 10 has run out of ink. If the controller 45 determines that the C_Empty flag is set to "OFF" (S94: NO), in S95 the controller 45 executes an order date/time setting process.

In the order date/time setting process of S95, the controller 45 sets a date/time for ordering the cartridge 200 on the basis of the management information received from the printer 10. The order date/time setting process will be described next with reference to FIG. 11A.

In S101 at the beginning of the order date/time setting process, the controller 45 acquires a cartridge-empty residual percentage (hereinafter referred to as "CTG-empty residual percentage," where "CTG" stands for "cartridge") on the basis of the type information for the cartridge 200 included in the management information received in S90. The CTG-empty residual percentage is the total residual percentage immediately after the cartridge 200 runs out of ink. In the present embodiment, the cartridge management list (described later) storing correlations between type information for cartridges 200 and CTG-empty residual percentages is stored in the storage unit 42 in advance. A table storing correlations between type information for cartridges 200 and CTG-empty residual percentages may be stored in the storage unit 42 in advance.

The controller 45 acquires the CTG-empty residual percentage by reading a CTG-empty residual percentage from the cartridge management list stored in the storage unit 42 that corresponds to the type information included in the management information. Note that the CTG-empty residual percentage may be included in the management information transmitted from the printer 10. In other words, the printer 10 may transmit management information to the information collection server 40 in S81 that includes the CTG-empty residual percentage, and the controller 45 may acquire the CTG-empty residual percentage from the management information.

In S102 the controller 45 associates the total residual percentage included in the management information and the CTG-empty residual percentage acquired in S101 with the date/time of acquisition (hereinafter called "acquisition date/time"), i.e., the date/time outputted by the clock 48 when the management information including the residual quantity information was acquired, and stores the associated data in the storage unit 42 as a record in the residual quantity management list illustrated in FIG. 13A. A residual quantity management list is created for the cartridge 200 of each color provided in each printer 10. Each residual quantity management list is identified by a printer ID and a color ID, for example. The process of S102 is an example of the (b) storing of the present disclosure. The acquisition date/time is an example of the acquisition date of the present disclosure. Note that the controller 45 may store the total residual percentage and the CTG-empty residual percentage in the residual quantity management list in association with a date of acquisition that does not include the time of acquisition rather than the acquisition date/time.

The residual quantity management list has a record for each acquisition date/time, with each record including a plurality of data items. The data items include the acquisition date/time, the total residual percentage, the total residual quantity, the cartridge residual quantity, the tank residual quantity, an order flag, a replacement count, and the like. Note that the residual quantity management list may include items other than those given in this example.

The item "acquisition date/time" is the date/time at which the management information was acquired. The item "total residual percentage" is the total residual percentage included in the management information. The item "total residual quantity" is a value indicating the tank residual quantity of ink accommodated in the cartridge 200 and ink tank 160 of the printer 10. The total residual quantity may be included in the management information together with the total residual percentage, or the controller 45 may calculate the total residual quantity from the printer ID, total residual percentage, and model name included in the management information. The item "cartridge residual quantity" is the cartridge residual quantity included in the management information. The item "tank residual quantity" is the tank residual quantity included in the management information. The item "order flag" is a value set to either "ON" or "OFF". The order flag is set to "ON" when a new cartridge 200 is ordered and is set to "OFF" when the old cartridge 200 in the printer 10 is replaced. The item "replacement count" is a value indicating the number of times the cartridge 200 has been replaced in the printer 10 to date.

Each record in the residual quantity management list stores total residual percentages transmitted by the printer 10 at different dates/times in association with their acquisition dates/times. Upon acquiring new management information, the controller 45 adds a new record to the residual quantity management list.

Figure 11A:
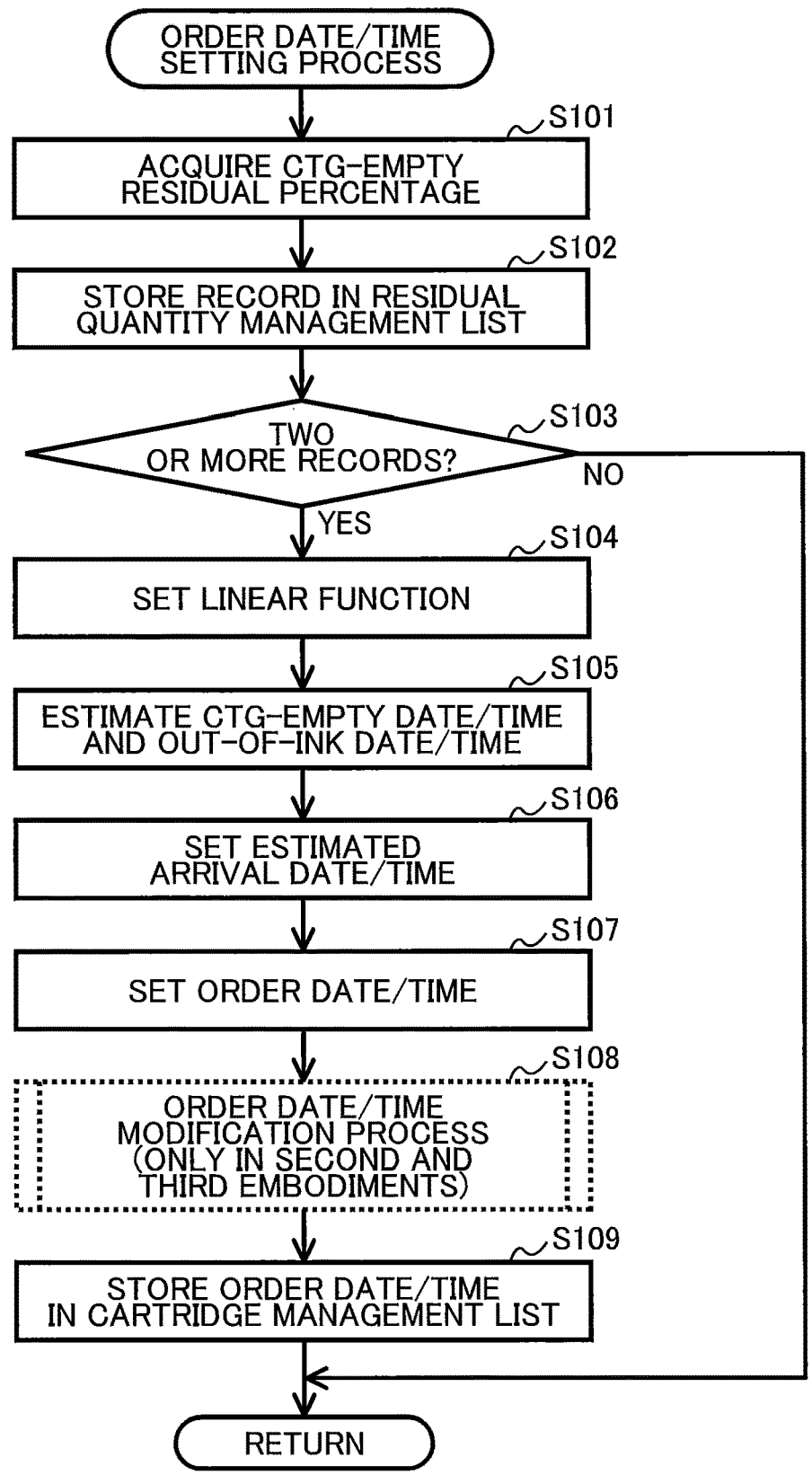
FIG. 11A is a flowchart illustrating an order date/time setting process executed by the controller of the information collection server according to the embodiments.
Figure 12A:
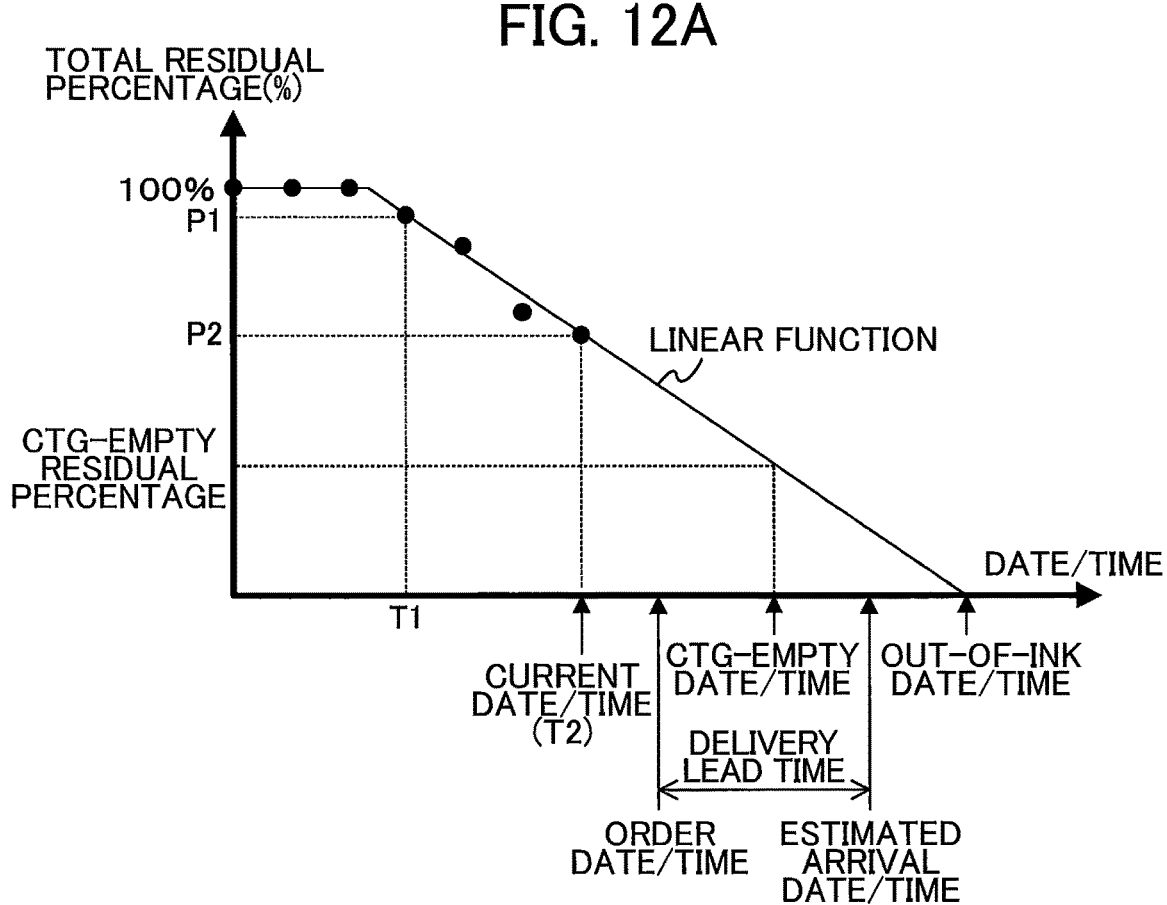
FIG. 12A illustrates a graph representing a linear function, an estimated arrival date/time, and an order date/time in a first embodiment.

In S103 of the process in FIG. 11A, the controller 45 determines whether the residual quantity management list contains two or more records for the same cartridge 200 indicating a total residual percentage less than 100%. Specifically, the controller 45 determines whether the residual quantity management list contains two or more records corresponding to the same ID of the cartridge 200 and including the same value of the replacement count. If the controller 45 determines there are not two or more such records for the same cartridge 200 (S103: NO), the controller 45 ends the order date/time setting process. However, if the controller 45 determines that there are two or more such records (S103: YES), in S104 the controller 45 sets a linear function based on dates/times and total residual percentages. The method of setting the linear function will be described next with reference to FIG. 12A. FIG. 12A illustrates a graph whose horizontal axis (X-axis) represents date/time and whose vertical axis (Y-axis) represents total residual percentage.

The controller 45 sets an initial record at which the total residual percentage has dropped below 100% according to the items "total residual percentage" and "acquisition date/time" in the residual quantity management list. The controller 45 acquires the acquisition date/time T1 and the total residual percentage P1 for the record set above from the residual quantity management list. The controller 45 also sets a most recent record according to the item "acquisition date/time" in the residual quantity management list. The controller 45 acquires the acquisition date/time T2 and the total residual percentage P2 for the most recent record from the residual quantity management list. Here, the acquisition date/time T2 is a date/time at which management information including data items in the most recent record was acquired, and is also called a "current date/time".

Next, the controller 45 sets a straight line passing through point (T1, P1) and point (T2, P2) having the slope (P2−P1)/

(T2−T1) as the linear function. Note that the controller 45 may set the linear function to a line passing through points specified by any two records with a total residual percentage less than 100%.

After setting the linear function in S104 of FIG. 11A, in S105 the controller 45 estimates a cartridge-empty date/time (hereinafter referred to as "CTG-empty date/time," where "CTG" stands for "cartridge") and an out-of-ink date/time. The CTG-empty date/time indicates the date/time at which the cartridge 200 will run out of ink. The out-of-ink date/time indicates the date/time at which neither the cartridge 200 nor the ink tank 160 will contain any ink.

In S106 the controller 45 sets an estimated arrival date/time of a cartridge 200 based on the estimated CTG-empty date/time and out-of-ink date/time. In S107 the controller 45 sets an order date/time based on the estimated arrival date/time. Here, the estimated arrival date/time indicates the date/time at which arrival of a new cartridge 200 is desired. The order date/time indicates the date/time to order the cartridge 200. The estimated arrival date/time is an example of the first calendar date of the present disclosure. The CTG-empty date/time is an example of the second calendar date of the present disclosure. The out-of-ink date/time is an example of the third calendar date of the present disclosure. The order date/time is an example of the order date of the present disclosure. Note that the CTG-empty date/time, the out-of-ink date/time, the estimated arrival date/time, and the order date/time may all indicate a date that does not include a time.

Here, steps S105, S106, and S107 will be described in greater detail with reference to FIG. 12A. In S105 the controller 45 estimates the CTG-empty date/time indicating the date/time at which the total residual percentage becomes the CTG-empty residual percentage according to the linear function set in S104. In other words, the controller 45 estimates the date/time at which the cartridge 200 will become empty and sets the CTG-empty date and time to this date/time. Next, in S105 the controller 45 estimates the out-of-ink date/time indicating the date/time at which the total residual percentage becomes zero according to the linear function set in S104. In other words, the controller 45 estimates the date/time at which both the cartridge 200 and ink tank 160 will run out of ink and sets the out-of-ink date/time to this date/time. In S106 the controller 45 sets the middle date/time of a time span between the CTG-empty date/time and the out-of-ink date/time as the estimated arrival date/time on which the cartridge 200 are desired to reach the user and stores this estimated arrival date/time in the storage unit 42.

The estimated arrival date/time is set to the middle date/time of the time span between the CTG-empty date/time and the out-of-ink date/time to ensure that, even if the cartridge 200 does not arrive exactly on the estimated arrival date/time, the user will receive the new cartridge 200 sometime after the cartridge 200 runs out of ink and before the cartridge 200 and ink tank 160 both run out of ink.

Note also that the linear function is set using the initial record at which the total residual percentage became less than 100% and the most recent record in order to suppress a drop in precision for estimating the CTG-empty date/time and out-of-ink date/time. A drop in the precision for estimating the CTG-empty date/time and out-of-ink date/time signifies a larger difference between the estimated out-of-ink date/time and the actual date/time that the printer 10 runs out of ink and a larger difference between the estimated CTG-empty date/time and the actual date/time that the cartridge 200 runs out of ink.

More specifically, the printer 10 transmits 100% to the information collection server 40 as the total residual percentage when the total residual percentage exceeds 100%, as described above. Therefore, the total residual percentage may exceed 100% on the printer 10 when the information collection server 40 stores 100% as the total residual percentage. Consequently, if the controller 45 were to set a linear function based on a total residual percentage of 100% despite the total residual percentage exceeding 100%, the precision in estimating the out-of-ink date/time and CTG-empty date/time may be lower. Thus, setting the linear function using records whose total residual percentage is under 100% can likely suppress a drop in precision for estimating the out-of-ink date/time and CTG-empty date/time.

As described above, the residual ink quantity specified by the cartridge residual quantity and the residual ink quantity specified by the tank residual quantity include error with respect to the actual quantity of ink accommodated in the cartridge 200 and the actual quantity of ink accommodated in the ink tank 160. This error can accumulate as the quantity of ink discharged by the recording head 21 increases. Therefore, it is highly probable that the total residual percentage in the initial record for which the total residual percentage is less than 100% will have less error than the total residual percentage in records transmitted after this initial record. Hence, by using the initial record having a total residual percentage under 100%, it may be possible to suppress a drop in precision for setting the estimated arrival date/time.

Further, since the amount of ink usage varies daily, using the total residual percentage of the most recent record likely can suppress a drop in setting precision for the estimated arrival date/time better than using the total residual percentage of an older record.

In S107 the controller 45 sets the order date/time for ordering a new cartridge 200 to a date/time earlier than the set estimated arrival date/time by a delivery lead time (three days, for example). The delivery lead time is the expected amount of time after a new cartridge 200 has been ordered for the cartridge 200 to reach the address included in the user information stored on the information collection server 40. The delivery lead time is stored in the storage unit 42 in advance, and is an example of the first period of time of the present disclosure. The address is stored in the cartridge management list in association with the color ID for the cartridge 200 and the printer ID of the printer 10 in advance.

In S109 the controller 45 stores the order date/time in the cartridge management list in FIG. 13B and subsequently ends the order date/time setting process. Note that step S108 depicted with dashed lines in FIG. 11A describes a process executed in the second and third embodiments and is not used in the present embodiment.

The cartridge management list illustrated in FIG. 13B enables the information collection server 40 to oversee a plurality of printers 10. The administrator of the information collection server 40 uses the cartridge management list to manage or monitor the ordering of cartridges 200, for example.

The cartridge management list stores a record for the cartridge 200 of each color in each printer 10. Each record has a plurality of items that include "printer ID," "model name," "color ID," "order date/time," "order flag," "replacement count," "CTG-empty residual percentage," "address," and the like. Note that the cartridge management list may include items other than those given in this example.

The item "printer ID" uniquely identifies each printer 10, and may be a MAC address or a serial number, for example. The item "model name" specifies the model name of the printer 10. The item "color ID" identifies color of ink accommodated in each cartridge 200. The item "order date/time" specifies the order date/time set in S107. The controller 45 sets an order date/time every time management information is received from a printer 10 and updates the item "order date/time" in the cartridge management list with the latest order date/time. The items "order flag" and "replacement count" are identical to the same items in the residual quantity management list. The item "CTG-empty residual percentage" specifies the CTG-empty residual percentage acquired in S101. The item "address" specifies the name and address to which new cartridges 200 will be delivered. The information stored in the item "address" is an example of the destination information of the present disclosure.

Figure 10:
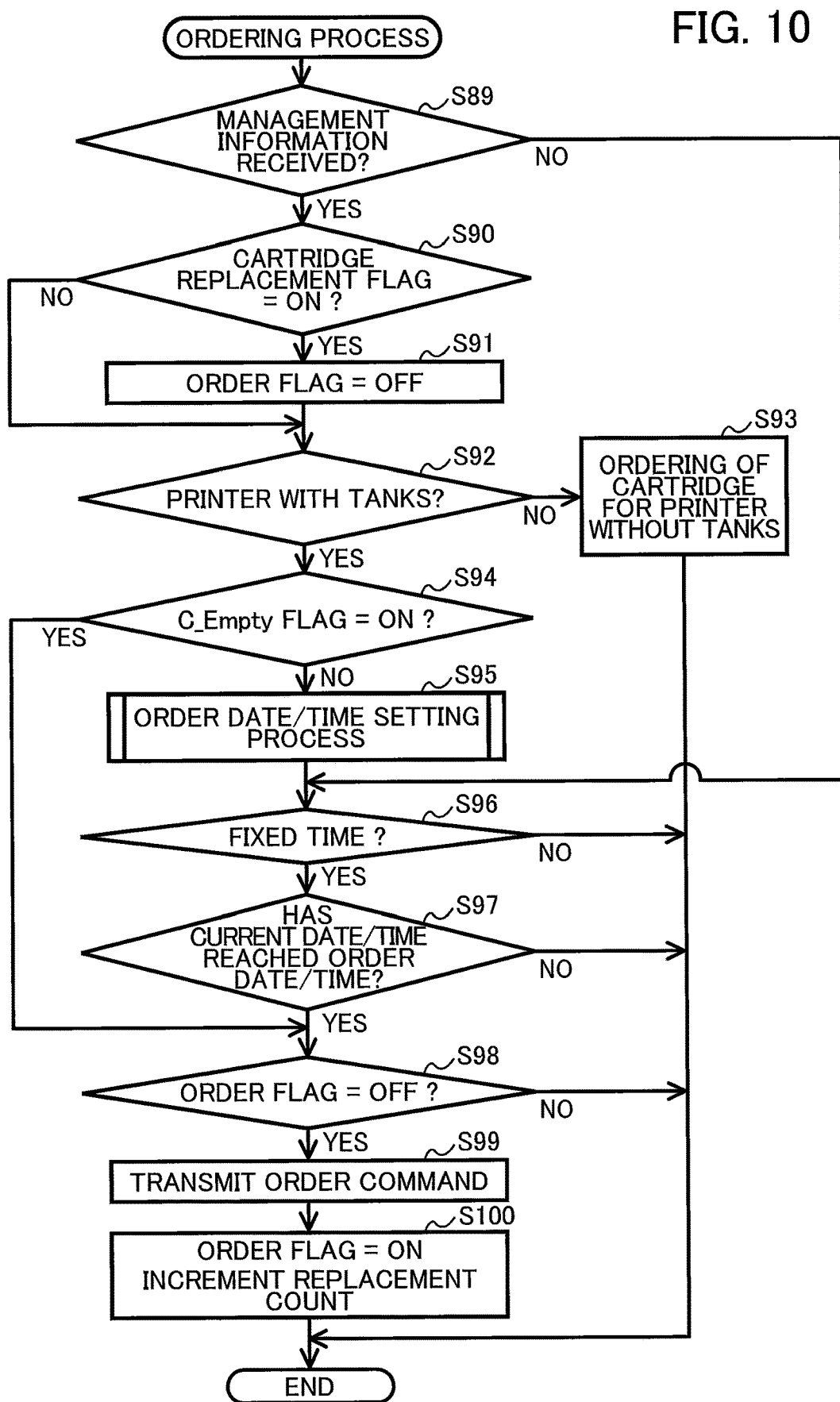
FIG. 10 is a flowchart illustrating an ordering process executed by a controller of the information collection server according to the embodiments.

After setting an order date/time in S95 of FIG. 10, or when the controller 45 determines in S89 that management information was not received (S89: NO), in S96 the controller 45 determines whether it is a fixed time, such as 10:00 a.m. or 12:00 p.m. When it is not the fixed time, the controller 45 ends the ordering process. However, when it is the fixed time, in S97 the controller 45 determines whether the current date/time has reached the order date/time.

Specifically, in the present embodiment, the controller 45 determines every day at the fixed time whether the current date/time has reached the order date/time in any of the records stored in the cartridge management list. If the current date/time has not yet reached the order date/time in any of records (S97: NO), the controller 45 ends the ordering process. However, when the current date/time reach the order date/time for any one or more records (S97: YES), in S98 the controller 45 determines whether the order flag is set to "OFF" in the record(s). In other words, the controller 45 determines in S98 whether a new cartridge 200 has already been ordered for replacement with the cartridge 200 corresponding to the record(s) determined to have an order date/time matching the current date/time.

When the order flag is set to "ON" (S98: NO), the controller 45 ends the ordering process. In other words, when a new cartridge 200 has already been ordered for the corresponding cartridge 200, the controller 45 ends the ordering process without ordering another cartridge 200. However, when the controller 45 determines that the order flag is set to "OFF" (S98: YES), in S99 the controller 45 transmits an order command to the shipping server 50. More specifically, the controller 45 determines every day at a fixed time, such as 10:00 a.m. or 12:00 p.m., whether the current date/time has reached the order date/time in any of the records, and transmits an order command to the shipping server 50 for ordering a cartridge 200 in each record determined to have an order date/time matching the current date/time. The order command includes information identifying the type of the cartridge 200 (type information), such as a part number, the destination for delivering the cartridge 200 (such as addressee information and address information), and the like. Upon receiving an order command, the shipping server 50 arranges the shipment of a cartridge 200 having the part number (type information) included in the order command to the destination included in the order command. The process of step S99 in which the information collection server 40 transmits an order command is an example of the (d) transmitting of the present disclosure.

On the other hand, if the controller 45 determines in S94 that the C_Empty flag is "ON" (S94: YES), the controller 45 skips steps S95 through S97 and executes steps S98 and S99 described above. In other words, when the cartridge 200 has run out of ink (S94: YES) and a new cartridge 200 has not yet been ordered (S98: YES), the controller 45 immediately places an order for a new cartridge 200, without setting an order date/time and waiting the fixed time. However, the controller 45 may transmit a command after waiting the fixed time when the C_Empty flag is "ON" (S94: YES) and the order flag is "OFF" (S98: YES).

After transmitting the order command in S99, in S100 the controller 45 sets item "order flag" in the corresponding record to "ON" in both the residual quantity management list and the cartridge management list and increments the value in item "replacement count" in the cartridge management list by one. Subsequently, the controller 45 ends the ordering process.

<Effects of the First Embodiment>

In the first embodiment, the recording head 21 prints using ink supplied to ink tanks 160 from cartridges 200 mounted in the mounting case 150. Accordingly, as long as ink remains in the ink tanks 160, the recording head 21 can continue printing on sheets using residual ink in the ink tanks 160, even when ink no longer remains in the cartridges 200. For this reason, the controller 130 sets an order condition (order date/time) for transmitting an order command to order a new cartridge 200 so that the new cartridge 200 will be mounted in the mounting case 150 when ink no longer remains in the currently mounted cartridge 200 but remains in the ink tank 160. By transmitting an order command when the order date/time has arrived and the order condition has been met, the controller 130 ensures that a new cartridge 200 will reach the user in time for the user to replace the old cartridge 200 when the old cartridge 200 no longer holds ink but ink remains in the ink tank 160. Thus, since the ink tank 160 still holds ink at the time of cartridge replacement, the controller 130 avoids falling into a situation in which printing is not possible before the cartridge 200 is replaced. Further, since the used cartridge 200 no longer contains ink when the cartridge 200 is replaced, the controller 130 can avoid wasting ink when the cartridge 200 is replaced.

In the first embodiment, the estimated arrival date/time is calculated by setting a linear function based on two total residual percentages and their acquisition dates/times. Accordingly, the embodiment requires fewer operations by the CPU 35 to calculate the estimated arrival date/time than when setting a polynomial of degree two or greater or when setting a linear function using standard deviation, thereby facilitating computation of the estimated arrival date/time.

In the first embodiment, the estimated arrival date/time is set to the middle date/time of the time span between the CTG-empty date/time and the out-of-ink date/time. Therefore, even if the new cartridge 200 reaches the user earlier or later than expected, the new cartridge 200 can reach the user while ink no longer remains in the old cartridge 200 but remains in the ink tank 160.

In the first embodiment, an order date/time is calculated each time new residual quantity information (total residual percentage) is acquired, thereby improving the precision of the calculated order date/time. Thus, the embodiment improves the probability that the new cartridge 200 will be delivered to the user while the old cartridge 200 is depleted of ink but the ink tank 160 still holds ink.

In the first embodiment, the printer 10 transmits total residual percentages no greater than 100% to the information collection server 40. Accordingly, the information collection server 40 can treat residual percentages inputted from printers that do not possess ink tanks 160 the same as total residual percentages inputted from printers 10 that have ink tanks 160. Thus, a different information collection server need not be used for each type of printer. In other words, a single information collection server 40 can order cartridges for printers that possess no ink tanks 160 and can order cartridges 200 for printers 10 that possess ink tanks 160.

In the first embodiment, the linear function is set on the basis of records whose total residual percentage is less than 100%. Accordingly, the first embodiment can suppress a drop in precision for estimating the out-of-ink date/time and CTG-empty date/time.

When the C_Empty flag included in the management information is set to "ON" in the first embodiment, a new cartridge 200 is ordered without setting an order date/time. Therefore, the first embodiment can increase the probability that the new cartridge 200 will reach the user while the ink tank 160 still contains ink.

In the first embodiment, the controller 45 determines whether the printer 10 is a printer with tanks, i.e., whether the printer 10 is provided with ink tanks 160. The controller 45 executes the order date/time setting process illustrated in FIG. 10 when determining that the printer 10 is a printer with tanks. Hence, the first embodiment enables the information collection server 40 to order cartridges for printers without ink tanks 160 and to order cartridges 200 for printers 10 with ink tanks 160.

Second Embodiment

The second embodiment describes a case in which the order date/time is modified on the basis of the slope of the linear function set in step S104 of FIG. 11A.

In S108 illustrated in FIG. 11A, the controller 45 of the information collection server 40 executes an order date/time modification process after setting the order date/time in S107. This process will be described next with reference to FIG. 11B.

Figure 11B:
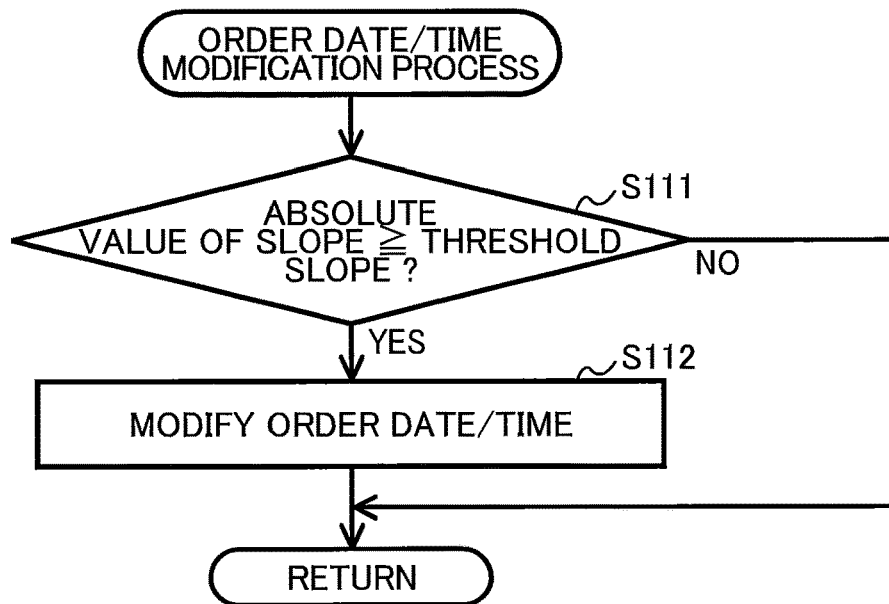
FIG. 11B is a flowchart illustrating an order date/time modification process executed by the controller of the information collection server according to a second embodiment.

In S111 of FIG. 11B, the controller 45 determines whether the absolute value of the slope of the linear function set in S104 is greater than or equal to a threshold slope. The absolute value of the slope of the linear function is dependent on the rate of ink consumption on the printer 10. In other words, the absolute value of slope increases as the rate of ink consumption increases and decreases as the rate of ink consumption decreases. The threshold slope is stored in the storage unit 42 in advance. The threshold slope is an example of the threshold slope of the present disclosure.

When the controller 45 determines that the absolute value of the slope of the linear function is less than the threshold slope (S111: NO), the controller 45 ends the order date/time modification process. Returning to the order date/time setting process of FIG. 11A, in S109 the controller 45 stores the order date/time set in S107 in the item order date/time" of the cartridge management list illustrated in FIG. 13B.

However, when the controller 45 determines that the absolute value of the slope is greater than or equal to the threshold slope (S111: YES), in S112 the controller 45 modifies the order date/time set in S107 of the order date/time setting process illustrated in FIG. 11A. This modification step will be described in greater detail with reference to FIG. 14A.

Figure 14A:
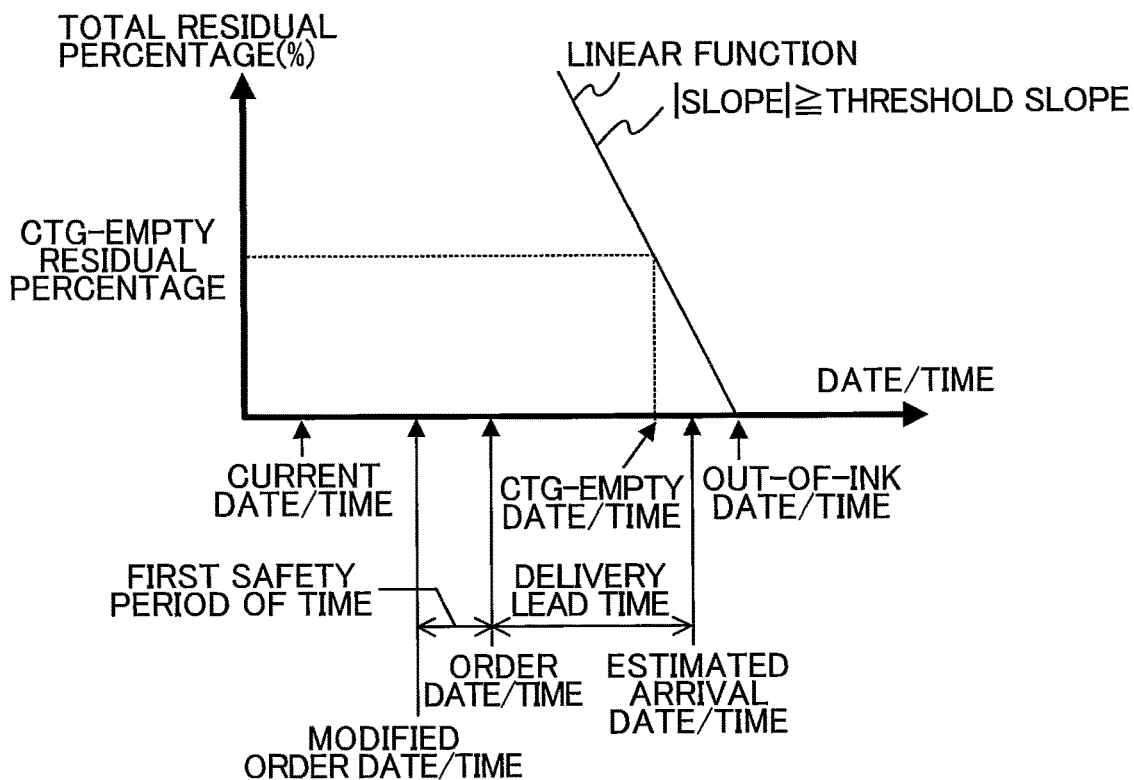
FIG. 14A illustrates a graph representing a linear function, an estimated arrival date/time, and an order date/time in the second embodiment.

FIG. 14A illustrates a linear function in which the absolute value of slope is greater than or equal to the threshold slope. In S112 the controller 45 modifies the order date/time set in S107 of FIG. 11A to a date/time earlier by a first safety period of time (two days, for example). The first safety period of time is stored in the storage unit 42 in advance. Subsequently, the controller 45 ends the order date/time modification process. Returning to the order date/time setting process of FIG. 11A, in S109 the controller 45 stores the modified order date/time in the item "order date/time" of the cartridge management list illustrated in FIG. 13B. Hence, the controller 45 modifies the order date/time stored in the cartridge management list. The process of S112 to modify the order date/time is an example of the (f) modifying of the present disclosure. The first safety period of time is an example of the second period of time of the present disclosure. The modified order date/time is an example of the order date of the present disclosure.

<Effects of the Second Embodiment>

As described above, the significance of the absolute value of slope for the linear function being greater than the threshold value is that the rate of ink consumption is high. When the rate of ink consumption is high, there is a greater chance that the ink stored in the ink tank 160 will be depleted before the new cartridge 200 reaches the user. In the second embodiment, the controller 45 orders a new cartridge 200 on a date/time earlier than the order date/time set in S107 by the first safety period when the absolute value of the slope for the linear function is greater than or equal to the threshold slope. In this way, the second embodiment can suppress the potential for the ink tank 160 running out of ink before the new cartridge 200 reaches the user.

Third Embodiment

The second embodiment describes a case in which the rate of ink consumption is determined on the basis of the absolute value of the slope of the linear function. In the third embodiment, the rate of ink consumption is determined on the basis of the time interval between the CTG empty date/time and out-of-ink date/time estimated in step S105 of FIG. 11A, and the order date/time is modified on the basis of the determined rate of ink consumption.

In S108 of FIG. 11A, the controller 45 of the information collection server 40 executes an order date/time modification process after setting the order date/time in S107. This process will be described in greater detail with reference to FIG. 11C.

Figure 11C:
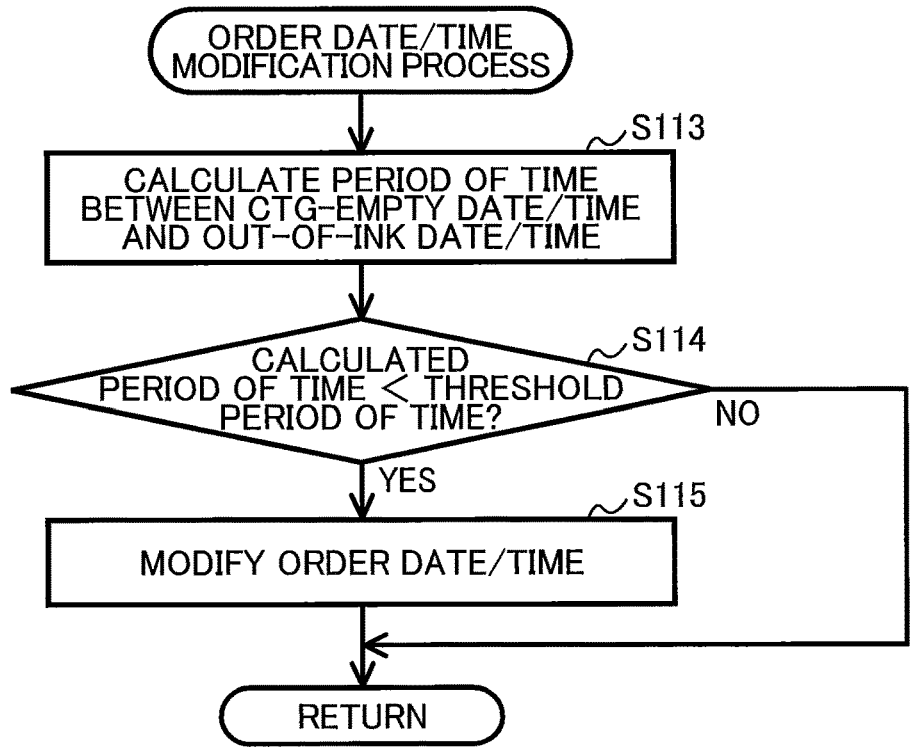
FIG. 11C is a flowchart illustrating an order date/time modification process executed by the controller of the information collection server according to a third embodiment.

In S113 of FIG. 11C, the controller 45 calculates the period of time between the CTG empty date/time and the out-of-ink date/time. The period of time between the CTG empty date/time and the out-of-ink date/time is dependent on the rate of ink consumption on the printer 10. That is, the period of time between the CTG empty date/time and the out-of-ink date/time is shorter when the rate of ink consumption is faster and longer when the rate of ink consumption is slower.

In S114 the controller 45 determines whether the period of time calculated in S113 is less than a threshold period of time. The threshold period of time is stored in the storage unit 42 in advance. If the controller 45 determines that the calculated period of time is greater than or equal to the threshold period of time (S114: NO), the controller 45 skips S115 and ends the order date/time modification process. Returning to the order date/time setting process of FIG. 11A, in S109 the controller 45 stores the order date/time set in S107 in the item order date/time" of the cartridge management list illustrated in FIG. 13B.

However, if the controller 45 determines that the calculated period of time is less than the threshold period of time (S114: YES), in S115 the controller 45 modifies the order date/time set in S107 of FIG. 11A. The modification process in step S115 will be described in greater detail with reference to FIG. 14B. The threshold period of time is an example of the threshold interval of the present disclosure.

Figure 14B:
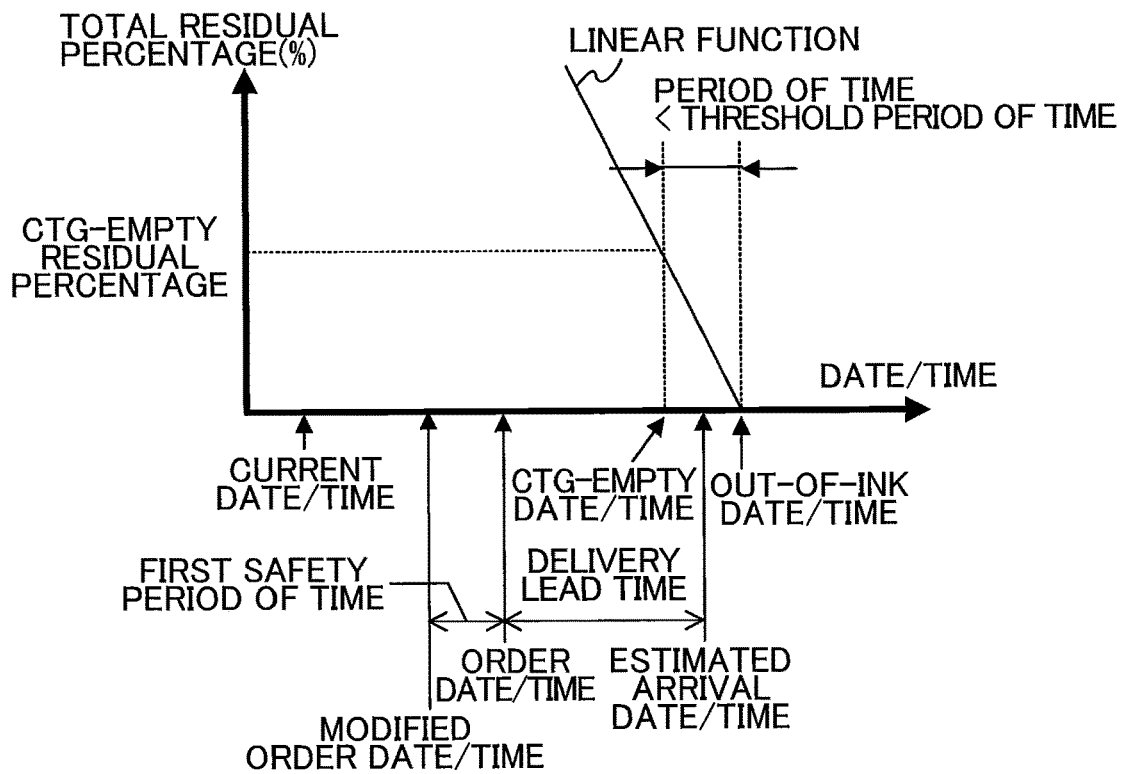
FIG. 14B illustrates a graph representing a linear function, an estimated arrival date/time, and an order date/time in the third embodiment.

FIG. 14B illustrates a linear function in which the calculated period of time is less than the threshold period of time. In S115 the controller 45 modifies the order date/time set in S107 to an earlier date/time by the first safety period of time (two days, for example). The first safety period of time is stored in the storage unit 42 in advance. Subsequently, the controller 45 ends the order date/time modification process. Returning to the order date/time setting process of FIG. 11A, in S109 the controller 45 stores the modified order date/time under item "order date/time" in the cartridge management list of FIG. 13B. In this way, the controller 45 updates the order date/time. The process of S112 to modify the order date/time is an example of the (f) modifying of the present disclosure. The first safety period of time is an example of the second period of time of the present disclosure. The modified order date/time is an example of the order date of the present disclosure.

<Effects of the Third Embodiment>

In the above description, the significance of the period of time between the CTG-empty date/time and the out-of-ink date/time being less than the threshold period of time is that the rate of ink consumption is high. When the rate of ink consumption is high, there is increased probability that the ink tank 160 will become depleted of ink prior to the new cartridge 200 reaching the user. In the third embodiment, when the period of time between the CTG-empty date/time and the out-of-ink date/time is less than the threshold period of time, the new cartridge 200 is ordered on a date/time earlier than the order date/time set in S107 by the first safety period of time. Accordingly, the third embodiment can reduce the chance of the ink tank 160 running out of ink before the new cartridge 200 reaches the user.

While the description has been made in detail with reference to specific embodiments thereof, it would be apparent to those skilled in the art that many modifications and variations may be made thereto. Some variations of the embodiments are given below.

<First Modification>

Figure 12B:
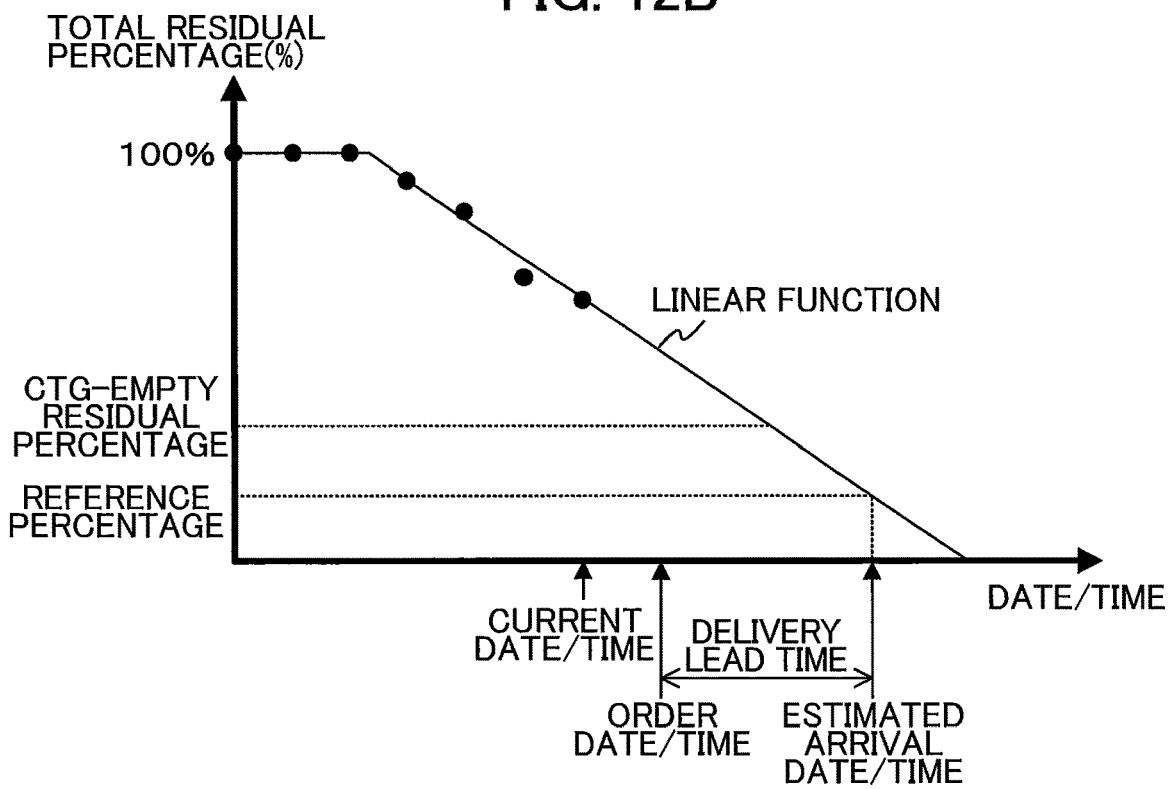
FIG. 12B illustrates a graph representing a linear function, an estimated arrival date/time, and an order date/time in a first modification.

In the example of the embodiments, the estimated arrival date/time is set to the middle date/time of a time span between the CTG-empty date/time and the out-of-ink date/time. In this modification, another example for setting the estimated arrival date/time will be described with reference to FIG. 12B.

In the first modification, the controller 45 of the information collection server 40 sets a reference percentage based on the cartridge-empty residual percentage acquired in S101 of FIG. 11A. The reference percentage is used as a reference for determinations. For example, the controller 45 sets the reference percentage to half the CTG-empty residual percentage. The controller 45 then determines as the estimated arrival date/time the date/time at which the total residual percentage becomes the reference percentage according to the linear function set in S104 of FIG. 11A. Thereafter, as described in the embodiments, the controller 45 stores the estimated arrival date/time in the storage unit 42, sets the order date/time to a date/time earlier than the estimated arrival date/time by the delivery lead time, and stores this order date/time in the item "order date/time" in the cartridge management list of FIG. 13B. Note that the reference percentage may be set to a value smaller than the CTG-empty residual percentage by a prescribed value stored in the storage unit 42. The estimated arrival date/time is an example of the first calendar date of the present disclosure. The order date/time is an example of the order date of the present disclosure.

<Effects of the First Modification>

Despite setting the estimated arrival date/time on the basis of the CTG-empty residual percentage, the first modification can set the estimated arrival date/time to a date/time at which it is highly probable that the cartridge 200 will be out of ink while the ink tank 160 still contains ink. In other words, a new cartridge 200 can be ordered so that the cartridge 200 will no longer contain ink while the ink tank 160 will still have residual ink on the day that the new cartridge 200 arrives.

<Second Modification>

Figure 15A:
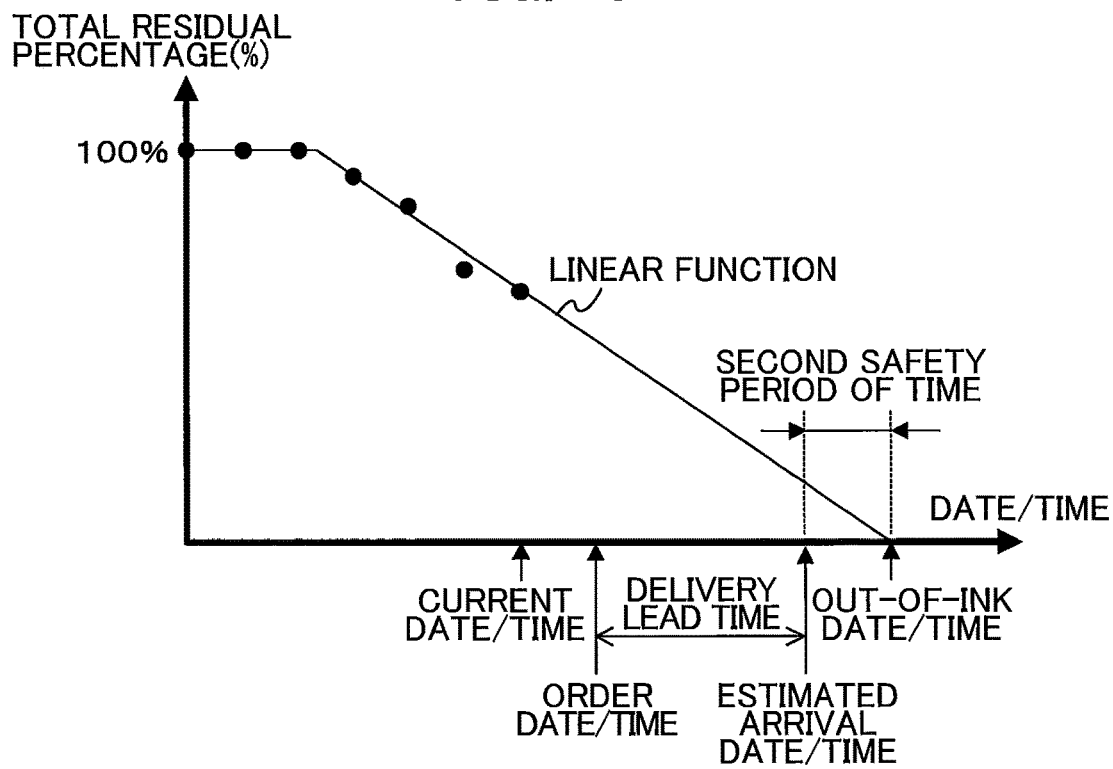
FIG. 15A illustrates a graph representing a linear function, an estimated arrival date/time, and an order date/time in a second modification.

The first embodiment describes an example in which the CTG-empty date/time and the out-of-ink date/time are estimated and the estimated arrival date/time is set using the estimated CTG-empty date/time and out-of-ink date/time. In this modification, an example in which the estimated arrival date/time is set without estimating a CTG-empty date/time will be described with reference to FIG. 15A.

The controller 45 of the information collection server 40 estimates an out-of-ink date/time according to a linear function set in S104 of FIG. 11A. The out-of-ink date/time is the date/time at which the total residual percentage will become zero. Next, the controller 45 sets an estimated arrival date/time to a date/time earlier than the out-of-ink date/time estimated in S104 by a second safety period of time. The second safety period of time is the maximum amount of delay anticipated for delivery of a new cartridge 200 to the user, and is stored in the storage unit 42 in advance. The estimated arrival date/time is an example of the first calendar date of the present disclosure.

Subsequently, as in the first embodiment described above, the controller 45 stores the estimated arrival date/time in the storage unit 42, sets the order date/time to a date/time earlier than the estimated arrival date/time by the delivery lead time, and stores this order date/time in the item "order date/time" of the cartridge management list (see FIG. 13B). The order date/time is an example of the order date of the present disclosure.

<Effects of the Second Modification>

Since the second safety period of time is set to a maximum anticipated delay for a new cartridge 200 when delivery of the new cartridge 200 to the user is delayed and the estimated arrival date/time is set to the date/time earlier than the out-of-ink date/time by this second safety period of time, the new cartridge 200 ordered according to the order date/time set above will at least reach the user before the printer 10 runs out of ink, even if delivery of the cartridge 200 is delayed. Therefore, the second modification reduces the chance that the user will be unable to continue printing.

<Third Modification>

Figure 15B:
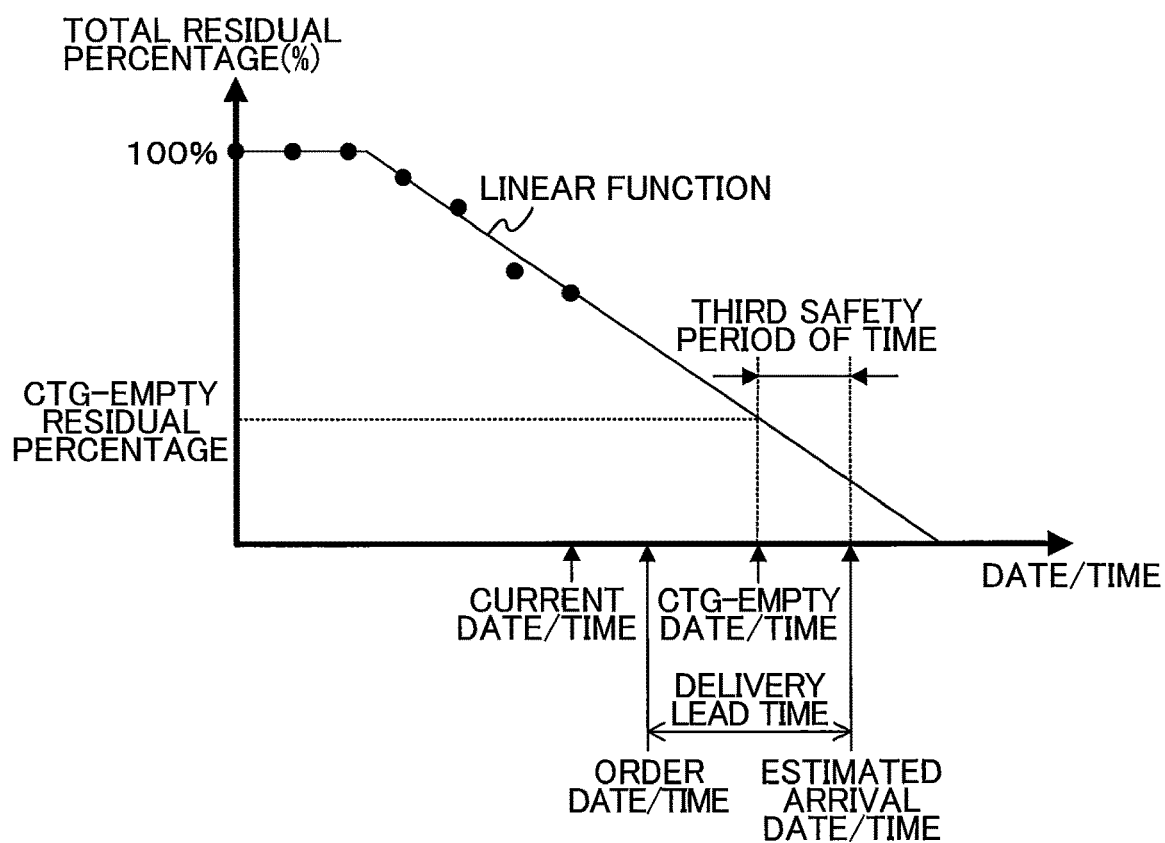
FIG. 15B illustrates a graph representing a linear function, an estimated arrival date/time, and an order date/time in a third modification.

The first embodiment describes an example in which the CTG-empty date/time and the out-of-ink date/time are estimated and the estimated arrival date/time is set using the estimated CTG-empty date/time and out-of-ink date/time. In this modification, an example in which the estimated arrival date/time is set without estimating an out-of-ink date/time will be described with reference to FIG. 15B.

The controller 45 of the information collection server 40 estimates the CTG-empty date/time according to the linear function set in S104 of FIG. 11A. The CTG-empty date/time is the date/time at which the total residual percentage becomes the CTG-empty residual percentage. Next, the controller 45 sets the estimated arrival date/time to a date/time later than the CTG-empty date/time by a third safety period of time (two days, for example). The third safety period of time is stored in the storage unit 42 in advance. The third safety period of time is set to a length of time equivalent to the earliest possible period of time that the new cartridge 200 could be delivered after ordering, assuming an earlier date/time than the estimated arrival date/time. The estimated arrival date/time is an example of the first calendar date of the present disclosure.

Subsequently, as in the first embodiment described above, the controller 45 stores the estimated arrival date/time in the storage unit 42, sets the order date/time to a date/time earlier than the estimated arrival date/time by the delivery lead time, and stores this date/time under the item "order date/time" of the cartridge management list illustrated in FIG. 13B.

<Effects of the Third Modification>

Since the third safety period of time is set to a length of time equivalent to the earliest possible delivery time should the new cartridge 200 be delivered earlier than the estimated arrival date/time and the estimated arrival date/time is set to the date/time later than the CTG-empty date/time by this third safety period of time, the new cartridge 200 will at least reach the user after all ink in the cartridge 200 has been consumed, despite the cartridge 200 arriving early. Therefore, the third modification reduces the chance that ink will be wasted if ink still remains in the old cartridge 200 when the user replaces the old cartridge 200 with the new cartridge 200.

<Fourth Modification>

The first embodiment describes an example of setting a linear function based on total residual percentages and their acquisition dates/times and using this linear function to set an estimated arrival date/time and an order date/time. This modification will describe an example of setting a linear function based on cartridge residual percentages and using this linear function to set the estimated arrival date/time and the order date/time.

Figure 9A:
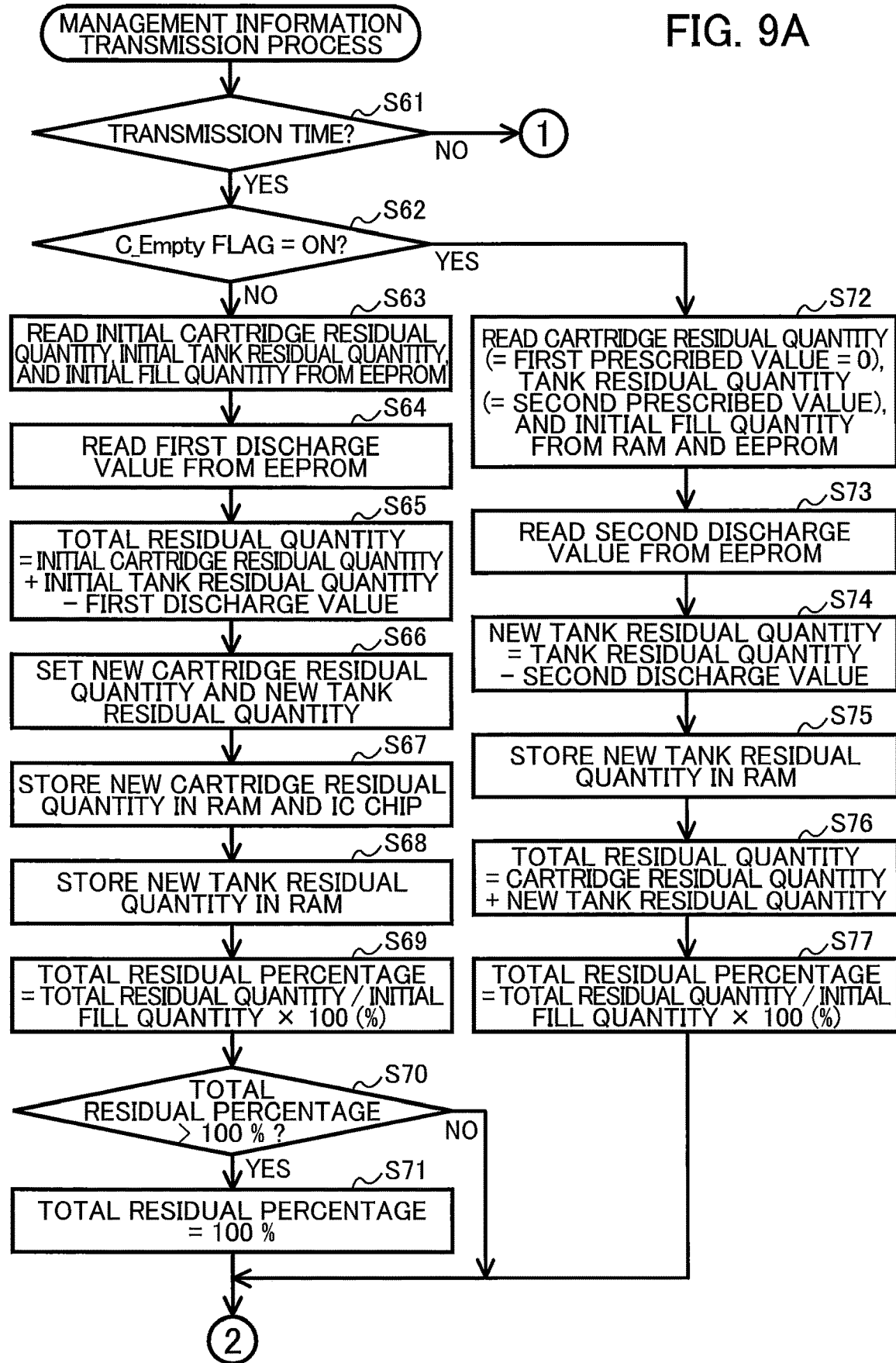
FIG. 9A is a flowchart illustrating a part of steps in a management information transmission process executed by the controller of the printer according to the embodiment.
Figure 9B:
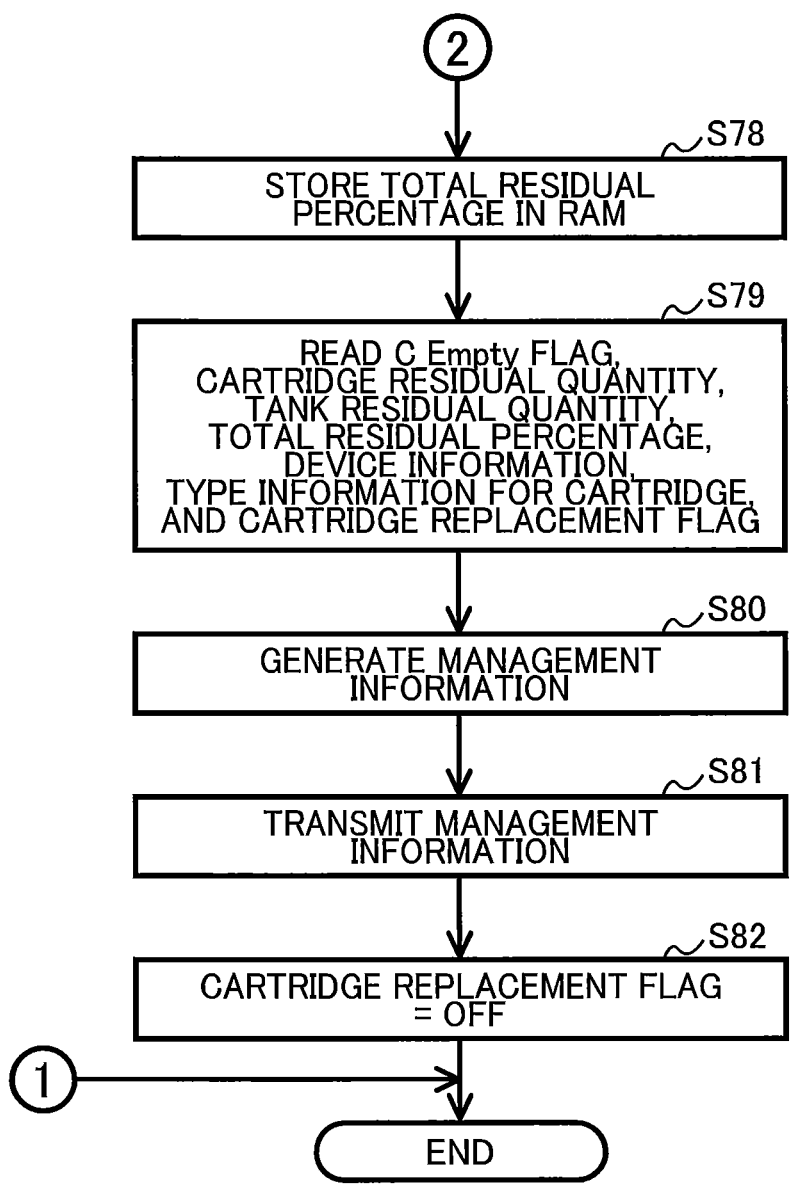
FIG. 9B is a flowchart illustrating a remaining part of steps in the management information transmission process executed by the controller of the printer according to the embodiments.
Figure 16A:
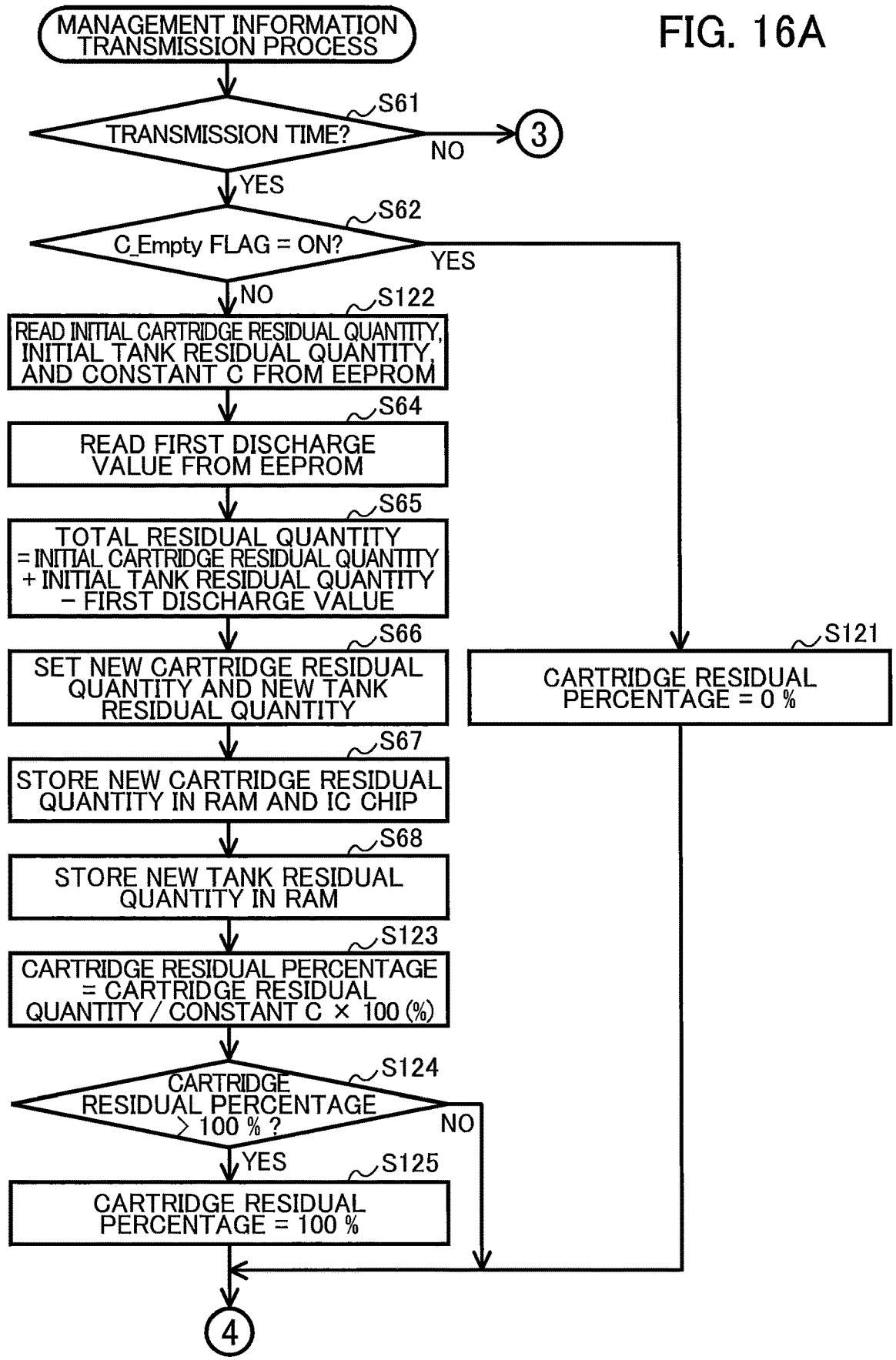
FIG. 16A is a flowchart illustrating a part of steps in a management information transmission process executed by a controller of a printer according to a fourth modification.

In the fourth modification, the controller 130 of the printer 10 executes the management information transmission process illustrated in FIGS. 16A and 16B in place of the process illustrated in FIGS. 9A and 9B.

In the management information transmission process illustrated in FIGS. 16A and 16B, the controller 130 calculates a cartridge residual percentage using the cartridge residual quantity set in one of the updating processes illustrated in FIGS. 8A through 8D, and transmits management information to the information collection server 40 that includes this cartridge residual percentage. In the following description, steps identical to those in the first embodiment are designated with the same step numbers to avoid duplicating description. All steps other than those described in this modification are identical to those described in the first embodiment.

As in the first embodiment, when the controller 130 of the printer 10 determines that the current time matches the transmission time (S61: YES), in S62 the controller 130 checks the value of the C_Empty flag, as described in S62 of the first embodiment. If the controller 130 determines that the C_Empty flag is set to "ON" (S62: YES), in S121 the controller 130 sets the cartridge residual percentage to zero.

However, if the controller 130 determines that the C_Empty flag is set to "OFF" (S62: NO), in S122 the controller 130 reads the initial cartridge residual quantity and the initial tank residual quantity from the EEPROM 51, as described in the first embodiment, and also reads a constant C from the EEPROM 51. The constant C will be described later.

After S122, the controller 130 executes the process from S64 to S68 that is identical to the first embodiment. Following S68, in S123 the controller 130 calculates a cartridge residual percentage (%) by dividing the new cartridge residual quantity set in S66 by the constant C read in S122 and multiplying the result by 100.

In S124 the controller 130 determines whether the cartridge residual percentage calculated in S123 exceeds 100%. A case in which the cartridge residual percentage exceeds 100% will be described next in greater detail.

The constant C is a value indicating the quantity of ink accommodated in a new cartridge 200 when the difference in hydraulic head between the ink accommodated in the new cartridge 20 and ink accommodated in the ink tank 160 becomes negligible after the new cartridge 200 accommodating ink of an initial fill quantity was mounted in the mounting case 150 while the S_Empty flag was set to "ON". Hence, the cartridge residual quantity is the value exceeding the constant C when a new cartridge 200 accommodating ink of the initial fill quantity is mounted in the mounting case 150 while ink remains in the ink tank 160. When the cartridge residual quantity exceeds the constant C, the cartridge residual percentage calculated by dividing the cartridge residual quantity by the constant C and multiplying by 100 will exceed 100%. In other words, when a new cartridge 200 accommodating ink at the initial fill quantity is mounted in the mounting case 150 while ink remains in the ink tank 160, the cartridge residual percentage is greater than 100%.

Note that the constant C is the same value as the cartridge residual quantity calculated when a cartridge 200 accommodating ink at the initial fill quantity is mounted in the mounting case 150 while the S_Empty flag is set to "ON" (see S35 in FIG. 8A).

If the controller 130 determines in S124 that the cartridge residual percentage exceeds 100% (S124: YES), in S125 the controller 130 changes the cartridge residual percentage to 100%. However, if the controller 130 determines that the cartridge residual percentage does not exceed 100% (S124: NO), the controller 130 skips S125.

The controller 130 changes a cartridge residual percentage to 100% when the cartridge residual percentage exceeds 100% to ensure consistency with printers that do not transmit cartridge residual percentages greater than 100%. A printer that does not transmit a cartridge residual percentage exceeding 100% signifies a printer provided with the mounting case 150 but not the ink tanks 160. Printers having a mounting case 150 but no ink tanks 160 transmit a value obtained by dividing the current residual quantity by the initial fill quantity in the cartridge and multiplying the result by 100 as the residual percentage. In other words, a printer that has a mounting case 150 but no ink tanks 160 transmits a residual percentage of 100% or less. Since the printer 10 modifies a cartridge residual percentage exceeding 100% to 100%, the printer 10 can ensure consistency with printers having a mounting case 150 but no ink tanks 160. In other words, the printer 10 can transmit a cartridge residual percentage to an information collection server 40 incapable of processing residual percentages over 100% and direct the information collection server 40 to process this data.

In S126 the controller 130 stores the cartridge residual percentage calculated in S123, the cartridge residual percentage adjusted to 100% in S125, or the cartridge residual percentage set to zero in S121 in the RAM 52.

In S127 the controller 130 reads the value of the C_Empty flag, the device information, and the value of the cartridge replacement flag from the EEPROM 51, the cartridge residual quantity and the cartridge residual percentage from the RAM 52, and the type information for the cartridge 200 from the IC chip 34. In S128 the controller 130 generates management information that includes the value of the C_Empty flag, the cartridge residual quantity, the cartridge residual percentage, the device information, the type information of the cartridge 200, and the value of the cartridge replacement flag. The cartridge residual percentage included in the management information is an example of the index value of the present disclosure.

In S81 the controller 130 transmits the management information generated in S128 to the information collection server 40, as in the first embodiment. Also as in the first embodiment, the controller 130 sets the cartridge replacement flag to "OFF" in S82 and subsequently ends the management information transmission process.

As in the first embodiment, the information collection server 40 receives the management information transmitted from the printer 10. Upon receiving the management information, the controller 45 of the information collection server 40 executes, as the process in S96 of FIG. 10, the order date/time setting process illustrated in FIG. 18A in place of the process illustrated in FIG. 11A. The order date/time setting process of FIG. 18A will be described next, wherein the steps identical to those in the process described in the first embodiment (FIG. 11A) are designated with the same step numbers to avoid duplicating description.

Figure 18A:
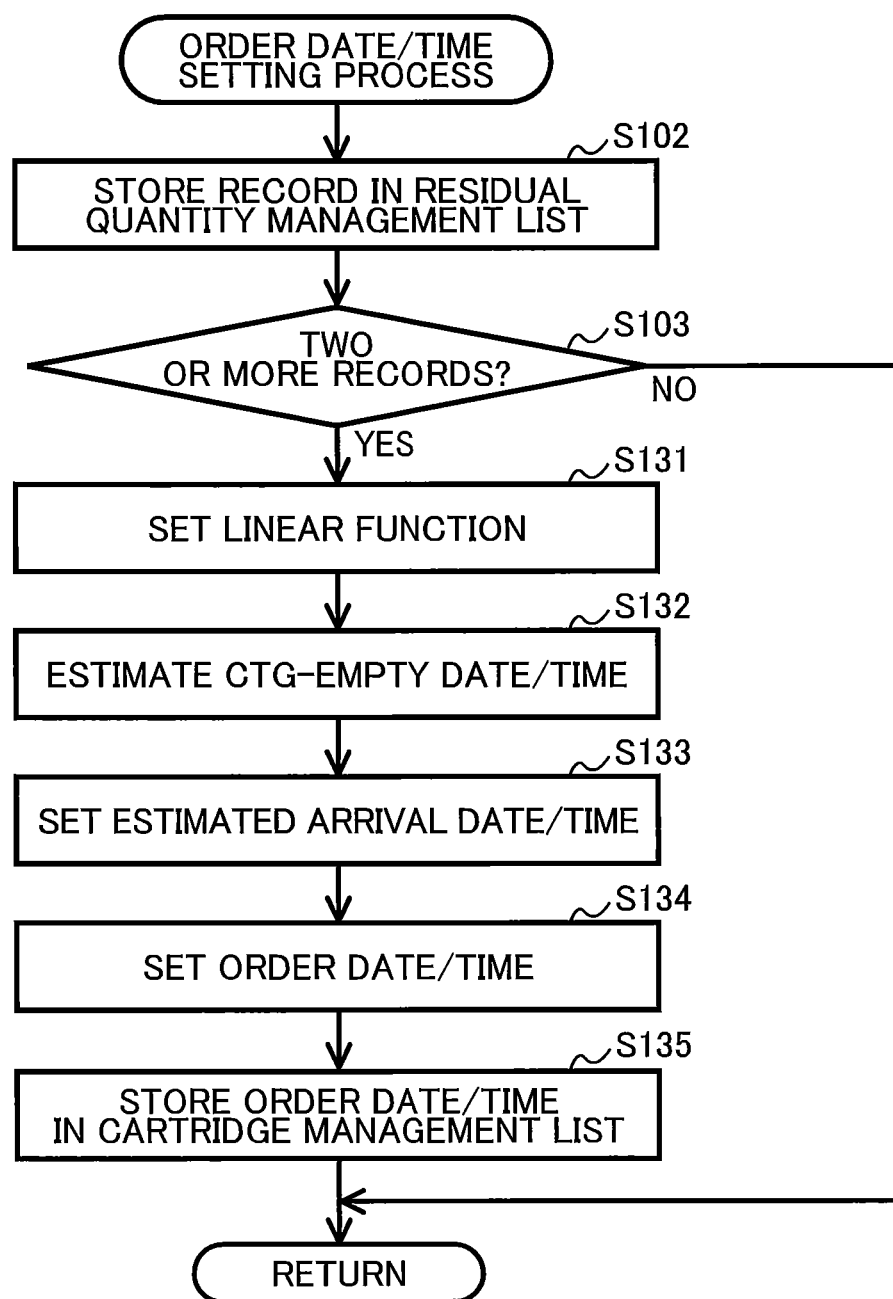
FIG. 18A is a flowchart illustrating an order date/time setting process executed by the controller of the information collection server according to the fourth modification.

At the beginning of the order date/time setting process of FIG. 18A, the controller 45 of the information collection server 40 executes the same steps S102 and S103 described in the first embodiment. Note that the residual quantity management list in which management information is stored in S102 is provided with the item "cartridge residual percentage" in place of the items "total residual percentage," "total residual quantity," and "tank residual quantity."

If the controller 45 determines in S103 that the residual quantity management list contains two or more records for the same cartridge 200 indicating a cartridge residual percentage less than 100% (S103: YES), in S131 the controller 45 sets a linear function based on the dates/times and cartridge residual percentages in these records.

Figure 19A:
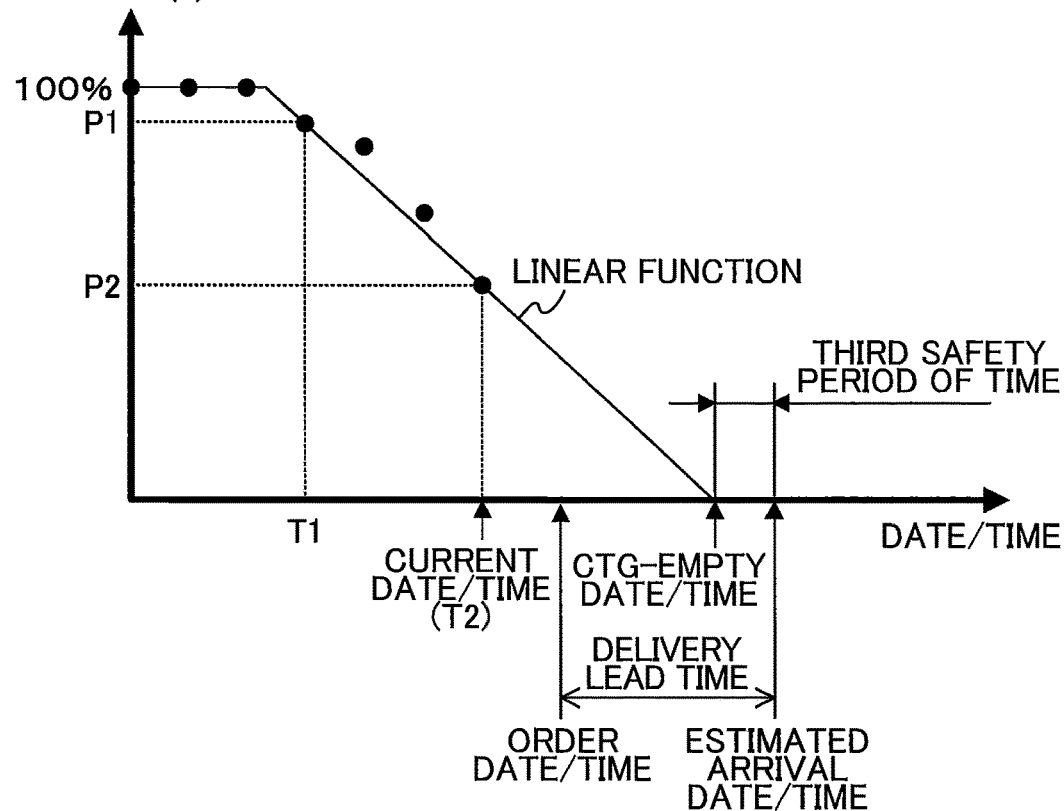
FIG. 19A illustrates a graph representing a linear function, an estimated arrival date/time, and an order date/time in the fourth modification.

The method of setting the linear function will be described next in greater detail with reference to FIG. 19A. FIG. 19A illustrates a graph whose horizontal axis (X-axis) represents date/time and whose vertical axis (Y-axis) represents cartridge residual percentage.

The controller 45 sets an initial record at which the cartridge residual percentage has dropped below 100% according to the items "cartridge residual percentage" and "acquisition date/time" in the residual quantity management list. The controller 45 acquires the acquisition date/time T1 and cartridge residual percentage P1 for the initial record set above from the residual quantity management list. The controller 45 also sets a most recent record according to the item "acquisition date/time" in the residual quantity management list. The controller 45 acquires the acquisition date/time T2 and the cartridge residual percentage P2 for the most recent record from the residual quantity management list. Here, the acquisition date/time T2 is a date/time at which management information including data items in the most recent record was acquired, and is also called a "current date/time".

In S131 the controller 45 sets a straight line passing through point (T1, P1) and point (T2, P2) having the slope (P2−P1)/(T2−T1) as the linear function. Note that the controller 45 may set the linear function to a line passing through points specified by any two records with a cartridge residual percentage less than 100%.

After setting the linear function in S131 of FIG. 18A, in S132 the controller 45 estimates a CTG-empty date/time. In S133 the controller 45 sets an estimated arrival date/time from the CTG-empty date/time estimated in S132 and stores the estimated arrival date/time in the storage unit 42. In S134 the controller 45 sets an order date/time indicating the date/time that the cartridge 200 is to be ordered on the basis of the estimated arrival date/time. This process will be described in greater detail with reference to FIG. 19A.

The controller 45 estimates the CTG-empty date/time indicating when the cartridge residual percentage will become zero according to the linear function set in S131. In other words, the controller 45 sets the date/time at which the cartridge 200 will become empty as the CTG-empty date/time. Next, the controller 45 sets the estimated arrival date/time to be the date/time later than the CTG-empty date/time by a third safety period of time. The third safety period of time is set to a length of time equivalent to the earliest possible period of time that the new cartridge 200 could be delivered after ordering, assuming an earlier date/time than the estimated arrival date/time, and is stored in the storage unit 42 in advance. The estimated arrival date/time is an example of the first calendar date of the present disclosure.

In S134 the controller 45 sets the order date/time to a date/time earlier than the estimated arrival date/time by the delivery lead time, and in S135 stores this order date/time under the item "order date/time" in the cartridge management list. The order date/time is an example of the order date of the present disclosure.

<Effects of the Fourth Modification>

In the fourth modification, the controller 45 sets a linear function based on acquisition dates/times and cartridge residual percentages and according to this linear function sets an estimated arrival date/time at which the cartridge 200 is expected to be out of ink while the ink tank 160 is expected to still contain ink. The controller 45 sets an order date/time indicating the date/time to transmit an order command to a date/time earlier than the estimated arrival date/time by the delivery lead time. Therefore, the new cartridge 200 can be delivered to the user at a time when ink no longer remains in the old cartridge 200 but still remains in the ink tank 160. Thus, the fourth modification can prevent printing from becoming impossible before the cartridge 200 can be replaced and can prevent ink from being wasted owing to the old cartridge 200 being replaced by the new cartridge 200 while ink still remains in the old cartridge 200.

Further, since the third safety period of time is set to a length of time equivalent to the earliest possible delivery time should the new cartridge 200 be delivered earlier than the estimated arrival date/time and the estimated arrival date/time is set to the date/time later than the CTG-empty date/time by this third safety period of time, the new cartridge 200 at least reaches the user after the existing cartridge 200 becomes depleted of ink, even if the cartridge 200 is delivered to the user faster than expected. Therefore, the fourth modification reduces the chance of ink being wasted owing to the old cartridge 200 being replaced by the new cartridge 200 while ink still remains in the old cartridge 200.

<Fifth Modification>

The first embodiment describes an example of setting a linear function based on total residual percentages and their acquisition dates/times and using this linear function to set an estimated arrival date/time and an order date/time. The fifth modification describes an example of setting a linear function based on the tank residual percentages and using this linear function to set the estimated arrival date/time and the order date/time.

Figure 17A:
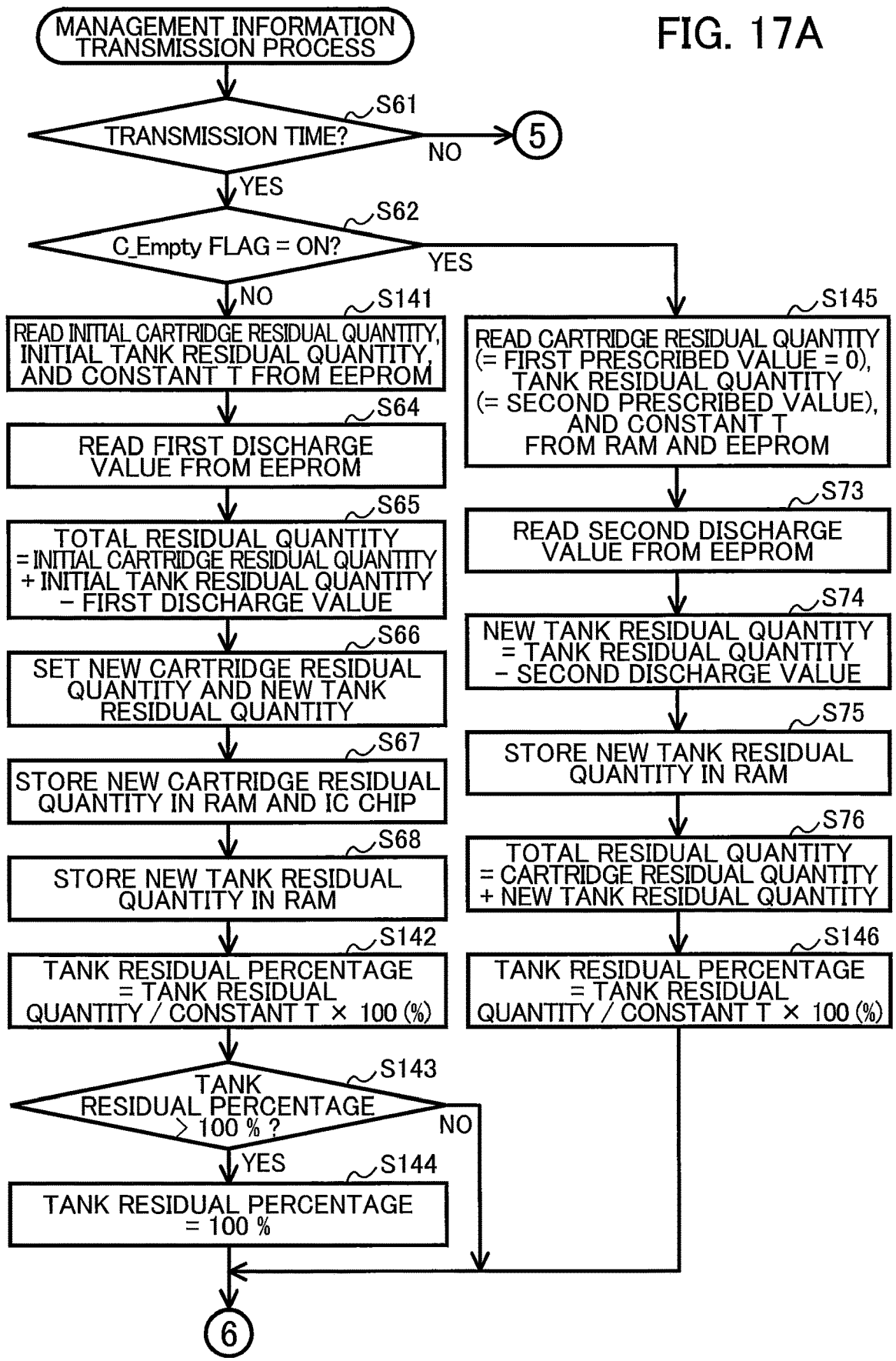
FIG. 17A is a flowchart illustrating a part of steps in a management information transmission process executed by a controller of a printer according to a fifth modification.

In the fifth modification, the controller 130 of the printer 10 executes the management information transmission process illustrated in FIGS. 17A and 17B in place of the process illustrated in FIGS. 9A and 9B.

As in the first embodiment, when the controller 130 of the printer 10 determines that the current time matches the transmission time (S61: YES), in S62 the controller 130 checks the value of the C_Empty flag, as described in S62 of the first embodiment. If the controller 130 determines that the C_Empty flag is set to "OFF" (S62: NO), in S141 the controller 130 reads the initial cartridge residual quantity and initial tank residual quantity from the EEPROM 51, as described in the first embodiment, and also reads a constant T from the EEPROM 51. The constant T will be described later.

After S141, the controller 130 executes the process from S64 to S68 that is identical to the first embodiment. Following S68, in S142 the controller 130 calculates a tank residual percentage (%) by dividing the new tank residual quantity set in S66 by the constant T read in S141 and multiplying the result by 100.

In S143 the controller 130 determines whether the tank residual percentage calculated in S142 exceeds 100%. A case in which the tank residual percentage exceeds 100% will be described next in greater detail.

The constant T is a value indicating the quantity of ink accommodated in the ink tank 160 when the difference in hydraulic head between ink accommodated in a new cartridge 20 and ink accommodated in the ink tank 160 becomes negligible after the new cartridge 200 accommodating ink of an initial fill quantity was mounted in the mounting case 150 while the S_Empty flag was set to "ON". Hence, the tank residual quantity is the value exceeding the constant T when a new cartridge 200 accommodating ink of the initial fill quantity is mounted in the mounting case 150 while ink remains in the liquid chamber 171 of the ink tank 160. When the tank residual quantity exceeds the constant T, the tank residual percentage calculated by dividing the tank residual quantity by the constant T and multiplying by 100 will exceed 100%.

Note that the constant T is the same value as the tank residual quantity calculated when a cartridge 200 accommodating ink at the initial fill quantity is mounted in the mounting case 150 while the S_Empty flag is set to "ON" (see S35 in FIG. 8A).

If the controller 130 determines in S143 that the tank residual percentage calculated in S142 exceeds 100% (S143: YES), in S144 the controller 130 changes the tank residual percentage to 100%. However, if the controller 130 determines that the tank residual percentage does not exceed 100% (S143: NO), the controller 130 skips S144.

The controller 130 changes the tank residual percentage to 100% when the tank residual percentage exceeds 100% to ensure consistency with printers that do not transmit residual percentages greater than 100%. A printer that does not transmit residual percentages exceeding 100% signifies a printer provided with the mounting case 150 but not the ink tanks 160. Printers having a mounting case 150 but no ink tanks 160 transmit a value obtained by dividing the current residual quantity by the initial fill quantity in the cartridge and multiplying the result by 100 as the residual percentage. In other words, a printer that has a mounting case 150 but no ink tanks 160 transmits a residual percentage of 100% or less. Since the printer 10 modifies a tank residual percentage exceeding 100% to 100%, the printer 10 can ensure consistency with printers having a mounting case 150 but no ink tanks 160. In other words, the printer 10 can transmit a tank residual percentage to an information collection server 40 incapable of processing residual percentages over 100% and direct the information collection server 40 to process this data.

On the other hand, if the controller 130 determines in S62 that the C_Empty flag is "ON" (S62: YES), in S145 the controller 130 reads the cartridge residual quantity (first prescribed value=zero), the tank residual quantity (second prescribed value) from the RAM 52, as in the first embodiment, and reads the constant T from the EEPROM 51. Subsequently, the controller 130 executes the process from S73 to S76 that is identical to the first embodiment. Next, in S146 the controller 130 calculates the tank residual percentage by executing the same process described above for S142.

In S147 the controller 130 stores the tank residual percentage calculated in S142, the tank residual percentage adjusted to 100% in S144, or the tank residual percentage calculated in S146 in the RAM 52.

In S148 the controller 130 reads the value of the C_Empty flag, the device information, and the value of the cartridge replacement flag from the EEPROM 51, the tank residual percentage from the RAM 52, and the type information for the cartridge 200 from the IC chip 34. In S149 the controller 130 generates management information that includes the value of the C_Empty flag, the device information, the type information for the cartridge 200, the tank residual percentage, and the value of the cartridge replacement flag. The tank residual percentage included in the management information is an example of the index value of the present disclosure.

In S81 the controller 130 transmits the management information generated in S149 to the information collection server 40, as in the first embodiment. Also as in the first embodiment, the controller 130 sets the cartridge replacement flag to "OFF" in S82 and subsequently ends the management information transmission process.

As in the first embodiment, the information collection server 40 receives the management information transmitted from the printer 10. Upon receiving the management information, the controller 45 of the information collection server 40 executes, as the process in S96 of FIG. 10, the order date/time setting process illustrated in FIG. 18B in place of the process illustrated in FIG. 11A. The order date/time setting process of FIG. 18B will be described next, wherein the steps identical to those in the process described in the first embodiment (FIG. 11A) are designated with the same step numbers to avoid duplicating description.

Figure 18B:
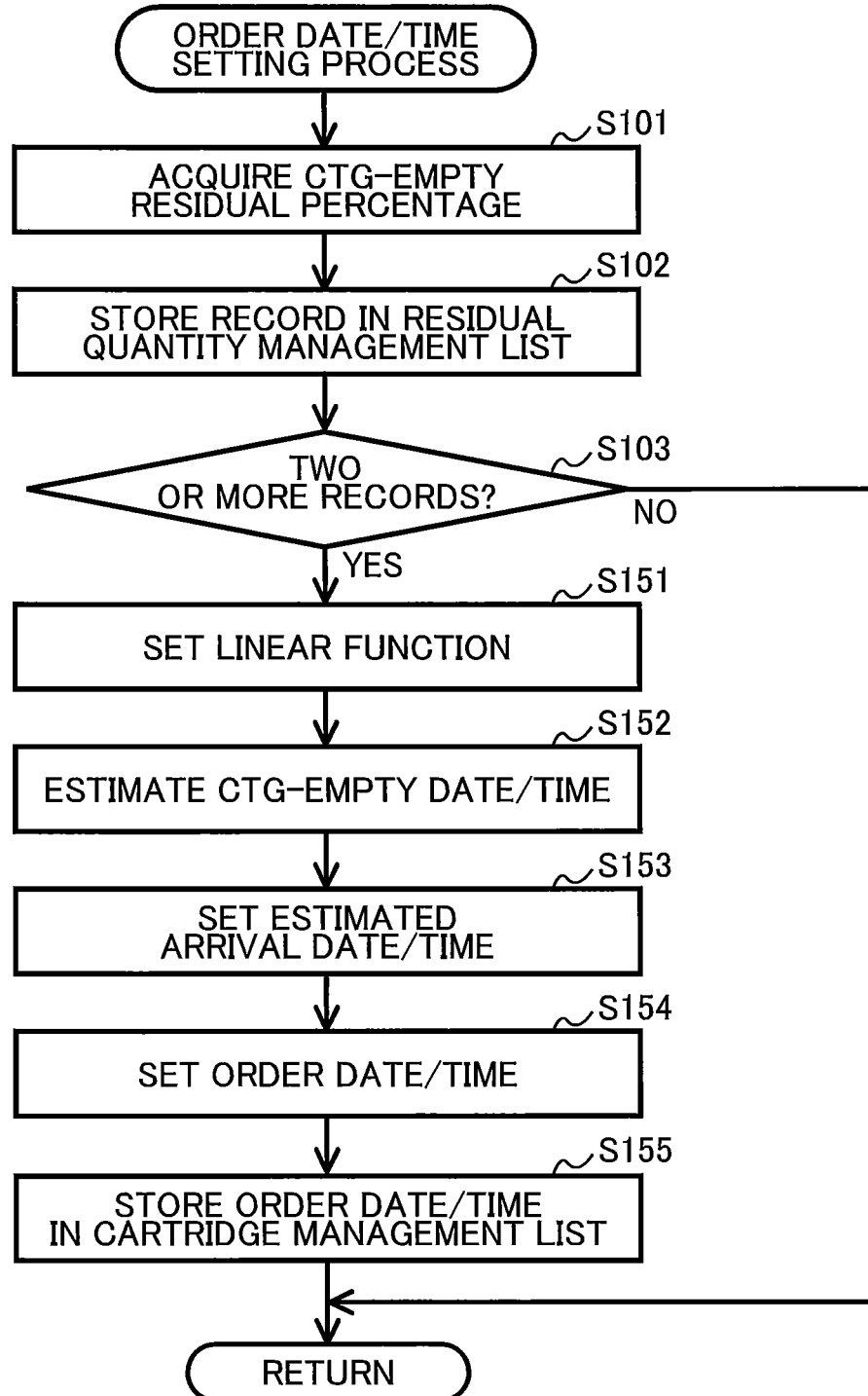
FIG. 18B is a flowchart illustrating an order date/time setting process executed by the controller of the information collection server according to the fifth modification.

At the beginning of the order date/time setting process of FIG. 18B, the controller 45 of the information collection server 40 executes the same steps S101 through S103 described in the first embodiment. Note that the residual quantity management list in which management information is stored in S102 is provided with the item "tank residual percentage" in place of the items "total residual percentage," "total residual quantity," and "cartridge residual quantity."

If the controller 45 determines in S103 that the residual quantity management list contains two or more records for the same cartridge 200 indicating a tank residual percentage less than 100% (S103: YES), in S151 the controller 45 sets a linear function based on the dates/times and tank residual percentages in these records.

The method of setting the linear function will be described next in greater detail with reference to FIG. 19B.

Figure 19B:
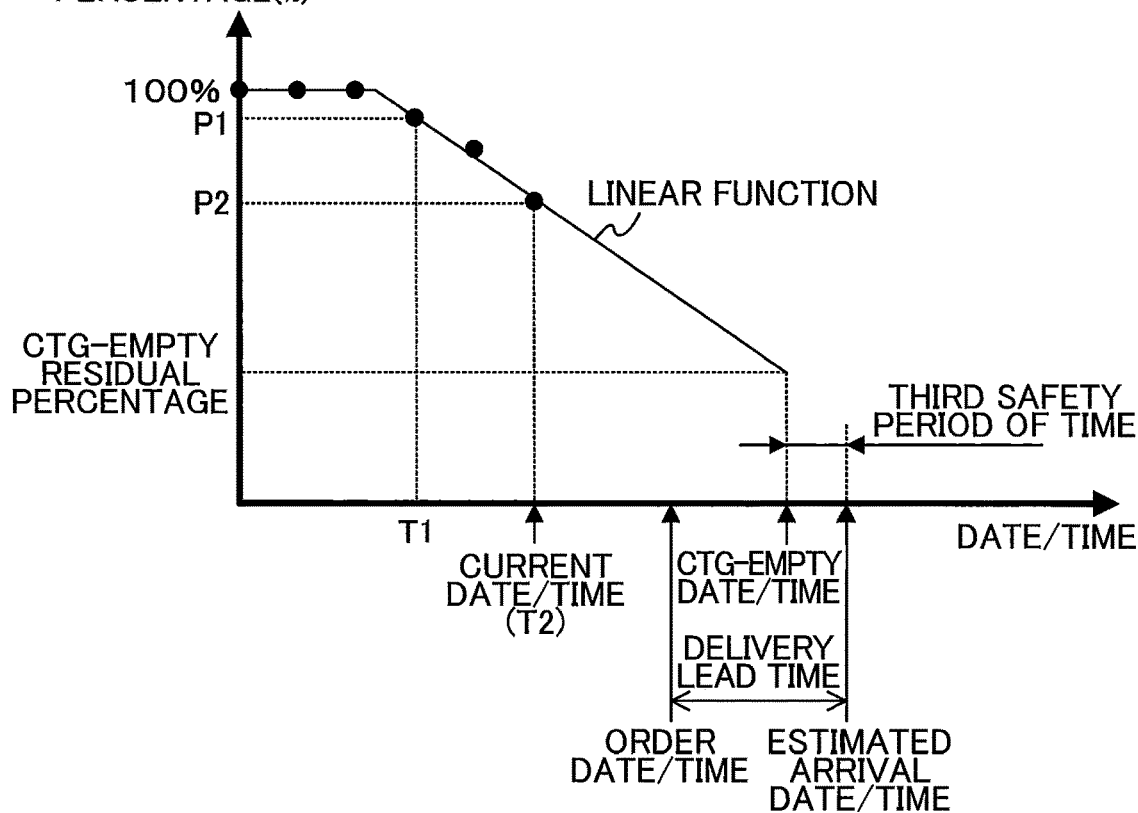
FIG. 19B illustrates a graph representing a linear function, an estimated arrival date/time, and an order date/time in the fifth modification.

FIG. 19B illustrates a graph whose horizontal axis (X-axis) represents date/time and whose vertical axis (Y-axis) represents tank residual percentage.

The controller 45 sets an initial record at which the tank residual percentage has dropped below 100% according to the items "tank residual percentage" and "acquisition date/time" in the residual quantity management list. The controller 45 acquires the acquisition date/time T1 and tank residual percentage P1 for the initial record set above from the residual quantity management list. The controller 45 also sets a most recent record according to the item "acquisition date/time" in the residual quantity management list. The controller 45 acquires the acquisition date/time T2 and the tank residual percentage P2 for the most recent record from the residual quantity management list. Here, the acquisition date/time T2 is a date/time at which management information including data items in the most recent record was acquired, and is also called a "current date/time".

In S151 the controller 45 sets a straight line passing through point (T1, P1) and point (T2, P2) having the slope (P2−P1)/(T2−T1) as the linear function. Note that the controller 45 may set the linear function to a line passing through points specified by any two records having a tank residual percentage less than 100%.

After setting the linear function in S151 of FIG. 18B, in S152 the controller 45 estimates a CTG-empty date/time. In S153 the controller 45 sets an estimated arrival date/time from the CTG-empty date/time estimated in S152 and stores the estimated arrival date/time in the storage unit 42. In S154 the controller 45 sets an order date/time indicating the date/time that the cartridge 200 is to be ordered on the basis of the estimated arrival date/time. This process will be described in greater detail with reference to FIG. 19B.

The controller 45 estimates the CTG-empty date/time indicating when the tank residual percentage will become the CTG-empty residual percentage according to the linear function set in S151. The CTG-empty residual percentage is a value specifying the residual quantity of ink in the ink tank 160 when the cartridge 200 becomes empty. Hence, the controller 45 estimates the date/time at which the cartridge 200 will become empty and sets this date/time as the CTG-empty date/time. Next, the controller 45 sets the estimated arrival date/time to be the date/time later than the CTG-empty date/time by the third safety period of time. The third safety period of time is set to a length of time equivalent to the earliest possible period of time that the new cartridge 200 could be delivered after ordering, assuming an earlier date/time than the estimated arrival date/time. The estimated arrival date/time is an example of the first calendar date of the present disclosure.

In S154 the controller 45 sets the order date/time to a date/time earlier than the estimated arrival date/time by the delivery lead time, and in S155 stores this order date/time under the item "order date/time" in the cartridge management list. The order date/time is an example of the order date of the present disclosure.

<Effects of the Fifth Modification>

In the fifth modification, the controller 45 sets a linear function based on acquisition dates/times and tank residual percentages and according to this linear function sets an estimated arrival date/time at which the cartridge 200 is expected to be out of ink while the ink tank 160 is expected to still contain ink. The controller 45 sets an order date/time indicating the date/time to transmit an order command to a date/time earlier than the estimated arrival date/time by the delivery lead time. Therefore, the new cartridge 200 can be delivered to the user at a time when ink no longer remains in the old cartridge 200 but still remains in the ink tank 160. Thus, the fifth modification can prevent printing from becoming impossible before the cartridge 200 can be replaced and can prevent ink from being wasted owing to the old cartridge 200 being replaced by the new cartridge 200 while ink still remains in the old cartridge 200.

Further, since the third safety period of time is set to a length of time equivalent to the earliest possible delivery time should the new cartridge 200 be delivered earlier than the estimated arrival date/time and the estimated arrival date/time is set to the date/time later than the CTG-empty date/time by this third safety period of time, the new cartridge 200 at least reaches the user after the existing cartridge 200 becomes depleted of ink, even if the cartridge 200 is delivered to the user faster than expected. Therefore, the fourth modification reduces the chance of ink being wasted owing to the old cartridge 200 being replaced by the new cartridge 200 while ink still remains in the old cartridge 200.

<Sixth Modification>

The first embodiment describes an example in which the information collection server 40 sets an order date/time and transmits an order command to the shipping server 50 when the current time reaches the order date/time. The sixth modification describes an example in which the information collection server 40 transmits an order command to the shipping server 50 when the total residual percentage reaches an order residual percentage (see FIG. 20B).

Figure 20A:
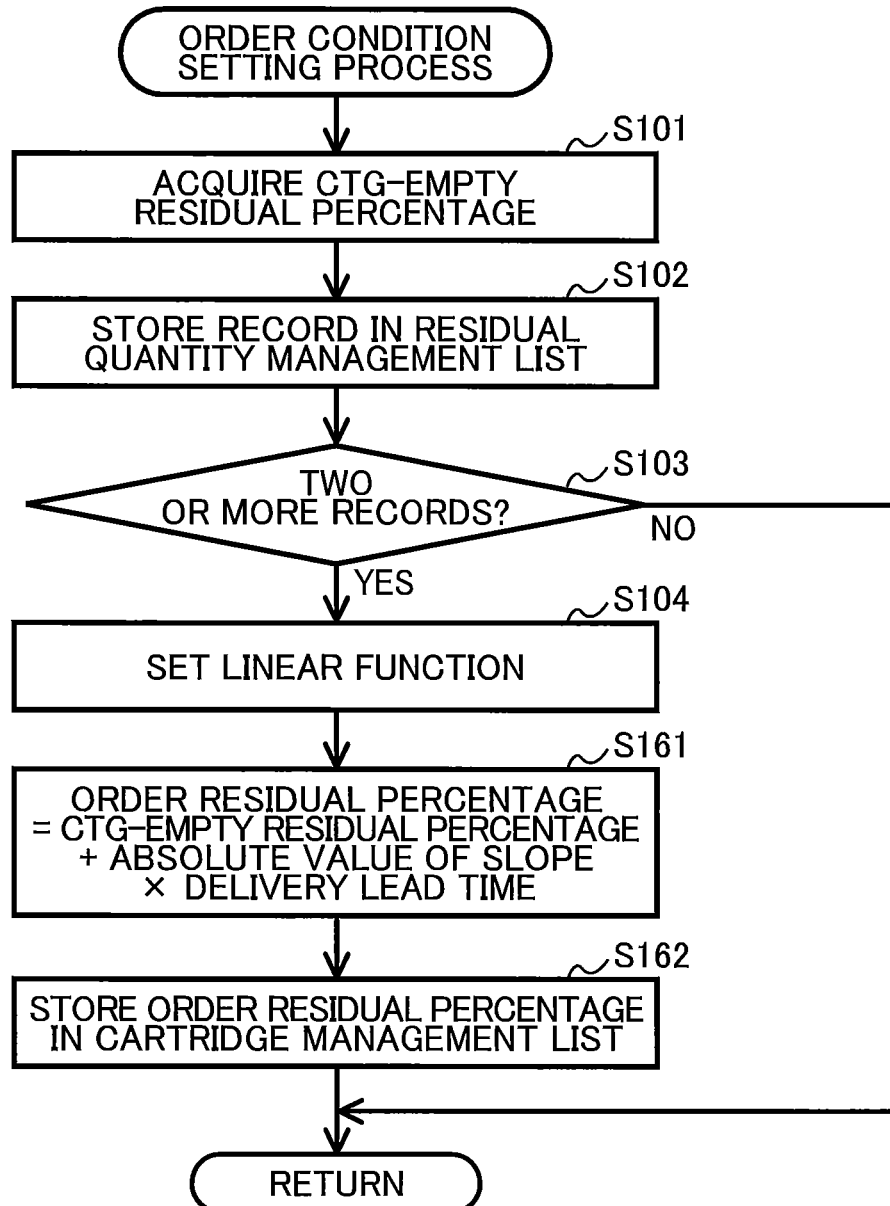
FIG. 20A is a flowchart illustrating an order condition setting process executed by a controller of an information collection server according to a sixth modification.
Figure 20B:
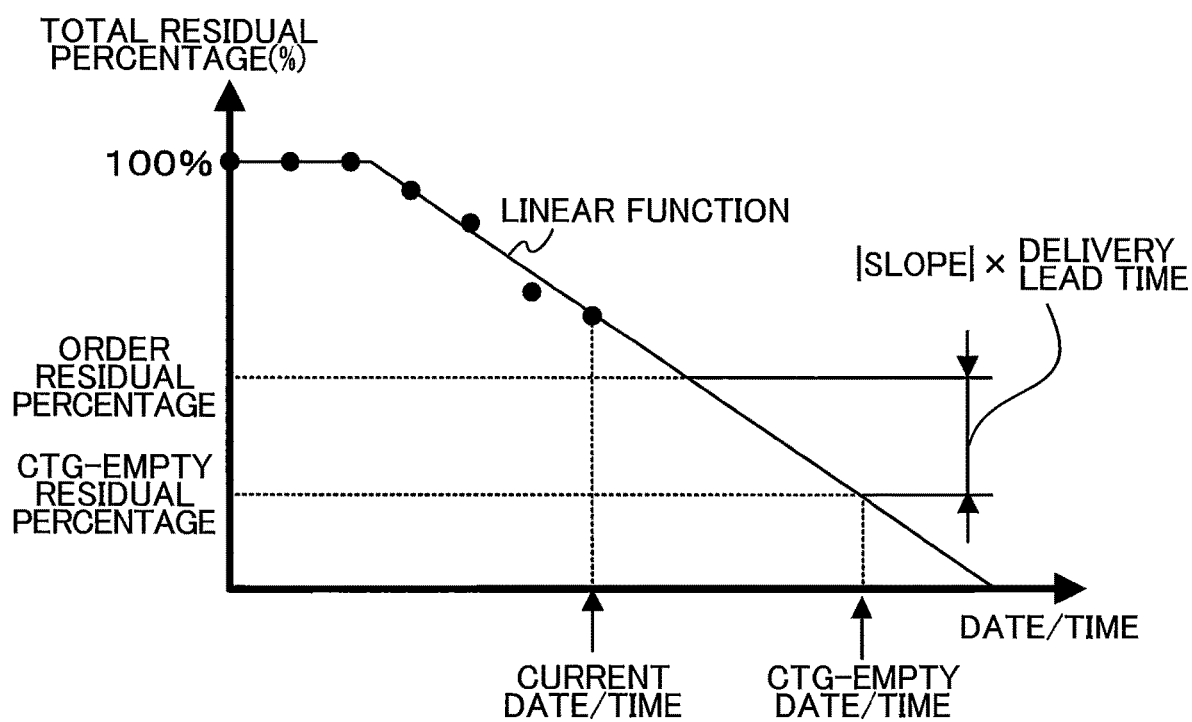
FIG. 20B illustrates a graph representing a linear function and an order residual percentage in the sixth modification.

In this modification, the information collection server 40 executes an order condition setting process illustrated in FIG. 20A in place of the order date/time setting process (in S96 of FIG. 10). Note that all steps other than those described below are identical to those described in the first embodiment for the order date/time setting process illustrated in FIG. 11A and are designated with the same step numbers used in the first embodiment to avoid duplicating description.

As in the order date/time setting process described in the first embodiment, the controller 45 of the information collection server 40 begins the order condition setting process by executing steps S101 through S104. In S161 the controller 45 calculates an order residual percentage by multiplying the absolute value of the slope of the linear function set in S104 by a delivery lead time and adds the cartridge-empty residual percentage acquired in S102 to this product. The delivery lead time is stored in the storage unit 42 in advance. In S162 the controller 45 stores the order residual percentage calculated in S161 in the cartridge management list stored in the storage unit 42, and subsequently ends the order condition setting process. Note that the cartridge management list is provided with the item "order residual percentage" in place of the item "order date/time" in this modification.

After executing the order condition setting process in place of the order date/time setting process of S96 illustrated in FIG. 10, the controller 45 executes a process in place of step S97 to determine whether the total residual percentage included in the management information is greater than or equal to the order residual percentage stored in the cartridge management list.

The controller 45 ends the ordering process of FIG. 10 when determining that the total residual percentage in the management information is greater than or equal to the order residual percentage. However, if the controller 45 determines that the total residual percentage is less than the order residual percentage, the controller 45 executes the same process in S98 through S100 described in the first embodiment, and subsequently ends the ordering process.

<Effects of the Sixth Modification>

In the sixth modification, the information collection server 40 can transmit an order command to the shipping server 50 without identifying an order date/time.

OTHER VARIATIONS

The present embodiments describe examples in which the printer 10 transmits management information to the information collection server 40 when the transmission time arrives. However, the printer 10 may transmit management information to the information collection server 40 at prescribed intervals, such as every twenty-four hours or every forty-eight hours. Alternatively, the printer 10 may transmit management information to the information collection server 40 every time a printing operation is performed or every time ink is discharged from the recording head 21, including during maintenance. The printer 10 may also transmit management information to the information collection server 40 when the information collection server 40 transmits request information to the printer 10 requesting transmission of the management information. In these variations, the controller 130 of the printer 10 executes a process in place of S61 in the management information transmission process illustrated in FIGS. 9A, 16A, and 17A to determine whether a prescribed time interval (twenty-four hours or forty-eight hours) stored in the EEPROM 51 has elapsed, or to determine whether request information has been received from the information collection server 40.

The present embodiments describe examples in which the information collection server 40 collects information from the printer 10 and transmits order commands. However, the controller 130 of the printer 10 may execute the processes performed by the controller 45 of the information collection server 40 in the embodiments. In other words, the controller 130 of the printer 10 may set the linear function, estimated arrival date/time, and order date/time based on the total residual percentages, cartridge residual percentages, and tank residual percentages and transmits the order commands. In such cases, the printer 10 is an example of the control device of the present disclosure; the memory on the IC chip 34, the ROM 37, the EEPROM 51, and the RAM 52 are an example of the memory of the present disclosure. The controller 130 is an example of the controller of the present disclosure.

The present embodiments and their modifications present examples for setting linear functions based on the initial record at which a residual percentage is less than 100% and the most recent record. However, the linear function may be set on the basis of three or more records instead, and the linear function may be set on the basis of the standard deviation found for the three or more records.

The present embodiments describe cases in which the information collection server 40 sets the order date/time each time management information is received, and updates the item "order date/time" in the cartridge management list at this time. However, the controller 45 of the information collection server 40 may be configured to set the order date/time only once and not to reset this order date/time until an order command has been transmitted.

The present embodiments and their modifications describe cases in which the printer 10 transmits a percentage to the information collection server 40, such as a total residual percentage, cartridge residual percentage, or tank residual percentage. However, the printer 10 may instead transmit only a total residual quantity, cartridge residual quantity, or tank residual quantity to the information collection server 40.

In the present embodiments and their modifications, the printer 10 adjusts the total residual percentage, cartridge residual percentage, and tank residual percentage to 100% when the percentages exceed 100% so that a total residual percentage, cartridge residual percentage, or tank residual percentage no greater than 100% is transmitted to the information collection server 40. However, the printer 10 may transmit a total residual percentage, cartridge residual percentage, or tank residual percentage exceeding 100% to the information collection server 40.

In the present embodiments, the management information includes a value of a C_Empty flag, and the information collection server 40 transmits an order command to the shipping server 50 without determining whether the order date/time has arrived when the value of the C_Empty flag is set to "ON". However, the management information need not include a value of a C_Empty flag, and the information collection server 40 may determine whether to transmit an order command based simply on whether the current time has reached the order date/time.

In the present embodiments and their modifications, ink is described as an example of the printing agent. However, the printing agent may be toner and is not limited to ink.

In the present embodiments and their modifications, ink flows from the cartridges 200 to the corresponding ink tanks 160 owing to a hydraulic head differential. However, the ink may be configured to flow from the cartridges 200 to the ink tanks 160 by gravity or by using a drive source, such as a pump. When a drive source is used, the ink tanks 160 may be disposed on the recording head 21, for example.

In the present embodiments and their modifications, the printer 10 and information collection server 40 are connected to each other through a communication circuit 6, such as the Internet. However, the printer 10 and information collection server 40 may be connected via a LAN. In this case, the printer ID for the printer 10 may be an IP address.

What is claimed is:

1. A control device comprising: a controller configured to perform:
    acquiring an index value from a recording device at an acquisition timing, the recording device including:
        a case in which a cartridge accommodating a printing agent is mountable;
        a tank configured to accommodate the printing agent supplied from the cartridge; and
        a recording portion configured to record an image on a sheet with the printing agent supplied from the tank, the index value being representative of a residual quantity of the printing agent remaining in a first cartridge and the tank, the first cartridge being currently mounted in the case;
    storing the index value in a memory;
    determining whether an order condition is satisfied based on the index value stored in the memory; and
    transmitting an order command to a relevant device after the order condition is satisfied, the order command instructing to order a second cartridge for replacement with the first cartridge.

2. The control device according to claim 1,
    wherein the order condition is set so that the second cartridge is delivered to a predetermined destination at a predetermined timing, the predetermined timing being a timing at which the first cartridge is expected to be out of the printing agent while the tank is expected to still accommodate the printing agent.

3. The control device according to claim 2, wherein the order command includes destination information indicating the predetermined destination.

4. The control device according to claim 1,
wherein the order condition is set so that the second cartridge is delivered to a predetermined destination at a predetermined timing by assuming that a time interval between a reference timing and the predetermined timing is an expected period of time from when the second cartridge has been ordered to when the second cartridge has been delivered to the predetermined destination, the predetermined timing being a timing at which the first cartridge is expected to be out of the printing agent while the tank is expected to still accommodate the printing agent.

5. The control device according to claim 1,
wherein the acquiring acquires the index value at an acquisition timing, and the storing stores in the memory a set of timing information and the index value in association with each other, the timing information being information about the acquisition timing,
wherein the controller is configured to further perform:
after performing, multiple times, the acquiring and the storing, determining whether the order condition is satisfied based on a plurality of sets of timing information and index values stored in the memory.

6. The control device according to claim 5,
wherein the controller is configured to further perform:
setting a linear function based on the plurality of sets of timing information and index values stored in the memory; and
determining whether the order condition is satisfied based on a value of a slope of the linear function.

7. The control device according to claim 1, wherein the printing agent is an ink, the cartridge includes a first chamber configured to accommodate the ink therein, the tank includes a second chamber configured to accommodate the ink supplied from the cartridge therein, each of the first chamber and the second chamber is communicable with an atmosphere, and at least part of the second chamber is positioned lower than the first chamber of the cartridge mounted in the case.

8. The control device according to claim 1, wherein the recording portion includes a recording head.

9. The control device according to claim 1, wherein the printing agents is a toner.

10. A non-transitory computer readable storage medium storing a set of program instructions installed on and executed by a computer, the set of program instructions comprising:
acquiring an index value from a recording device, the recording device including:
a case in which a cartridge accommodating a printing agent is mountable;
a tank configured to accommodate the printing agent supplied from the cartridge; and
a recording portion configured to record an image on a sheet with the printing agent supplied from the tank, the index value being representative of a residual quantity of the printing agent remaining in a first cartridge and the tank, the first cartridge being currently mounted in the case;
storing the index value in a memory;
determining whether an order condition is satisfied based on the index value stored in the memory; and
transmitting an order command to a relevant device after the order condition is satisfied, the order command instructing to order a second cartridge for replacement with the first cartridge.

11. The non-transitory computer readable storage medium according to claim 10,
wherein the order condition is set so that the second cartridge is delivered to a predetermined destination at a predetermined timing, the predetermined timing being a timing at which the first cartridge is expected to be out of the printing agent while the tank is expected to still accommodate the printing agent.

12. The non-transitory computer readable storage medium according to claim 10,
wherein the order condition is set so that the second cartridge is delivered to a predetermined destination at a predetermined timing by assuming that a time interval between a reference timing and the predetermined timing is an expected period of time from when the second cartridge has been ordered to when the second cartridge has been delivered to the predetermined destination, the predetermined timing being a timing at which the first cartridge is expected to be out of the printing agent while the tank is expected to still accommodate the printing agent.

13. The non-transitory computer readable storage medium according to claim 10,
wherein the acquiring acquires the index value at an acquisition timing, and the storing stores in the memory a set of timing information and the index value in association with each other, the timing information being information about the acquisition timing;
wherein the set of program instructions further comprises:
after performing, multiple times, the acquiring and the storing, determining whether the order condition is satisfied based on a plurality of sets of timing information and index values stored in the memory.

14. The non-transitory computer readable storage medium according to claim 13,
wherein the set of program instructions further comprises:
setting a linear function based on the plurality of sets of timing information and index values stored in the memory; and
determining whether the order condition is satisfied based on a value of a slope of the linear function.

15. A method executed by a computer for placing an order for a cartridge to be mounted in a recording device including: a case in which the cartridge accommodating a printing agent is mountable; a tank configured to accommodate the printing agent supplied from the cartridge; and a recording portion configured to record an image on a sheet with the printing agent supplied from the tank, the method comprising:
acquiring an index value from the recording device, the index value being representative of a residual quantity of the printing agent remaining in a first cartridge and the tank, the first cartridge being currently mounted in the case;
storing the index value in a memory;
determining whether an order condition is satisfied based on the index value stored in the memory; and
transmitting an order command to a relevant device after the order condition is satisfied, the order command instructing to order a second cartridge for replacement with the first cartridge.

16. The method according to claim 15,
wherein the order condition is set so that the second cartridge is delivered to a predetermined destination at a predetermined timing, the predetermined timing being a timing at which the first cartridge is expected to be out of the printing agent while the tank is expected to still accommodate the printing agent.

17. The method according to claim 16, wherein the order command includes destination information indicating the predetermined destination.

18. The method according to claim 15,
wherein the order condition is set so that the second cartridge is delivered to a predetermined destination at a predetermined timing by assuming that a time interval between a reference timing and the predetermined timing is an expected period of time from when the second cartridge has been ordered to when the second cartridge has been delivered to the predetermined destination, the predetermined timing being a timing at which the first cartridge is expected to be out of the printing agent while the tank is expected to still accommodate the printing agent.

19. The method according to claim 15,
wherein the acquiring acquires the index value at an acquisition timing, and the storing stores in the memory a set of timing information and the index value in association with each other, the timing information being information about the acquisition timing;

wherein the method further comprises:

after performing, multiple times, the acquiring and the storing, determining whether the order condition is satisfied based on a plurality of sets of timing information and index values stored in the memory.

20. The method according to claim 19, further comprising:

setting a linear function based on the plurality of sets of timing information and index values stored in the memory; and determining whether the order condition is satisfied based on a value of a slope of the linear function.

* * * * *